United States Patent
Kodas et al.

(10) Patent No.: US 10,428,186 B2
(45) Date of Patent: Oct. 1, 2019

(54) MULTI-COMPONENT PARTICLES COMPRISING INORGANIC NANOPARTICLES DISTRIBUTED IN AN ORGANIC MATRIX AND PROCESSES FOR MAKING AND USING SAME

(71) Applicant: SICPA HOLDING SA, Prilly (CH)

(72) Inventors: Toivo T. Kodas, Carlisle, MA (US); Mark J Hampden-Smith, Chelmsford, MA (US); Scott T. Haubrich, Albuquerque, NM (US); Heng Yu, Albuquerque, NM (US); Ned J. Hardman, Okemos, MI (US); Ralph E. Kornbrekke, San Mateo, CA (US); Aaron Stump, Albuquerque, NM (US); Klaus Kunze, Carlsbad, CA (US); David Dericotte, Stilwell, KS (US); Karel Vanheusden, Los Altos, CA (US)

(73) Assignee: SICPA HOLDING SA, Prilly (CH)

( * ) Notice: Subject to any disclaimer, the term of this patent is extended or adjusted under 35 U.S.C. 154(b) by 493 days.

(21) Appl. No.: 14/285,804

(22) Filed: May 23, 2014

(65) Prior Publication Data
US 2015/0307666 A1 Oct. 29, 2015

Related U.S. Application Data

(63) Continuation of application No. 11/117,701, filed on Apr. 29, 2005, now abandoned.

(60) Provisional application No. 60/599,847, filed on Aug. 7, 2004.

(51) Int. Cl.
| | |
|---|---|
| *A61K 9/14* | (2006.01) |
| *C08J 3/20* | (2006.01) |
| *B01J 13/00* | (2006.01) |

(52) U.S. Cl.
CPC ........... *C08J 3/203* (2013.01); *B01J 13/0043* (2013.01); *B01J 13/0095* (2013.01); *C08J 2339/06* (2013.01)

(58) Field of Classification Search
None
See application file for complete search history.

(56) References Cited

U.S. PATENT DOCUMENTS

| | | | |
|---|---|---|---|
| 4,366,303 A | 12/1982 | Kopf | |
| 5,429,824 A | 7/1995 | June | |
| 5,498,446 A | 3/1996 | Axelbaum et al. | |
| 5,536,994 A * | 7/1996 | Tong | H01J 9/2271 313/461 |
| 5,560,931 A | 10/1996 | Eickhoff et al. | |
| 5,569,448 A | 10/1996 | Wong et al. | |
| 5,573,783 A | 11/1996 | Desieno et al. | |
| 5,695,901 A | 12/1997 | Selim | |
| 5,766,788 A | 6/1998 | Inoue et al. | |
| 5,776,539 A | 7/1998 | Watanabe et al. | |
| 5,876,793 A | 3/1999 | Sherman et al. | |
| 5,879,715 A | 3/1999 | Higgins et al. | |
| 5,889,091 A | 3/1999 | Ziolo | |
| 5,985,173 A | 11/1999 | Gray et al. | |
| 6,024,786 A | 2/2000 | Gore | |
| 6,103,393 A | 8/2000 | Kodas et al. | |
| 6,194,338 B1 | 2/2001 | Andolfatto et al. | |
| 6,245,280 B1 | 6/2001 | Tan et al. | |
| 6,245,494 B1 | 6/2001 | Andriessen et al. | |
| 6,254,940 B1 | 7/2001 | Pratsinis et al. | |
| 6,267,989 B1 | 7/2001 | Liversidge et al. | |
| 6,270,806 B1 | 8/2001 | Liversidge et al. | |
| 6,277,169 B1 | 8/2001 | Hampden-Smith et al. | |
| 6,277,766 B1 | 8/2001 | Ayers | |
| 6,291,188 B1 | 9/2001 | Meade et al. | |
| 6,323,989 B1 | 11/2001 | Jacobson et al. | |
| 6,328,894 B1 | 12/2001 | Chan et al. | |
| 6,338,809 B1 * | 1/2002 | Hampden-Smith | B01J 2/003 257/E21.304 |
| 6,375,986 B1 | 4/2002 | Ryde et al. | |
| 6,406,745 B1 | 6/2002 | Talton | |
| 6,428,814 B1 | 8/2002 | Bosch et al. | |

(Continued)

FOREIGN PATENT DOCUMENTS

| | | |
|---|---|---|
| DE | 19639632 | 4/1998 |
| JP | 2003-019427 | 1/2003 |

(Continued)

OTHER PUBLICATIONS

Yeum et al.; "Poly(vinyl acetate)/Silver Nanocomposite Microspheres by Suspension Polymerization at Low Temperature," 2005 (published online Jan. 18, 2005), Wiley-VCH Verlag GmbH; Macromolecular Materials and Engineering, vol. 290, pp. 78-84.

Drachev et al.; "Giant nonlinear optical activity in an aggregated silver nanocomposite," 1998, American Institute of Physics; JETP Letters, vol. 68, No. 8, pp. 651-656.

Cartenuto et al.; "Synthesis and characterization of poly(N-vinylpyrrolidone) filled by monodisperse silver clusters," 2001; John Wiley & Sons; Applied Organometallic Chemistry, vol. 15, pp. 344-351.

Hira et al.; "Preparation of Colloidal Transition Metals in Polymers by Reduction with Alcohols or Ethers," 1979; Marcel Dekker, Inc.; Journal of Macromolecular Science—Chemistry, vol. 13, No. 6, pp. 727-750.

(Continued)

*Primary Examiner* — David J Blanchard
*Assistant Examiner* — Ivan A Greene
(74) *Attorney, Agent, or Firm* — Muncy, Geissler, Olds & Lowe, P.C.

(57) ABSTRACT

Multi-component particles comprising inorganic nanoparticles distributed in an organic matrix and processes for making and using same. A flowing aerosol is generated that includes droplets of a precursor medium dispersed in a gas phase. The precursor medium contains a liquid vehicle and at least one precursor. At least a portion of the liquid vehicle is removed from the droplets of precursor medium under conditions effective to convert the precursor to the nanoparticles or the matrix and form the multi-component particles.

19 Claims, 7 Drawing Sheets

(56) References Cited

U.S. PATENT DOCUMENTS

| | | |
|---|---|---|
| 6,429,824 B2 | 8/2002 | LaRochelle et al. |
| 6,479,146 B1 | 11/2002 | Caruso et al. |
| 6,482,387 B1 | 11/2002 | Gulgun et al. |
| 6,503,475 B1 | 1/2003 | McCormick et al. |
| 6,506,564 B1 | 1/2003 | Mirkin et al. |
| 6,511,749 B1 | 1/2003 | Mathiowitz et al. |
| 6,537,665 B2 | 3/2003 | O'Connor et al. |
| 6,601,776 B1 | 8/2003 | Oljaca et al. |
| 6,712,993 B2 | 3/2004 | Kijima et al. |
| 6,746,767 B2 | 6/2004 | Gottfried et al. |
| 6,811,885 B1 | 11/2004 | Andriessen et al. |
| 2002/0036616 A1 | 3/2002 | Inoue |
| 2002/0068092 A1 | 6/2002 | Bosch et al. |
| 2002/0098653 A1* | 7/2002 | Flagan ............ B82Y 10/00 438/260 |
| 2002/0106461 A1 | 8/2002 | Yalton |
| 2002/0110597 A1 | 8/2002 | Ryde et al. |
| 2002/0145132 A1 | 10/2002 | Won |
| 2003/0002132 A1 | 1/2003 | Foucher et al. |
| 2003/0047816 A1 | 3/2003 | Dutta |
| 2003/0049517 A1 | 3/2003 | Hampden-Smith et al. |
| 2003/0054218 A1 | 3/2003 | Hampden-Smith et al. |
| 2003/0082237 A1 | 5/2003 | Cha et al. |
| 2003/0108644 A1 | 6/2003 | Coleman et al. |
| 2003/0108664 A1 | 6/2003 | Kodas et al. |
| 2003/0115986 A1 | 6/2003 | Pozamsky et al. |
| 2003/0115987 A1 | 6/2003 | Pozamsky |
| 2003/0115988 A1 | 6/2003 | Pozamsky et al. |
| 2003/0116017 A1 | 6/2003 | Pozamsky et al. |
| 2003/0116080 A1 | 6/2003 | Huang |
| 2003/0116228 A1 | 6/2003 | Pozamsky |
| 2003/0124259 A1 | 7/2003 | Kodas et al. |
| 2003/0146529 A1 | 8/2003 | Chen et al. |
| 2003/0148024 A1 | 8/2003 | Kodas et al. |
| 2003/0161959 A1 | 8/2003 | Kodas et al. |
| 2003/0175411 A1 | 9/2003 | Kodas et al. |
| 2003/0180451 A1* | 9/2003 | Kodas ............ C23C 18/06 427/123 |
| 2004/0012106 A1 | 1/2004 | Kanbe et al. |
| 2004/0182533 A1 | 9/2004 | Blum et al. |
| 2004/0223208 A1 | 11/2004 | Yu et al. |
| 2005/0147963 A1 | 7/2005 | Su et al. |

FOREIGN PATENT DOCUMENTS

| | | |
|---|---|---|
| WO | 0012649 | 3/2000 |
| WO | 03/002225 | 1/2003 |
| WO | 03/032084 | 4/2003 |
| WO | 2003/038002 | 5/2003 |
| WO | 2004/081111 | 9/2004 |

OTHER PUBLICATIONS

Zhang et al.; "PVP Protective Mechanism of Ultrafine Silver Powder Synthesized by Chemical Reduction Processes," 1996; Academic Press Inc., Journal of Solid State Chemistry, vol. 121, pp. 105-110.

Silvert et al.; "Preparation of colloidal silver dispersions by the polyol process Part 2—Mechanism of particle formation," 1997; RSC Publishing; Journal of Materials Chemistry, vol. 7, issue 2, pp. 293-299.

Dictionary.com entry for "embedded", Retrieved on Jul. 15, 2013; p. 1.

Boedtker, Helga; and Doty, Paul; "A study of geltin molecules, aggregates and gels," 1954, American Chemical Society, vol. 58, pp. 968-983.

Fakirov, S. et al.; "Mechanical properties and transition temperatures of cross-linked oriented gelatin," 1996, Steinkopff Verlag, Colloid and Polymer Science, vol. 274, pp. 334-341.

Lewis, Richard J.; "Hawley's Condensed Chemical Dictionary," 15th ed., 2007, John Wiley & Sons, entry for "cobalt blue", p. 312.

Bell, Leonard N.; and Touma, Dergham E.; "Glass Transition Temperature Determined using a Temperature Cycling differential scanning calorimeter," 1996, Wiley, Journal of Food Science, vol. 61, No. 4, pp. 807-810.

Yaws, Carl; "Yaws' Transport Properties of Chemicals and Hydrocarbons," (electronic ed.), Knovel, 2010, pp. 1-3 (as provided).

Yaws, Carl; "Yaws' Thermophysical Properties of Chemicals and Hydrocarbons," (electronic ed.), Knovel, 2010, pp. 1-3 (as provided).

Yin, Bingsheng et al.; "Electrochemical Synthesis of Silver Nanoparticles under Protection of Poly(N-vinylpyrrolidone)," 2003, American Chemical Society, Journal of Chemistry B, vol. 107, No. 34, pp. 8898-8904.

Brandrup, J et al. (editors); "Polymer Handbook, 4th ed.," Andrews, Rodney J.; and Grulke, Eric A. (authors); "Glass Transition temperatures of Polymers," 1999, John Wiley & Sons, pp. 193-219.

Dameron, C. T.; et al.; "Biosynthesis of cadmium sulphide quantum semiconductor crystallites", 1998; Macmillan Publisher Ltd.; Nature, vol. 338, pp. 596-597.

Kiely, C. J.; Fink, J.; Brust, M.; Bethell, D.; Schriffin, D. J.; Spontaneous ordering of bimodal ensembles of nanoscopic gold clusters; 1998; Macmillan Publisher Ltd.; Nature, vol. 396, pp. 444-446.

Dictionary.com entry for "biopolymer", retriveved from <dictionary.com> on Mar. 11, 2011. pp. 1-2.

Yahoo! Answers answer to "Why is DNA soluble in water?", retrieved from <answers.yahoo.com> on Mar. 11, 2011, p. 1.

Hardy, Jay; "Candida glabrata", retrieved from <www.hardydiagnostics.com> on Mar. 11, 2011, pp. 1-2.

Klis, Frans M.; et al.; "Dynamics of cell wall structure in Saccharmyces cerevisiae", 2002, Elsevier; Fems Microbiology Reviews, vol. 26, pp. 239-256.

Sastry, Murali; et al.; "Biosynthesis of metal nanoparticles using fungi and actinomycete", Current Science, vol. 85, No. 2, pp. 162-170.

Xu, Schengqing; "Hybrid polymer-inorganic materials: multiscale hierarchy", 2003, VSP, Composite Interfaces, vol. 10, No. 4-5, pp. 405-421.

Kim, H-S, et al., "Growth of Monodisperse Silver Nanoparticles in Polymer Matrix by Spray Pyrolysis", Aerosol Science and Technology 40 pp. 536-544 (2006).

Xia, et al., "The roles of ammonia and ammonium bicarbonate in the preparation of nickel particles from nickel chloride", J. Mater. Res., vol. 15, No. 10, Oct. 2000, pp. 2157-2166.

Li, et al, "Process for Preparing Macroscopic Quantities of Brightly Photoluminescent Silicon Nanoparticles with Emission Spanning the Visible Spectrum", Langmuir, vol. 19, 2003, pp. 8490-8496.

Kim, et al., "Synthesis of Nanoporous Metal Oxide Particles by a New Inorganic Matrix Spray Pyrolysis Method", Chem. Matter., vol. 14, No. 7, 2002, pp. 2889-2899.

Xia, et al., "Novel Route to Nanoparticle Synthesis by Salt-Assisted Aerosol Decomposition," Advanced Materials, 2001, 13, No. 20, Oct. 16, pp. 1579-1582.

Xia, et al., "Nanoparticle Separation in Salted Droplet Microreactors", Chem. Mater., 2002, vol. 14, No. 6, pp. 2623-2627.

Xia, et al., "Synthesis and Photoluminescence of Spherical ZnS:MN$^{2+}$ Particles", Chem. Mater.

Xia, et al., "Synthesis of CeO2 nanoparticles by salt-assisted ultrasonic aerosol decomposition", J. Mater. Chem., 2001. 11. pp. 2925-2927.

Abdullah, et al., "In Situ Synthesis of Polymer Nanocomposite Electrolytes Emitting a High Luminescence with a Tunable Wavelength". J. Phys. Chem. B. vol. 107. No. 9. 2003. pp. 1957-1961.

Iskandar, et al., Functional nanostructured silica powders derived from colloidal suspensions by sol spraying:, Journal of Nanoparticle Research 3, 2001, pp. 263-270.

Mikrajuddin, et al, "Luminescent Polymer Electrolytes Prepared by Growing ZnO Nanoparticles in the Matrix of Polyethylene Glycol". Journal of the Electrochemical Society. 149 (5). 2002. pp. H107-H112.

Okuyama, et al., "Preparation of nanoparticles via spray route", Chemical Engineering Science, 58, 2003, pp. 537-547.

Silvert, pierre-Yves, et al. Preparation of Colloidal silver dispersions by the polyol process, Part 1—Synthesis and characterization, Journal of Material Chemistry, 6(4), pp. 573-577 (1996).

(56) References Cited

OTHER PUBLICATIONS

Silvert, pierre-Yves, et al. Preparation of Colloidal silver dispersions by the polyol process, Part 2—Mechanism of particle formation, Journal of Material Chemistry, 7(2), pp. 193-199 (1997).

* cited by examiner

MULTI-COMPONENT PARTICLES COMPRISING INORGANIC NANOPARTICLES DISTRIBUTED IN AN ORGANIC MATRIX AND PROCESSES FOR MAKING AND USING SAME

CROSS-REFERENCE TO RELATED APPLICATION

This application is a continuation of and claims the benefit of U.S. patent application Ser. No. 11/117,701, filed on Apr. 29, 2005, which claims the benefit of Provisional Patent Application Ser. No. 60/599,847, filed on Aug. 7, 2004. Both applications are incorporated herein by reference.

FIELD OF THE INVENTION

The present invention relates to inorganic nanoparticles. More particularly, the invention relates to multi-component particles comprising inorganic nanoparticles distributed in an organic matrix, and to processes for making and using such multi-component particles.

BACKGROUND OF THE INVENTION

Nanoparticles, and processes for making nanoparticles, have been the subject of recent interest and research because of the advantages provided by nanoparticles over larger sized particulate materials. One advantage of nanoparticles is they have a greater surface area and surface energy, which is useful in a variety of applications, including catalysis, electrocatalysis, absorbance, chemical separations and bio-separation applications. Nanoparticles are also useful in the formulation of inks, pastes and tapes that are used in depositing thin or thick films, such as optically transparent conductors for use in displays, magnetic coatings for storage media and printed circuitry for electronic applications. Inks and pastes with nanoparticles have improved rheology characteristics (e.g., flowability), which allow thinner layers to be applied and allow deposition of features with smaller dimensions. Lighting applications also benefit from the properties of nanoparticles; for example, semiconductor nanoparticles, in addition to other uses, are useful because of their "quantum dot effect," which allows the luminescent color of a semiconductor nanoparticulate to be tailored according to the size of the nanoparticulate. In addition to the examples above, nanoparticles are being used, or considered for use, in many other applications including pharmaceutical formulations, drug delivery applications, medical diagnostic aids, abrasives, pigments, phosphors for lighting, displays, security applications, dental glasses, polymeric fillers, thermal interface materials and cosmetics.

As a result of the large number of applications for nanoparticles, a variety of processes have been developed for making and processing nanoparticles. One common problem faced by these processes is the tendency of the nanoparticles to agglomerate because of their high surface area and surface energy. Once the nanoparticles have agglomerated, often they do not provide the same advantages achieved when the individual nanoparticles are in a dispersed state. Consequently, the tendency of nanoparticles to agglomerate makes the forming, processing, handling, transporting and use of nanoparticles difficult. Further, it is extremely difficult to separate or redisperse agglomerated nanoparticles.

A wide variety of synthetic methods exist for producing nanoparticles. Another common problem is to produce unagglomerated nanoparticles at such scales as to meet commercial needs.

Thus, there is a need for additional processes for forming, processing, handling, transporting, dispersing and using nanoparticles and new nanoparticulate products that alleviate some or all of these problems.

SUMMARY OF THE INVENTION

The present invention is directed to multi-component particles comprising inorganic nanoparticles distributed in an organic matrix and to processes for making and using same. In one embodiment, the invention is to a plurality of multi-component particles, each particle comprising a plurality of inorganic nanoparticles distributed in an organic matrix, wherein the plurality of multi-component particles has a d50 particle diameter, based on volume, of greater than about 0.1 µm and less than about 150 µm. The multi-component particles preferably are substantially spherical.

The inorganic nanoparticles optionally comprise one or more of silver, copper, nickel, platinum, palladium, rhodium, ruthenium, cobalt, gold, iridium, or a metal oxide thereof, and the organic matrix optionally comprises one or more of a polycyclic polymer, an organic polymer (e.g., polyvinylpyrrolidone (PVP)), an organic salt, an organic compound, or a bioactive compound. An additive may also be distributed within or form a portion of the organic matrix, the additive comprising, for example, one or more of a surfactant, a reducing agent, a fluxing agent, an adhesion promoter or a hardening agent.

Desirably, the nanoparticles may be dispersable in a liquid medium to form dispersed nanoparticles having from about 1 to about 10 monolayers disposed thereon, wherein the monolayers are formed from the organic matrix. In one aspect, the dispersion has a surface tension greater than 5 dynes/cm and a viscosity greater than about 1 centipoise. In one aspect, the dispersion is ink jettable.

In another embodiment, the invention is to an individual multi-component particle, comprising a plurality of inorganic nanoparticles distributed in an organic matrix, wherein the multi-component particle has a particle size (e.g., diameter) of greater than about 0.1 µm and less than about 100 µm.

In another embodiment, the invention is to a process for making multi-component particles comprising inorganic nanoparticles distributed in an organic matrix, the process comprising the steps of: (a) generating an aerosol comprising droplets, wherein the droplets comprise a liquid vehicle, an inorganic nanoparticle precursor and an organic matrix precursor; and (b) removing at least a portion of the liquid vehicle from the droplets under conditions effective to convert at least a portion of the organic matrix precursor to the organic matrix and to convert at least a portion of the inorganic nanoparticle precursor to the inorganic nanoparticles distributed in the organic matrix. In this aspect, step (b) optionally comprises heating the droplets to a maximum temperature of from about 50° C. to about 800° C. for a period of time of at least 1 second.

Optionally, the process further comprises the step of: (c) contacting the multi-component particles with a liquid medium to release the nanoparticles from the matrix and form a colloidal solution. Additionally, the process optionally further comprises the step of: (d) surface-modifying the inorganic nanoparticles with a surface-modifying agent during or after step (c).

In another embodiment, the invention is to a process for making multi-component particles comprising inorganic nanoparticles dispersed in an organic matrix, the process comprising the steps of: (a) generating an aerosol comprising droplets dispersed in a gas phase, wherein the droplets comprise a liquid vehicle, the inorganic nanoparticles and an organic matrix precursor; and (b) removing at least a portion of the liquid vehicle from the droplets under conditions effective to convert at least a portion of the organic matrix precursor to the organic matrix and to disperse the nanoparticles within the matrix.

In another embodiment, the invention is to a process for making multi-component particles comprising inorganic nanoparticles dispersed in an organic matrix, the process comprising the steps of: (a) generating an aerosol comprising droplets dispersed in a gas phase, wherein the droplets comprise a liquid vehicle, an inorganic nanoparticle precursor and an organic matrix precursor; (b) removing at least a portion of the liquid vehicle from the droplets; (c) converting the organic matrix precursor to the organic matrix; and (d) converting the inorganic nanoparticle precursor to the inorganic nanoparticles distributed within the matrix. Steps (b), (c) and (d) optionally occur simultaneously. In various aspects, step (b) occurs, at least in part, before steps (c) and (d); step (c) occurs, at least in part, before step (d); and/or step (d) occurs, at least in part, before step (c).

In another embodiment, the invention is to a process for forming a dispersion, the process comprising the steps of: (a) providing a plurality of multi-component particles, each multi-component particle comprising a plurality of inorganic nanoparticles distributed in an organic matrix, wherein the plurality of multi-component particles has a d50 particle size (e.g., diameter), by volume, of greater than about 0.1 μm and less than about 150 μm; and (b) contacting the plurality of multi-component particles with a liquid medium under conditions effective to disperse the inorganic nanoparticles from the matrix and form the dispersion, which preferably is ink jettable.

BRIEF DESCRIPTION OF THE DRAWINGS

The present invention will be better understood in view of the following non-limiting figures, wherein.

DETAILED DESCRIPTION OF THE INVENTION

I. Introduction

Figure 1:
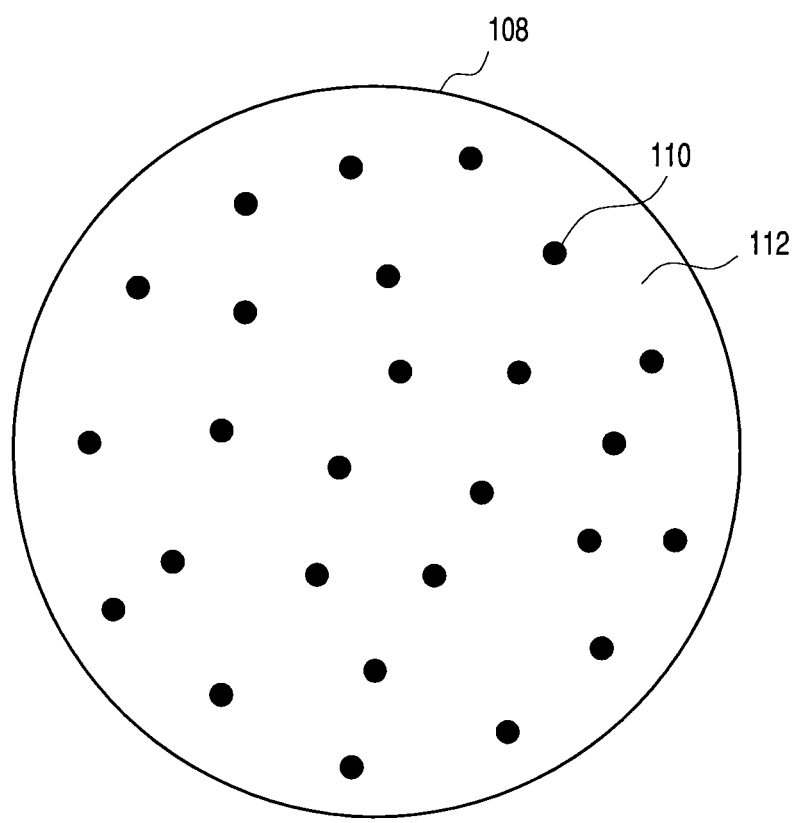
FIG. 1 generally illustrates features of a multi-component particle manufacturable using the process of the present invention.

The present invention is directed to multi-component particles, each particle comprising a plurality of inorganic nanoparticles, e.g., metallic, metal oxide or main group nanoparticles, distributed in an organic matrix. The multi-component particles preferably are "microparticles," defined herein particles having a size smaller than about 500 μm, e.g., in the range of from about 1 μm to about 500 μm. In contrast, the term "nanoparticles" is defined herein to mean particles having a size smaller than about 500 nm, e.g., in the range of from about 1 nm to about 500 nm. The invention is also directed to processes for making and using the multi-component particles.

The processes for making the multi-component particles according to one aspect of the present invention are highly desirable in that they provide the ability to form inorganic nanoparticles having highly desirable characteristics. Specifically, the present invention provides a highly flexible route for synthesizing inorganic nanoparticles, as compared to standard wet chemical synthesis processes. This flexibility is derived from the ability of the present processes to include various components, e.g., surfactants, various polymers, and/or one or more additives, within the organic matrix. The presence of these components in the organic matrix provides the ability to synthesize inorganic nanoparticles having unique characteristics and properties (e.g., solubility in a variety of solvents, air or moisture stability, dispersion stability, etc.), independent of the actual synthesis conditions of the nanoparticles. In contrast, during conventional wet chemical synthesis processes, one is highly limited in the choice of surfactants, polymers and/or additives that may be implemented in the synthesis process due to the fact that the use of these compositions in wet chemical synthesis processes will usually be involved in controlling the nanoparticle growth to a much greater extent than in the processes of the present invention.

II. Composition of the Multi-Component Particles

A. Overview

In one embodiment, the present invention is directed to a multi-component particle, comprising a plurality of inorganic nanoparticles distributed in an organic matrix, wherein the multi-component particle has a particle size (e.g., diameter) of greater than about 0.1 μm and less than about 100 μm, e.g., greater than about 0.5 μm and less than about 25 μm, based on electron microscopy.

In a similar embodiment, the invention is to a plurality of multi-component particles, each particle comprising a plurality of inorganic nanoparticles distributed in an organic matrix. In this embodiment, the plurality of multi-component particles has a number average particle diameter of greater than about 0.1 μm and less than about 100 μm, e.g., greater than about 0.5 μm and less than about 25 μm, based on electron microscopy. The plurality of multi-component particles has a d50 particle diameter, based on volume, greater than about 0.1 μm and less than about 150 μm, e.g., greater than about 0.5 μm and less than about 50 μm or greater than about 0.7 μm and less than about 25 μm, as determined by light scattering techniques.

That is, the present invention, in one embodiment, is directed to one or more multi-component particles. As used herein, the term "multi-component particle" means a particle comprising at least two distinct material components or phases. Specifically, the multi-component particles comprise the inorganic nanoparticles that include at least a first material phase and the organic matrix that includes at least a second material phase that is different than the first material phase. Such particles may be formed, for example, by any of the processes of the present invention, discussed below. It is also contemplated, however, that these particles may be formed by other heretofore undiscovered processes.

FIG. 1 generally illustrates one non-limiting example of a multi-component particle according to the present invention. Specifically, FIG. 1 shows a multi-component particle 108 generally comprising distributed inorganic nanoparticles 110 and organic matrix 112, with the distributed nanoparticles 110 maintained in a distributed state within the particle 108 by matrix 112. The matrix 112 therefore functions to keep the nanoparticles 110, at least partially and preferably completely, separated to inhibit or prevent agglomeration or coalescense of the nanoparticles 110 after final formation of the nanoparticles 110.

In the multi-component particles 108 of FIG. 1, the matrix 112 and the distributed nanoparticles 110 are of different compositions, although they may have one or more components in common. Also, although the nanoparticles 110 and the matrix 112 are each shown including only a single material phase, the invention is not so limited. The particles may include one or more of the following features: nanoparticles each comprised of one or more different material phases; one or more different compositions of nanoparticles; and matrix comprising one or more different material phases. Moreover, it is not necessary that the matrix or the nanoparticles be comprised of only a single material phase, or that any material phase of the matrix be a continuous phase. For example, the matrix may be made of many different material phases that together provide a structure for maintaining the nanoparticles in a distributed state. Likewise, for example, multi-component particles made according to the invention may include nanoparticles of only a single type or may include two or more different nanoparticles (e.g., nanoparticles of different compositions). Also, for example, the composition of a nanoparticle may comprise only a single material phase or may comprise two or more distinct material phases. More specific examples of some possible matrix and nanoparticulate features are provided below.

With reference to FIG. 1, the composition of the matrix 112 may be designed to be wholly or partially permanent for use in a final application. Alternatively, the composition of the matrix 112 may be designed to function as a storage, handling or processing aid, which is wholly or partially removable prior to final use of the nanoparticles. The matrix may also serve some function, for example in aiding the redispersion of the nanoparticles in a liquid.

B. Composition and Properties of the Matrix

As noted previously, the multi-component particles of the present invention include inorganic nanoparticles distributed in an organic matrix. As used herein, the term "organic matrix" means a composition comprising one or more organic compounds capable of supporting the nanoparticles therewithin. By "organic compound" it is meant a compound that comprises carbon other than elemental carbon. In one embodiment, the organic matrix comprises one or more organic compounds in an amount greater than about 50 weight percent, e.g., greater than about 60 weight percent, greater than about 70 weight percent, greater than about 80 weight percent or greater than about 90 weight percent, based on the total weight of the matrix. It is contemplated that the organic matrix, as a whole, may also include one or more inorganic components (e.g., additives) in addition to the one or more organic compounds. In one non-limiting example, the organic matrix, as defined herein, may comprise PVP (polyvinylpyrrolidone, an organic polymer) in an amount less than 50 weight percent, and an organo-metallic additive such as silver trifluoroacetate in an amount less than 50 weight percent. Optionally, the organic matrix comprises one or more of a polycyclic polymer, an organic polymer, an organic salt, an organic compound, a bioactive compound, or PVP.

The glass transition temperature as well as the melting point of the organic matrix can greatly affect the formation of the nanoparticles within the matrix. Essentially, the properties of the matrix may effect the growth rate, size morphology and the distribution of the nanoparticles within the matrix. In one aspect of the invention, the organic matrix has a glass transition temperature of at least about 30° C., e.g., from about 30° C. to about 600° C., from about 30° C. to about 400° C., from about 40° C. to about 250° C., or from about 100° C. to about 200° C. The organic matrix also preferably has a melting point of greater than about 30° C., e.g., from about 30° C. to about 600° C., from about 100° C. to about 350° C., or from about 150° C. to about 300° C.

As indicated above, the organic matrix comprises an organic compound or a combination of two or more organic compounds that function to maintain the nanoparticles at least partially and preferably completely separated in a distributed state within the multi-component particles. Examples of some general types of organic materials that may also be included in the matrix (or may form the matrix) include organic salts, polymers, organic compounds, organometallic compounds, surfactants, and biological organic material (such as amino acids, proteins, lipids, DNA, enzymes, etc.).

In one particular implementation of the invention, the matrix comprises one or more than one organic salt material. Matrix organic salt materials are preferred, for example, for many applications when it is desired to have a matrix that is partially or wholly removable, because the organic salt material of the matrix can be selected to be dissolvable in a liquid medium that is not detrimental to the nanoparticles. For water soluble organic salts, a convenient choice for the liquid medium is water or an aqueous solution, which may be neutral, basic or acidic depending upon the specific application and the specific matrix organic salt material to be dissolved. The matrix salt material may comprise a minor amount of an inorganic salt optionally in addition to an organic salt.

In one particular implementation of the invention, the matrix comprises one or more than one polymer. It may be desirable to include a polymer material in the matrix for a variety of reasons. For example, a polymer may be selected for easy dissolution in a liquid medium to release (disperse) the nanoparticles for further processing or use. A polymer material that is soluble in an organic liquid may be selected when it is desired to disperse the nanoparticles in the organic liquid during subsequent processing or use. A polymer material that is soluble in water may also be selected when it is desired to disperse the nanoparticles in water during subsequent processing or use, as described in more detail below.

As another example, a polymer may be selected as a permanent matrix material for use in some application. When used as a permanent matrix, the polymer of the matrix may simply provide a structure to retain the nanoparticulate in a desired distribution without interfering with proper functioning of the nanoparticles in the application. Alternatively, the polymer may itself also provide some function for the application. The polymer may, for example, have a function that is different than that of the nanoparticles, have a function that compliments that of the nanoparticles, or have a function that is the same as that of the nanoparticles. Examples of some specific combinations of materials for the nanoparticles and polymer materials for the matrix materials and their applications are described in more detail below. As yet another example, the polymer may be selected for its surface modifying properties to beneficially surface modify the nanoparticles in a way that is useful in some subsequent processing or use of the nanoparticles. The invention is not limited to use of any particular polymers in the matrix. Some non-limiting examples of organic polymers that may be used in the matrix include: fluorinated polymers, thermal curable polymers, UV curable polymers, appended polymers, light emitting polymers, semiconducting polymers, electrically conductive polymers (e.g. polythiophenes, poly (ethylene dioxy thiophene), hydrophobic polymers (siloxanes, silicones, silanes, polyacrylonitrile, polymethylmethacrylate, polyethyleneterephthalate), hydrophilic polymers (polythiophenes, sulfonated polymers, polymers with ionic functional groups), polyaniline & modified versions, poly pyrroles & modified versions, poly pyridines & modified versions, polycarbonates, polyesters, polyvinylpyrrolidone (PVP), polyethylene, epoxies, polytetrafluoroethylene, Nafion®, Kevlar® and Teflon®). The polymers included in the matrix may have any structure, some non-limiting examples of polymeric structures include: dendrimers, long single chain polmers, co-polymers (random or block, e.g. A-B, A-B-A, A-B-C, etc.) branched polymers and grafted polymers.

As mentioned above, some or all of matrix in the multi-component particles may be designed to be permanent for some applications of the nanoparticles. In one example of an application using a permanent matrix, particles may be made for use as a thermally conductive barrier layer, such as for use in computers. The nanoparticles could be of a metal with high thermal conductivity, such as silver or copper. The matrix could be of an electrically insulating material, such as an electrically insulating polymer. The combination of electrically insulative polymer matrix and thermally conductive metal nanoparticles is useful for making thermal interface layers, such as may be used underneath computer chips, permitting rapid dissipation of heat without significant risk of an electrical short through the thermally conductive metal. Another example is use of a matrix as a protective barrier to protect nanoparticles from degradation. A protective organic matrix may be useful for protecting nanoparticles comprising inorganic pigments and/or light emitting materials such as phosphors from the ambient environment (e.g., moisture or oxidation). Other non-limiting examples of multi-component particles that may include a permanent matrix material are shown in Table 1, along with exemplary applications for use of those particles.

TABLE 1

EXEMPLARY PARTICLES WITH PERMANENT MATRIX MATERIAL

| NANOPARTICLE | MATRIX MATERIAL | APPLICATION |
| --- | --- | --- |
| Photoluminescent phosphor | Light emitting polymer Polymer | Organic light emitting diode (OLED) displays, lighting applications |
| Electroluminescent (EL) phosphor | Light emitting polymer Polymer | Electroluminescent (EL) displays/lamps |
| Red, Green, Blue (RGB) phosphors all in one layer | Polymer | Lighting |
| Cathodoluminescent (CL) phosphor | Light emitting polymer Polymer | Field emission display (FED) |
| Color Pigment | Polymer | Colored coatings |
| Hard materials such as oxides or nitrides | Polymer | Anti-scratch, anti-abrasion, dental glass |
| Hard materials such as oxides or nitrides | Surfactants | Anti-scratch, anti-abrasion, dental glass |
| Semiconductor | Polymer | Solar cell |
| Semiconductor | Polymer | Solar cell |
| Semiconducting metal oxides | Polymer | Resistors |
| UV absorbing | Polymer | UV protection |
| High dielectric | Polymer | Capacitor |
| High dielectric | Low melting point material, insulating polymer | Capacitor |
| Conductor | Non-conductor | Electromagnetic shielding |
| Absorbent | Polymer | Protective barrier |
| Light absorber | Light emitter | Production of monochromatic light |
| High dielectric | Polymer dielectric | Dielectric layer in polymer transistor |
| Semiconductor, n type, p type | Polymer semiconductor, n type, p type | Semiconductor in polymer transistor |
| Semiconductor, n type, p type | Insulating polymer | Transistor |
| Silicon | Polymer | Transistor |
| electrochromic | Polymer | Electrochromic display |
| Thermochromic | Polymer | Display, visual output device |
| Thermochromic | Inorganic material | Display |
| Photochromic | Polymer | Display, visual output device |
| Ion conductor | Polymer | Battery |
| Lithium containing | Polymer | Lithium ion battery |
| Metals, electrical conductor | Polymer, silicone | Thermal interface material |
| Refractive index | Refractive index matching polymer | Reflective coating |
| UV absorber | Biologically inactive materials, polymers, | Cosmetics |

TABLE 1-continued

EXEMPLARY PARTICLES WITH PERMANENT MATRIX MATERIAL

| NANOPARTICLE | MATRIX MATERIAL | APPLICATION |
| --- | --- | --- |
| Sorbent | Porous organic polymer | Absorbents (dissolving away partially), chemical separations, bio-separations |
| Low k oxides | Porous organic polymer | Low k material |
| Anti-fouling | Porous organic polymer | Anti-fouling (marine) |
| Catalytically active | Porous organic polymer | Self cleaning surfaces, membrane electrode assemblies |
| Dissolvable material | Polymer | Time release |
| Magnetic material | Organic | Magnetic applications |
| Pigments | Polymer Pigments | Color |

The organic matrix optionally comprises one or more silicon containing polymers and/or compounds, such as polysilanes, polysiloxanes, polysilicones, polysilsequioxanes, polysilazanes, polycarbosilanes, siloxanes, silanes or silicones.

The organic matrix may include one or more surfactant compounds, such as anionic surfactants, cationic surfactants, or nonionic surfactants. Examples of anionic surfactants include alkyl sulfates, alkyl sulfonates, alkyl benzene sulfates, alkyl benzene sulfonates, fatty acids, sulfosuccinates, and phosphates. Examples of cationic surfactants include quanternary ammonium salts and alkylated pyridinium salts. Examples of nonionic surfactants include alkyl primary, secondary, and tertiary amines, alkanolamides, ethoxylated fatty alcohols, alkyl phenol polyethoxylates, fatty acid esters, glycerol esters, glycol esters, polyethers, alkyl polygycosides, and amineoxides. In addition, Zwitterionic surfactants (surface active additives with a cationic and anionic functional group on the same molecule) may be included within the matrix. Examples include betaines, such as alkyl ammonium carboxylates (e.g., [$(CH_3)_3N^+$—$CH(R)COO^-$] or sulfonates (sulfo-betaines) such as [$R$—$N^+(CH_3)_2(CH_2)_3 SO_3^-$]). Examples include: n-dodecyl-N-benzyl-N-methylglycine [$C_{12}H_{25}N^+(CH_2$—$C_6H_5)(CH_3)CH_2COO^-$], N-alkyl N-benzyl N-methyltaurines [$C_nH_{2n+1}N^+(CH_2C_6H_5)(CH_3)CH_2CH_2SO_3^-$], Amido Betaine C (Zohar Dallia)—Coconut amido alkyl beatine, Amphosol CB3 (Stepan Europe) alkyl amido propyl betaine, Amphoteen 24 (Akzo Nobel) $C_{12}$-$C_{14}$ alkyldimethylbetaine, Betadet SHR (Kao Corporation, S.A.), Cocoamidopropyl hydroxysultaine, and Dehyton MC (Cogis IB) sodium cocoamplioacetate. A more complete list of surfactants that may be used as part of the organic matrix (including ionic, nonionic polymeric and those with a variety of functional groups) may be found in McCutcheons Emulsifiers and Detergents Vol. I, Int. Ed, 2002, The Manufacturing Confectioner Publishing Co. (ISBN 944254-84-5).

The organic matrix optionally comprises one or more bioactive compounds such as amino acids, peptides, polypeptides, proteins, enzymes, carbohydrates, nucleic acids, polynucleotides, lipids, phosolipids, steroids, vitamins, hormones or glucose phosphates.

The organic matrix may comprise low or high molecular weight organic compounds, e.g., having a molecular weight ranging from about 50 to about 1,000,000, e.g., from about 100 to about 100,000 or from about 500 to about 10,000. Non-limiting examples of low molecular weight organic compounds that may be used in the present invention as matrix material include fatty acids, in particular, fatty acids having at least about 8 carbon atoms. Low molecular weight compounds may ultimately be removed from the nanoparticles by sublimation or by being dissolved away. In addition, they may be ideal for surface passivation and redispersing the nanoparticles. Non-limiting examples of oligomers/polymers for use as the matrix material in the process of the present invention include homo- and copolymers (including polymers such as, e.g., random copolymers, block copolymers and graft copolymers) which comprise units of at least one monomer which comprises one or more oxygen atoms and/or one or more nitrogen atoms. A non-limiting class of preferred polymers for use in the present invention includes polymers that comprise at least one monomer unit having at least two atoms that are selected from oxygen and nitrogen. Corresponding monomer units may, for example, comprise at least one hydroxyl group, carbonyl group, ether linkage and/or amino group and/or one or more structural elements of the formulae: —COO—, —COC—, —O—CO—O—, —CO—O—CO—, —O—C—O—, —CONR—, —NR—CO—O—, —NR$^1$—CO—NR$^2$—, —CO—NR—CO—, —SO$_2$—NR— and —SO$_2$—O—, wherein R, R$^1$ and R$^2$ independently represent hydrogen and an organic radical (e.g., an aliphatic or aromatic, unsubstituted or substituted radical comprising from about 1 to about 20 carbon atoms).

Non-limiting examples of corresponding polymers include polymers comprising one or more units derived from the following groups of monomers:

(a) carboxylic acids of from about 3 to about 8 carbon atoms and salts thereof. This group of monomers includes, for example, acrylic acid, methacrylic acid, dimethylacrylic acid, ethacrylic acid, maleic acid, citraconic acid, methylenemalonic acid, allylacetic acid, vinylacetic acid, crotonic acid, fumaric acid, mesaconic acid and itaconic acid. The monomers of group (a) can be used either in the form of the free carboxylic acids or in partially or completely neutralized form. For the neutralization alkali metal bases, alkaline earth metal bases, ammonia or amines, e.g., sodium hydroxide, potassium hydroxide, sodium carbonate, potassium carbonate, sodium bicarbonate, magnesium oxide, calcium hydroxide, calcium oxide, ammonia, triethylamine, methanolamine, diethanolamine, triethanolamine, morpholine, diethylenetriamine or tetraethylenepentamine may, for example, be used;

(b) the esters, amides, anhydrides and nitriles of the carboxylic acids stated under (a) such as, e.g., methyl acrylate, ethyl acrylate, methyl methacrylate, ethyl methacrylate, n-butyl acrylate, hydroxyethyl acrylate, 2- or 3-hydroxypropyl acrylate, 2- or 4-hydroxybutyl acrylate, hydroxyethyl methacrylate, 2- or 3-hydroxypropyl methacrylate, hydroxyisobutyl acrylate, hydroxyisobutyl methacrylate, monomethyl maleate, dimethyl maleate, monoethyl maleate, diethyl maleate, maleic anhydride, 2-ethylhexyl acrylate, 2-ethylhexyl methacrylate, acrylamide, methacrylamide, N,N-dimethylacrylamide, N-tert-butylacrylamide, acrylonitrile, methacrylonitrile, 2-dimethylaminoethyl acrylate, 2-dimethylaminoethyl methacrylate, 2-diethylaminoethyl acrylate, 2-diethylaminoethyl methacrylate and the salts of the last-mentioned monomers with carboxylic acids or mineral acids and the quaternized products;

(c) acrylamidoglycolic acid, vinylsulfonic acid, allylsulfonic acid, methallylsulfonic acid, styrenesulfonic acid, 3-sulfopropyl acrylate, 3-sulfopropyl methacrylate and acrylamidomethylpropanesulfonic acid and monomers containing phosphonic acid groups, such as, e.g., vinyl phosphate, allyl phosphate and acrylamidomethylpropanephosphonic acid; and esters, amides and anhydrides of these acids;

(d) N-vinyllactams such as, e.g., N-vinylpyrrolidone, N-vinyl-2-piperidone and N-vinylcaprolactam; and (e) vinyl acetal, vinyl butyral, vinyl alcohol and ethers and esters thereof (such as, e.g., vinyl acetate, vinyl propionate and methylvinylether), allyl alcohol and ethers and esters thereof, N-vinylimidazole, N-vinyl-2-methylimidazoline, and the hydroxystyrenes.

Corresponding polymers may also contain additional monomer units, for example, units derived from monomers without functional group, halogenated monomers, aromatic monomers, etc. Non-limiting examples of such monomers include olefins such as, e.g., ethylene, propylene, the butenes, pentenes, hexenes, octenes, decenes and dodecenes, styrene, vinyl chloride, vinylidene chloride, tetrafluoroethylene, etc. Further, the polymers for use as matrix material in the processes and compositions of the present invention are not limited to addition polymers, but also comprise other types of polymers, for example, condensation polymers such as, e.g., polyesters, polyamides, polyurethanes and polyethers, as well as polysaccharides such as, e.g., starch, cellulose and derivatives thereof, etc. Other non-limiting examples of polymers which are suitable for use as matrix material in the present invention are disclosed in, e.g., U.S. Patent Application Publication 2004/0182533 A1, the entire disclosure whereof is expressly incorporated by reference herein.

Other preferred polymers that may be used according to the invention include water soluble polymers, such as poly(propylenoxide)amines, polyamines, polyalcohols, polyoxides, polyethers, polyacrylamides and polyacrylates.

Preferred polymers for use as matrix material in the present invention include those which comprise units derived from one or more N-vinylcarboxamides of formula (I)

$$CH_2=CH-NR^3-CO-R^4 \quad (I)$$

wherein $R^3$ and $R^4$ independently represent hydrogen, optionally substituted alkyl (including cycloalkyl) and optionally substituted aryl (including alkaryl and aralkyl) or heteroaryl (e.g., $C_{6-20}$ aryl such as phenyl, benzyl, tolyl and phenethyl, and $C_{4-20}$ heteroaryl such as pyrrolyl, furyl, thienyl and pyridinyl). $R^3$ and $R^4$ may, e.g., independently represent hydrogen or $C_{1-12}$ alkyl, particularly $C_{1-6}$ alkyl such as methyl and ethyl. $R^3$ and $R^4$ together may also form a straight or branched chain containing from about 2 to about 8, preferably from about 3 to about 6, particularly preferably from about 3 to about 5 carbon atoms, which chain links the N atom and the C atom to which $R^3$ and $R^4$ are bound to form a ring which preferably has about 4 to about 8 ring members. Optionally, one or more carbon atoms may be replaced by heteroatoms such as, e.g., oxygen, nitrogen or sulfur. Also optionally, the ring may contain a carbon-carbon double bond.

Non-limiting specific examples of $R^3$ and $R^4$ are methyl, ethyl, isopropyl, n-propyl, n-butyl, isobutyl, sec-butyl, tert-butyl, n-hexyl, n-heptyl, 2-ethylhexyl, n-octyl, n-decyl, n-undecyl, n-dodecyl, n-tetradecyl, n-hexadecyl, n-octadecyl and n-eicosyl. Non-limiting specific examples of $R^3$ and $R^4$ which together form a chain are 1,2-ethylene, 1,2-propylene, 1,3-propylene, 2-methyl-1,3-propylene, 2-ethyl-1,3-propylene, 1,4-butylene, 1,5-pentylene, 2-methyl-1,5-pentylene, 1,6-hexylene and 3-oxa-1,5-pentylene.

Non-limiting specific examples of N-vinylcarboxamides of formula (I) are N-vinylformamide, N-vinylacetamide, N-vinylpropionamide, N-vinylbutyramide, N-vinylisobutyramide, N-vinyl-2-ethylhexanamide, N-vinyldecanamide, N-vinyldodecanamide, N-vinylstearamide, N-methyl-N-vinylformamide, N-methyl-N-vinylacetamide, N-methyl-N-vinylpropionamide, N-methyl-N-vinylbutyramide, N-methyl-N-vinylisobutyramide, N-methyl-N-vinyl-2-ethylhexanamide, N-methyl-N-vinyldecanamide, N-methyl-N-vinyldodecanamide, N-methyl-N-vinylstearamide, N-ethyl-N-vinylformamide, N-ethyl-N-vinylacetamide, N-ethyl-N-vinylpropionamide, N-ethyl-N-vinylbutyramide, N-ethyl-N-vinylisobutyramide, N-ethyl-N-vinyl-2-ethylhexanamide, N-ethyl-N-vinyldecanamide, N-ethyl-N-vinyldodecanamide, N-ethyl-N-vinylstearamide, N-isopropyl-N-vinylformamide, N-isopropyl-N-vinylacetamide, N-isopropyl-N-vinylpropionamide, N-isopropyl-N-vinylbutyramide, N-isopropyl-N-vinylisobutyramide, N-isopropyl-N-vinyl-2-ethylhexanamide, N-isopropyl-N-vinyldecanamide, N-isopropyl-N-vinyldodecanamide, N-isopropyl-N-vinylstearamide, N-n-butyl-N-vinylformamide, N-n-butyl-N-vinylacetamide, N-n-butyl-N-vinylpropionamide, N-n-butyl-N-vinylbutyramide, N-n-butyl-N-vinylisobutyramide, N-n-butyl-N-vinyl-2-ethylhexanamide, N-n-butyl-N-vinyldecanamide, N-n-butyl-N-vinyldodecanamide, N-n-butyl-N-vinylstearamide, N-vinylpyrrolidone, N-vinyl-2-piperidone and N-vinylcaprolactam.

Particularly preferred polymers for use in the present invention include polymers that comprise monomer units of one or more unsubstituted or substituted N-vinyllactams, preferably those having from about 4 to about 8 ring members such as, e.g., N-vinylcaprolactam, N-vinyl-2-piperidone and N-vinylpyrrolidone. These polymers include homo- and copolymers. In the case of copolymers (including, for example, random, block and graft copolymers), the N-vinyllactam (e.g., N-vinylpyrrolidone) units are preferably present in an amount of at least about 10 mole-%, e.g., at least about 30 mole-%, at least about 50 mole-%, at least about 70 mole-%, at least about 80 mole-%, or at least about 90 mole-%. By way of non-limiting example, the co-monomers may comprise one or more of those mentioned in the preceding paragraphs, including monomers without functional group (e.g., ethylene, propylene, styrene, etc.), halogenated monomers, etc.

If the vinyllactam (e.g., vinylpyrrolidone)monomers (or at least a part thereof) carry one or more substituents on the heterocyclic ring, non-limiting examples of such substituents include alkyl groups (for example, alkyl groups having from 1 to about 12 carbon atoms, e.g., from 1 to about 6 carbon atoms such as, e.g., methyl, ethyl, propyl and butyl), alkoxy groups (for example, alkoxy groups having from 1 to about 12 carbon atoms, e.g., from 1 to about 6 carbon atoms such as, e.g., methoxy, ethoxy, propoxy and butoxy), halogen atoms (e.g., F, Cl and Br), hydroxy, carboxy and amino groups (e.g., dialkylamino groups such as dimethylamino and diethylamino) and any combinations of these substituents.

Non-limiting specific examples of vinyllactam polymers for use in the present invention include homo- and copolymers of vinylpyrrolidone which are commercially available from, e.g., International Specialty Products <www.ispcorp.com>. In particular, these polymers include:

(a) vinylpyrrolidone homopolymers such as, e.g., grades K-15 and K-30 with K-value ranges of from 13-19 and 26-35, respectively, corresponding to average molecular weights (determined by GPC/MALLS) of about 10,000 and about 67,000;

(b) alkylated polyvinylpyrrolidones such as, e.g., those commercially available under the trade mark GANEX® which are vinylpyrrolidone-alpha-olefin copolymers that contain most of the alpha-olefin (e.g., about 80% and more) grafted onto the pyrrolidone ring, mainly in the 3-position thereof; the alpha-olefins may comprise those having from about 4 to about 30 carbon atoms; the alpha-olefin content of these copolymers may, for example, be from about 10% to about 80% by weight;

(c) vinylpyrrolidone-vinylacetate copolymers such as, e.g., random copolymers produced by a free-radical polymerization of the monomers in a molar ratio of from about 70/30 to about 30/70 and having weight average molecular weights of from about 14,000 to about 58,000;

(d) vinylpyrrolidone-dimethylaminoethylmethacrylate copolymers;

(e) vinylpyrrolidone-methacrylamidopropyl trimethylammonium chloride copolymers such as, e.g., those commercially available under the trade mark GAFQUAT®;

(f) vinylpyrrolidone-vinylcaprolactam-dimethylaminoethylmethacrylate terpolymers such as, e.g., those commercially available under the trade mark GAFFIX®;

(g) vinylpyrrolidone-styrene copolymers such as, e.g., those commercially available under the trade mark POLECTRON®; a specific example thereof is a graft emulsion copolymer of about 70% vinylpyrrolidone and about 30% styrene polymerized in the presence of an anionic surfactant; and (h) vinylpyrrolidone-acrylic acid copolymers such as, e.g., those commercially available under the trade mark ACRYLIDONE® which are produced in the molecular weight range of from about 80,000 to about 250,000.

In a preferred embodiment of the present invention, the matrix material implemented in the multi-component particles is wholly removable, or partially removable to a sufficient extent, to release the nanoparticles for further processing or for use. In one variation of this example, the matrix may comprise only material(s) designed to be removed at the same time. In another variation of this example, the matrix may include a material that is selectively removable relative to another material to provide enhanced access to the nanoparticles for intermediate processing prior to removal of other matrix material(s) to effect release of the nanoparticles. As another example, all or part of the matrix may be designed for permanent use. In one variation of this other example, the matrix is originally formed during the formation of the particles and may be designed to permanently maintain the nanoparticles in a fixed dispersion for some final application. In another variation of this other example, a portion of the matrix may be selectively removable relative to another portion of the matrix designed to be permanent, providing enhanced access to the nanoparticles for purposes of intermediate processing prior to final use or for purposes of a final use.

An important aspect of the present invention is that the process allows for control of the ratio of distributed nanoparticulates relative to the matrix material in the final multi-component particle. This is important (along with other processing parameters) for the determination of the properties of the final multi-component particles. For example, in one embodiment, a minimal amount of matrix material is used to prevent the connecting or contacting between adjacent nanoparticulates. The prevention of the nanoparticle from agglomerating may be important for final applications wherein the nanoparticles will be released (dispersed) from the matrix to form a dispersion of nanoparticles. In general, the smaller the size of the nanoparticles, the larger the surface area of the nanoparticles, and the more matrix material that is desired for complete coverage of the nanoparticles.

Depending on the matrix material used, one can make some simple assumptions regarding the thickness of a monolayer of matrix material that covers the surface of the nanoparticles. In addition, one may also assume that a minimum of one monolayer of an adsorptive substance around a metal core is needed to allow for complete disconnection of the nanoparticles. As used herein, the term "monolayer" means a two-dimensional film, one molecule (or monomer unit of a polymer) thick, situated at the surface of a nanoparticle. In a preferred embodiment, the nanoparticles are dispersable in a liquid medium to form dispersed nanoparticles having from about 1 to about 10 monolayers (e.g., from about 2 to about 8 or from about 3 to about 6 monolayers) disposed thereon, wherein the monolayers are formed from the organic matrix. Preferably, the monolayer(s) comprise at least one component (e.g., the major component) of the organic matrix.

For example, for silver nanoparticles distributed in a PVP matrix, usually not more than about 10 monolayers (and often not more than about 5 monolayers or even not more than about 2 monolayers) of adsorptive substance are desired to allow for subsequent dispersion and stabilization of the metal nanoparticles in solution. With this simple model one may estimate the amount of adsorptive substance that is needed to disperse metal nanoparticles of any size. For example, for PVP as the matrix material, one may assume that the thickness of a monolayer thereof is about 1 nm. Using the densities of silver (10.5 g/cm$^3$) and PVP (1.0 g/cm$^3$) one skilled in the art can calculate the weight percent of PVP relative to the weight percent silver for any diameter of silver particle at any number of monolayers of PVP coating the silver particle. Based on this model, for a PVP coated spherical silver core having a diameter of 20 nm, the minimum amount of PVP needed to disperse a dry particle is about 19% by weight. Preferably, not more than 10 monolayers or 41% by weight of PVP will be used. More preferably the PVP forms from about 2 to about 8 monolayers on the nanoparticle core. Most preferably, about 4 to about 8 monolayers or about 14.8% to about 32.5% by weight of PVP will be formed. For a 50 nm PVP-coated sphere-shaped silver nanoparticle core, a minimum of about 1.3% by weight of PVP will be needed to cover the nanoparticle completely with a monolayer. No more than about 14.8% by weight or 10 monolayers will usually be needed. Most preferably, about 5.3 to about 11.5% by weight of PVP is used (for about 4 to about 8 monolayers).

In most implementations of the invention, the multi-component particles will comprise a volume percentage of matrix in a range having an upper limit selected from the group consisting of 99 volume percent, 95 volume percent and 90 volume percent and having a lower limit selected from the group consisting of 1 volume percent, 20 volume percent, 60 volume percent, 70 volume percent and 75 volume percent. One particularly preferred implementation is for the matrix to comprise at least 70 volume percent and more preferably at least 75 volume percent of the multi-component particles, but also preferably with no greater than 95 volume percent and even more preferably no greater than 90 volume percent of matrix. In this discussion concerning volume percent, the pore volume in the multi-component particles are ignored, so that the volumes of the matrix and nanoparticles are included in determining the total volume of the multi-component particles used to determine the volume percentages of the nanoparticles and the matrix. On this basis, the sum of the volume fractions of the nanoparticles and the matrix add up to 100. It should be appreciated, however, that in some instances the multi-component particles resulting from the particle forming may contain significant porosity.

C. Composition and Properties of the Nanoparticles

As indicated above, the multi-component particles of the present invention include inorganic nanoparticles distributed in an organic matrix. As used herein, the term "inorganic nanoparticle" means a nanoparticle comprising at least one inorganic element, which optionally is a part of a larger chemical compound. In one embodiment the "inorganic nanoparticle" excludes carbon. It is contemplated, however, that the inorganic nanoparticle may include one or more organic components in addition to the inorganic element. For example, an inorganic nanoparticle may include one or more organometallic compounds or even one or more organometallic compounds in a mixture with one or more organic compounds.

In various embodiments, the size of the nanoparticles may vary widely. Optionally, the nanoparticles have a number average particle diameter of from about 1 nm to about 500 nm, e.g., from about 10 nm to about 150 nm or from about 30 nm to about 100 nm, based on electron microscopy. The nanoparticles have a d50 particle diameter, based on volume, greater than about 1 nm and less than 600 nm, e.g., greater than about 40 nm and less than 200 nm, as determined by light scattering techniques.

The distance between adjacent nanoparticles in the multi-component particle may vary widely depending on the desired end use for the multi-component particles. In one embodiment, the average distance between adjacent inorganic nanoparticles is less than the number average particle diameter of the inorganic nanoparticles, e.g., less than half the number average particle diameter based on electron microscopy. In terms of absolute numbers, the average distance between adjacent nanoparticles in the multi-component particles optionally is less than about 150 nm, e.g., less than about 100 nm, less than about 50 nm, less than about 10 nm, less than about 5 nm or less than about 1 nm. In terms of higher range limitations, the average distance between adjacent inorganic nanoparticles optionally is greater than the number average particle diameter of the inorganic nanoparticles (e.g., greater than twice the number average particle diameter). In terms of absolute numbers, the average distance between adjacent nanoparticles in the multi-component particles optionally is greater than about 1 nm, e.g., greater than about 5 nm, greater than about 10 nm, greater than about 50 nm, greater than about 100 nm or greater than about 150 nm.

In one embodiment, the nanoparticles may touch or even neck or sinter together. In one aspect of this embodiment, on average, at least about 10 percent, at least about 25 percent, at least about 50 percent, at least about 75 percent, at least about 90 percent or at least about 99 percent of the nanoparticles are touching at least one adjacent nanoparticle. In other aspects, optionally in combination with any of the above-disclosed lower range limitations, less than about 99, less than about 90, less than about 75, less than about 50, less than about 25, less than about 10, less than about 5, less than about 1, or less than about 0.1 percent of the nanoparticles are touching at least one adjacent nanoparticle.

The nanoparticles also may have a variety of particle size distributions. In one embodiment, the nanoparticles have a monomodal particle size distribution, meaning the particle size distribution has a generally Gaussian or log normal form. Alternatively, the nanoparticles have a multi-modal particle size distribution, meaning there are several modes of particle formation and growth, having two or more distributions of particle populations. For example, the particle size distribution optionally is bimodal, trimodal, etc. Depending on the desired application, a multi-modal particle size distribution may be desired over a monomodal distribution. For example, in layer formation the combination of different sizes will be more efficient at filling voids between particles and thus increase packing density.

If the nanoparticles have a monomodal particle size distribution, the Gaussian form may have a short, narrow distribution or a broad distribution. The sharpness or broadness of a particle size distribution may be determined by determining the difference between two different dx values (e.g., d30, d40, or d50 values, based on volume) for a given population of nanoparticles. In general, the smaller the difference between the two dx values, the sharper the distribution. Conversely, the greater the difference between the two dx values, the broader the distribution. In one aspect of the invention, the nanoparticles have a d40 particle size (e.g., particle diameter) and a d60 particle size (e.g., particle diameter) and the difference between the d60 particles size and the d40 particle size is from about 1 nm to about 400 nm, e.g., from about 2 to about 200 nm, from about 5 to about 50 nm, or from about 5 to about 10 nm. A narrow size distribution is useful when properties are affected by size, and a single type of property is desired. For example, a narrow particle size distribution may be desired when the nanoparticles are to be used as seeds for nanowire growth. Conversely, a broad particle size distribution may be desired for coatings or for dense film formation. The specifically desired particle size distribution of the nanoparticles may be controlled by selectively varying certain spray processing parameters, e.g., temperature, flow rate, nanoparticle precursor concentration, etc.

In one aspect, the nanoparticles of the present invention are spheroidal, meaning that they are generally of spherical shape, even if not perfectly spherical. Optionally, a majority of the nanoparticles have a morphology that is spherical, hollow, rod, flake, platelet, cubed or trigonal.

In a preferred embodiment, the inorganic nanoparticles in the multi-component particles comprise one or more metals, metal oxides, main group elements, metal mixtures or alloy materials or mixtures or combinations of these materials. Examples of inorganic materials for possible inclusion in nanoparticles include metallic materials, (including single metals, alloys and intermetallic compounds), ceramics, main group elements, such as Si, Ge and mixed main group materials or mixed metal/main group materials, such as CdSe, GaAs, and InP. Some examples of metallic materials for inclusion in nanoparticles include one or more of elemental silver, platinum, zinc, palladium, ruthenium, gold, copper, rhodium, tin, molybdenum, cobalt, iron, nickel, metal alloys including one or more of the foregoing and metal elements, and inter-metallic compounds including one or more of the foregoing metal elements. In a preferred embodiment, the inorganic nanoparticles comprise one or more of silver, copper, nickel, platinum, palladium, rhodium, ruthenium, cobalt, gold, iridium or a metal oxide thereof.

Some examples of ceramic materials for optional inclusion in the nanoparticles include one or more of oxides, sulfides, carbides, nitrides, borides, tellurides, selenides, phosphides, oxycarbides, oxynitrides, titanates, zirconates, stannates, silicates, aluminates, tantalates, tungstates, glasses, doped and mixed metal oxides. For example SiC, and BN are ceramics with high heat transfer coefficients and can be used in heat transfer fluids. Specific examples of some preferred oxides include silica, alumina, titania, magnesia, indium oxide, indium tin oxide and ceria. Moreover, the composition of the nanoparticles may be designed for any desired application. For example, alloy nanoparticles could include materials for hydrogen storage, such as $LaNi$, $FeTi$, $Mg_2Ni$, $ZrV_2$; materials for magnetic applications, such as, $CoFe$, $CoFe_2$, $FeNi$, $FePt$, $FePd$, $CoPt$, $CoPd$, $SmCo_5$, $Sm_2Co_{17}$, $Nd/B/Fe$. For example, the nanoparticles could be core shell particles, such as, metals coating metals ($Ag/Cu$, $Ag/Ni$), metals coating metal oxides ($Ag/Fe_3O_4$), metal oxides coating metals ($SiO_2/Ag$), metal oxides coating metal oxides ($SiO_2/RuO_2$), semiconductors coating semiconductors ($ZnS/CdSe$) or combinations of all these materials.

In another implementation, the nanoparticles comprise very small particles (less than 100 nm) having a high reflective index, such as $TiO_2$, $BaTiO_2$ and $ZnO$. These particles are incorporated in a polymer matrix and will increase the bulk refractive index of the polymer and therefore the use of the composite material for optical applications. Another application for these composite materials is in personal care products (sunscreens, etc.), where these materials will absorb UV radiation.

For example, the nanoparticles could include materials such as a semiconductor, a phosphor, an electrical conductor, a transparent electrical conductor, a thermochromic, an electrochromic, a magnetic material, a thermal conductor, an electrical insulator, a thermal insulator, a polishing compound, a catalyst, a pigment, or a drug or other pharmaceutical material.

In one particular implementation of the invention, the nanoparticles comprise phosphor materials. This embodiment may be desirable for applications in which the nanoparticles are to be used as phosphors in a display application. Phosphors are substances that are capable of luminescence. The luminescence involves emission of radiation in response to a stimulus or excitation. Preferred luminescence of phosphors for use with this implementation of the invention includes emission of visible light for use in display applications. Such phosphors may, for example, be cathodoluminescent, electroluminescent, photoluminescent or x-ray luminescent. Inorganic phosphor compositions typically include a host material and one or more dopants, also referred to as activator ions. Examples of host materials include yttrium oxides, yttrium oxysulfides, yttrium fluorides, gadolinium oxysulfides, sulfides (such as for example zinc sulfide, calcium sulfide and strontium sulfide), silicates (such as for example zinc silicate and yttrium silicate, thiogallates (such as for example strontium thiogallate and calcium thiogallate), gallates (such as for example zinc gallate, calcium gallate and strontium gallate), aluminates (such as for example barium aluminate and barium magnesium aluminate (BAM)), thioaluminates (such as for example barium thioaluminate), nitrides and oxynitrides (such as $Ba_2Si_5N_8$:Eu, $Ca_xSi_yN_z$:Eu, $Sr_xSiyNz$:Eu, $CaAlSiN_3$:Eu, $LaEuSi_2N_3O_2$), and borates (such as for example yttrium-gadolinium borate). Table 2 lists some non-limiting examples of inorganic phosphor materials, including host material and exemplary activator ions, and the type of excitation for luminescence.

TABLE 2

EXEMPLARY INORGANIC PHOSPHOR COMPOSITIONS FOR NANOPARTICLES

| HOST MATERIAL | ACTIVATOR ION(S) | EXCITATION MECHANISM |
|---|---|---|
| $Y_2O_3$ | Eu, rare earths, Tb | Cathodoluminescent, Photoluminescent |
| $Y_2O_2S$ | Eu, Tb | Cathodoluminescent |
| ZnS | Au, Al, Cu, Ag, Cl, Mn | Cathodoluminescent, Electroluminescent |
| $SrGa_2S_4$ | Eu, Ce | Cathodoluminescent, Electroluminescent |
| $Y_3Al_5O_{12}$ | Tb, Cr | Cathodoluminescent, Photoluminescent |
| $Y_3(Ga,Al)_5O_{12}$ | Tb, Cr | Cathodoluminescent, Photoluminescent |
| $Zn_2SiO_4$ | Mn | Cathodoluminescent, Photoluminescent |
| $Y_2SiO_5$ | Tb, Ce | Cathodoluminescent |
| BaS | Eu, Ce | Electroluminescent |
| CaS | Eu, Ce | Electroluminescent |
| SrS | Eu, Ce | Electroluminescent |
| $CaGa_2S_4$ | Eu, Ce | Electroluminescent |
| $ZnGa_2O_4$ | Mn, Cr | Electroluminescent |
| $CaGa_2O_4$ | Eu, Ce | Electroluminescent |
| $SrGa_2O_4$ | Eu, Ce | Electroluminescent |
| $Ga_2O_3$ | Dy, Eu | Electroluminescent |
| $Ca_3Ga_2O_6$ | Eu, Ce | Electroluminescent |
| $Zn_2GeO_4$ | Mn | Electroluminescent |
| $Zn_2(Ge,Si)O_4$ | Mn | Electroluminescent |
| (Y,Gd)$BO_3$ | Eu, Tb | Photoluminescent |
| $BaMgAl_{10}O_{17}$ | Mn, Eu | Photoluminescent |
| $BaAl_xO_y$ | Mn | Photoluminescent |
| $Gd_2O_2S$ | Tb | X-ray |
| (Y,Gd)$_2SiO_5$ | Tb, Ce | X-ray |

In one particular implementation of the invention, the nanoparticles comprise luminescent lanthanide complexes, such as lanthanide B-diketonates, acetophenone complexes and cryptates.

In one particular implementation of the invention, the nanoparticles comprise catalyst compositions. Catalysts are substances that affect the rate of chemical reactions without themselves being consumed or undergoing chemical change. Nanoparticulate catalysts have an advantage of very large specific surface area, providing a large amount of catalytic surface area per unit mass of catalyst material. Preferred catalysts for use in nanoparticles of the invention include inorganic catalytic material, which may be either supported or unsupported. By a supported catalyst, it is meant that the catalytic material is supported by a support material, which imparts structural integrity to the composition. The support material may or may not affect the catalytic performance of the composition. By unsupported catalyst, it is meant that the catalytic material itself imparts structural integrity to the composition. Unsupported catalysts are also referred to as being self-supporting. Catalyst compositions may include only one catalytic material or may include multiple different catalytic materials. Supported catalyst compositions may include only one type of support material or may include multiple different types of support materials. In addition to catalytic material, and optionally support material, catalyst compositions may also optionally include one or more than one additive, such as one or more promoter.

The catalysts may be of any composition. For example, the nanoparticles could include an electrocatalyst material, some non-limiting examples of which include perovskite phase metal oxides (such as for example $La_{1-x}Sr_xFe_{0.6}Co_{0.4}O_3$ or $La_{1-x}Ca_xCoO_3$); and oxygen deficient Co—Ni—O spinels of the form $AB_2O_4$ where A is selected from divalent metals such as Mg, Ca, Sr, Ba, Fe, Ru, Co, Ni, Cu, Pd, Pt, Eu, Sm, Sn, Zn, Cd, Hg or combinations thereof and B is selected from trivalent metals such as Co, Mn, Re, Al, Ga, In, Fe, Ru, Os, Cr, Mo, W, Y, Sc, lanthanide metals and combinations thereof. Other examples include catalyst materials for water-gas shift reactions, auto-thermal reforming, steam reforming and hydrodesulfurization processes, some non-limiting specific compositional examples of which are shown in Table 3. Table 3 lists both supported and unsupported (self-supporting) catalyst materials. In the compositions of Table 3, γ-alumina (γ-$Al_2O_3$), magnesia (MgO), silica ($SiO_2$) and ceria ($CeO_2$) function as support materials. In Table 3, the first column identifies the general catalyst formulation(s), the second column identifies a catalytic application in which a catalyst of that formulation might be used, the third column provides some examples of specific catalyst compositions, the fourth column summarizes exemplary reaction temperatures during use of the catalyst in the identified catalytic application, and the fifth column notes general variations in catalyst manufacture conditions, to effect changes in the properties of the resulting catalyst composition.

In another particular embodiment of the invention, the nanoparticles comprise CaO. The CaO may be used to adsorb $CO_2$ and be used to shift the equilibrium of methane gas steam reforming to produce hydrogen more efficiently.

In another particular embodiment of the invention, the nanoparticles comprise Pt or Pt/Ru. The matrix in this case optionally comprises Nafion. The multiphase particle of Pt or Pt/Ru as nanoparticles and Nafion as the organic matrix could be used, for example, as electrocatalysts in fuel cell applications.

TABLE 3

EXEMPLARY CATALYST COMPOSITIONS FOR NANOPARTICLES

| Catalyst Formulations | Catalytic Rxn | Composition | Representative Catalytic Reaction Temps. | Variations in Catalyst Synthesis |
|---|---|---|---|---|
| AuNi/γ-alumina AuNi/MgO AuNi/$SiO_2$ | SR/HT WGSR | A) 10 wt. % Ni 0.2 wt. % Au B) 15 wt. % Ni, 0.3 wt. % Au | 650° C.-700° C. | Time, temperature of synthesis to vary dispersion and alloy stoichiometry |
| Ru/γ-alumina | SR/HT WGSR | 0.1-0.3 wt. % Ru | 650° C.-700° C. | Time, temperature of synthesis to vary dispersion |
| Ni/$CeO_2$/ γ-alumina | ATR | 5-15 wt. % Ni | 650° C.-750° C. | Time, temperature of synthesis to vary dispersion |
| NiRu/$CeO_2$/ γ-alumina (or other oxide ion conducting support) | ATR | A) 10 wt. % Ni 0.3 wt. % Ru B) 15 wt. % Ni, 0.5 wt. % Ru | 650° C.-750° C. | Time, temperature of synthesis to vary dispersion and alloy stoichiometry |
| Pt/$CeO_2$/ γ-alumina | LT WGSR | 0.1-0.3 wt. % Pt | 200° C.-300° C. | Time, temperature of synthesis to vary dispersion |
| PtRu/$CeO_2$/ γ-alumina | LT WGSR | 0.1-0.3 wt. % PtRu Pt:Ru = 50:50 | 200° C.-300° C. | Time, temperature of synthesis to vary dispersion and alloy stoichiometry |
| NiMo/γ-alumina | HDS | 15.0 wt. % $MoO_3$ 3.0 wt. % NiO | 400° C. | Time, temperature of synthesis to vary dispersion and alloy stoichiometry |
| NiMo high surface area self-supporting oxide | HDS | 85.0 wt. % $MoO_3$ 15 wt. % NiO | 400° C. | Time, temperature of synthesis to vary PSD, porosity, surface area |
| ZnO high surface area self-supporting oxide | HDS/Sulfur removal | 100% ZnO | 400° C. | Time, temperature of synthesis to vary PSD, porosity, surface area |

TABLE 3-continued

EXEMPLARY CATALYST COMPOSITIONS FOR NANOPARTICLES

| Catalyst Formulations | Catalytic Rxn | Composition | Representative Catalytic Reaction Temps. | Variations in Catalyst Synthesis |
|---|---|---|---|---|
| NiMo/ZnO | HDS/Sulfur removal | 3 wt. % $MoO_3$, 0.6 wt. % NiO 96.4 wt. % ZnO | 400° C. | Time, temperature of synthesis to vary PSD, porosity, surface area |

WGSR = water gas shift reaction
ATR = auto-thermal reforming
SR = steam reforming
LT = low temperature
HT = high temperature
HDS = hydrodesulfurization In one implementation of the invention, the nanoparticles comprise pigments. The pigments may be used in a variety of industries including but not limited to displays (AM-LCD), ink jet applications, electrophoretic applications, household cleaner/brighteners, printing documents, etc. Table 4 lists some non-limiting examples of inorganic pigment materials and the color imparted by the material. The development of pigments with particle sizes (e.g., diameters) below 50 nm would be desirable in order to produce images that have photo quality (high gloss), because the particle sizes are smaller than the wavelength of light. In addition, particles of this size will form more stable dispersions.

TABLE 4

EXEMPLARY PIGMENTS FOR NANOPARTICLES

| MATERIAL | FORMULA | COLOR |
|---|---|---|
| Iron Oxide (Hematite) | $Fe_2O_3$ | Red |
| Lead Molybdate | $PbMoO_4$ | Red |
| Cobalt Arsenate | $Co_3(AsO_4)_2$ | Violet |
| Iron Oxide (Magnetite) | $Fe_3O_4$ | Black |
| Iron-Chromium Oxide | $(Fe,Cr)_2O_3$ | Brown |
| Zinc Ferrite | $ZnFe_2O_4$ | Tan |
| Iron oxyhydroxide | FeOOH | Yellow |
| Lead Antimoniate | $Pb_3(SbO_4)_2$ | Yellow |
| Lead Chromate | $PbCrO_4$ | Yellow |
| Zinc Chromate | $ZnCrO_4$ | Yellow |
| Strontium Chromate | $SrCrO_4$ | Yellow |
| Nickel Titanate | $NiTiO_3$ | Yellow |
| Chrome Titanate | $CrTiO_3$ | Yellow |
| Cadmium Sulfide | CdS | Yellow |
| Chrome Oxide | $Cr_2O_3$ | Green |
| Cobalt Chromite | $CoCr_2O_4$ | Green |
| Cerium Sulfide | CeS | Red |
| Cobalt Aluminum Oxide | $CoAl_2O_4$ | Blue |
| Rutile | $TiO_2$ | White |
| Zinc Oxide | ZnO | White |
| Lead Carbonate | $PbCO_3$ | White |
| Zinc Sulfide | ZnS | White |
| Antimony Trioxide | $Sb_2O_3$ | White |
| Cobalt Stannate | $CoSnO_3$ | Blue |
| Ferrocyanide | $Fe(CN)_6$ | Blue |
| Carbon (in combination with one or more inorganic pigments) | C | Black |

In one particular implementation of the present invention, the nanoparticles comprise a combination of pigment materials. For example, the nanoparticles may comprise a combination of two or more of the inorganic pigments listed in Table 4 in order to create a color that cannot be created with a single inorganic pigment. As another example, the nanoparticles may contain an inorganic pigment, such as those listed in Table 4, combined with an organic pigment. A layer of organic pigment on an inorganic pigment may also aid dispersion of the pigment nanoparticles into a polymer, organic liquid or other organic medium.

In one particular implementation of the invention, the nanoparticles comprise semiconductor materials. Semiconductor materials in nanoparticulate form have a variety of uses including applications in solar cells and phosphors for diagnostic applications. Some examples of types of semiconductor materials include doped and undoped: IV semiconductors, II-IV semiconductors, II-VI semiconductors, III-V semiconductors and rare earth oxides. Specific non-limiting examples of semiconductor materials that may be used in the nanoparticles include silicon alloys, germanium alloys, PbS, PbO, HgS, ZnS, CdSe, CdTe, CdS:Mn, InP, InN, Ge, Si, $CeO_2$, $Cs_2O$, $Eu_2S_3$, $Eu_2O_3$, ZnO, GaP, and GaN.

In one particular implementation of the invention, the nanoparticles comprise inorganic compounds, inorganic coordination complexes, organometallic complexes or a combination thereof. For example, inorganic pharmaceuticals or bioactive metal complexes maybe incorporated as the nanoparticles. Examples include cisplatin, carboplatin, DWA-2114R (2-aminomethylpyrrolidine(1,1-cyclobutanedicarboxylato)Pt(II), or JM-221 (cis, trans, cis-[Pt($NH_3$)($C_6H_{11}NH_2$)(OC(O)$C_3H_7$)$_2Cl_2$]). The matrix for these types of materials may be selected for its ability to readily dissolve in the body, preferably in a controlled manner, so as to release the inorganic active ingredient (as nanoparticles) in a time-controlled manner.

In one particular implementation of the invention, the nanoparticles comprise magnetic materials. Magnetic materials in the nanoparticles have a variety of uses including applications in magnetic memory devices, magnetic inks, and magnetic fluids. Specific non-limiting examples include $Fe_2O_3$, $Fe_3O_4$, $Co_2O_3$, $Co_3O_4$, Ni, and Co.

In one particular implementation of the invention, the nanoparticles comprise super conductor materials, such as $Y_2Ba_2Cu_3O_7$, $La_2Ba_xCuO_4$, $Bi_2Sr_2Ca_2Cu_3O_{10}$, $Ti_2Ba_2Ca_2Cu_3O_{10}$ and $MgB_2$.

In one particular implementation of the invention, the nanoparticles comprise materials that have non-linear optical properties, such as $LiNbO_4$.

In one particular implementation of the invention, the nanoparticles comprise lasing materials, such as Nd:YAG, Mg:ZnO.

In one particular implementation of the invention, the nanoparticles comprise materials that have negative coefficients of expansion, such as YbGaGe, $TaO_2F$, $ZrW_2O_8$, $ZrMo_2O_8$ and $ZrV_2O_7$.

In one particular implementation of the invention, the nanoparticles comprise a transparent electrical conducting material. Transparent electrical conductors are useful in a variety of applications, such as for example in manufacturing displays and in photovoltaic cells. Table 5 lists some non-limiting examples of transparent conducting metal oxides that may be included in the nanoparticles.

TABLE 5

EXEMPLARY TRANSPARENT ELECTRICAL
CONDUCTORS FOR NANOPARTICLES

| MATERIAL | FORMULA |
| --- | --- |
| Zinc Oxide | ZnO |
| Indium Oxide | $In_2O_3$ |
| Tin Oxide | $SnO_2$ |
| Indium-Tin Oxide (ITO) | |
| Antimony-Tin Oxide (ATO) | |
| Cadmium-Oxide | CdO |
| Indium-Zinc Oxide | $In_2Zn_2O_5$ |

It should be understood that the materials listed above are non-limiting examples of materials that may be included in the nanoparticles, either as a sole material phase or as one of multiple material phases in the nanoparticles. In other embodiments, the nanoparticles may contain materials other than those previously noted that may be useful in a desired application of the nanoparticles. For example, in chemical mechanical polishing applications the nanoparticles may contain one or more hard materials such as metal oxides (e.g. silica, alumina, zirconia and ceria) carbides and nitrides. For absorbent applications, the nanoparticles may contain compounds such as zinc oxide, magnesium oxide, barium oxide, calcium oxide, copper oxide, silver oxide, barium carbonate, nickel oxide, iron oxide, zirconium oxide, manganese oxide and lithium oxide. Other non-limiting examples of applications for materials included in the nanoparticles include: anti-abrasive, electrochromic, thermochromic, electrically conductive, electrically resistive, dielectric, moisture absorbent, cosmetic, pharmaceutical and magnetic.

In most implementations of the invention, the multi-component particles will comprise a volume percentage of nanoparticles within a range having in any combination a lower limit selected from the group consisting of 1 volume percent, 5 volume percent and 10 volume percent and an upper limit selected from the group consisting of 99 volume percent, 80 volume percent, 50 volume percent, 30 volume percent and 25 volume percent. One particularly preferred implementation is for the nanoparticles to comprise up to 30 volume percent and more preferably up to 25 volume percent of the multi-component particles, but preferably also with at least 5, at least 10, at least 50, at least 60 or at least 75 volume percent nanoparticles. These lower volume fractions tend to favor formation of well distributed and more completely separated nanoparticulate domains in the multi-component particles. As the volume percentage of nanoparticles increases, the separation of the nanoparticulate domains tends to be less complete. For example, with greater than about 50 volume percent of nanoparticles in the multi-component particles, an interconnected network of the nanoparticles may often be favored, such as is described below with respect to FIG. 5.

D. Properties of the Multi-Component Particles

As indicated above, the multi-component particles may have a variety of different particle sizes. In one embodiment, the plurality of multi-component particles has a number average particle diameter of greater than about 0.1 μm and less than about 100 μm, e.g., greater than about 0.5 μm and less than about 25 μm, based on electron microscopy. The plurality of multi-component particles has a d50 particle diameter, based on volume, greater than about 0.1 μm and less than 150 μm, e.g., greater than about 0.5 μm and less than 50 μm or greater than about 0.7 μm and less than about 25 μm, as determined by light scattering techniques.

The multi-component particles also may have a variety of particle size distributions. In one embodiment, the multi-component particles have a monomodal particle size distribution, meaning the particle size distribution has a generally Gaussian form or log normal.

Alternatively, the multi-component particles have a multi-modal particle size distribution, meaning there are several modes of particle formation, and therefore producing 2 or more distributions of particle populations. For example, the particle size distribution optionally is bimodal, trimodal, etc. Depending on the application a bimodal size distribution may be desired over a monomodal distribution. For example, in layer formation the combination of different sizes will be more efficient at filling voids between particles and thus increase packing density.

If the multi-component particles have a monomodal particle size distribution, the Gaussian form may have a short, narrow distribution or a broad distribution. The sharpness or broadness of a particle size distribution may be determined by determining the difference between two different dx values (e.g., d30, d40, or d50 values based on volume) for a given population of multi-component particles. In general, the smaller the difference between the two dx values, the sharper the distribution. Conversely, the greater the difference between the two dx values, the broader the distribution. In one aspect of the invention, the multi-component particles have a d40 particle size (e.g., particle diameter) and a d60 particle size (e.g., particle diameter), and the difference between the d60 particles size and the d40 particle size is from about 0.5 μm to about 100 μm, e.g., from about 1 μm to about 80 μm or from about 5 μm to about 10 μm. The desirability of having a broad or narrow particle size distribution will vary depending on the application. A narrow size distribution is useful, for example, when properties are affected by size, and where a single type of property is needed. A broad particle size distribution may be desired, for example, for coatings or for dense film formation.

Figure 2:
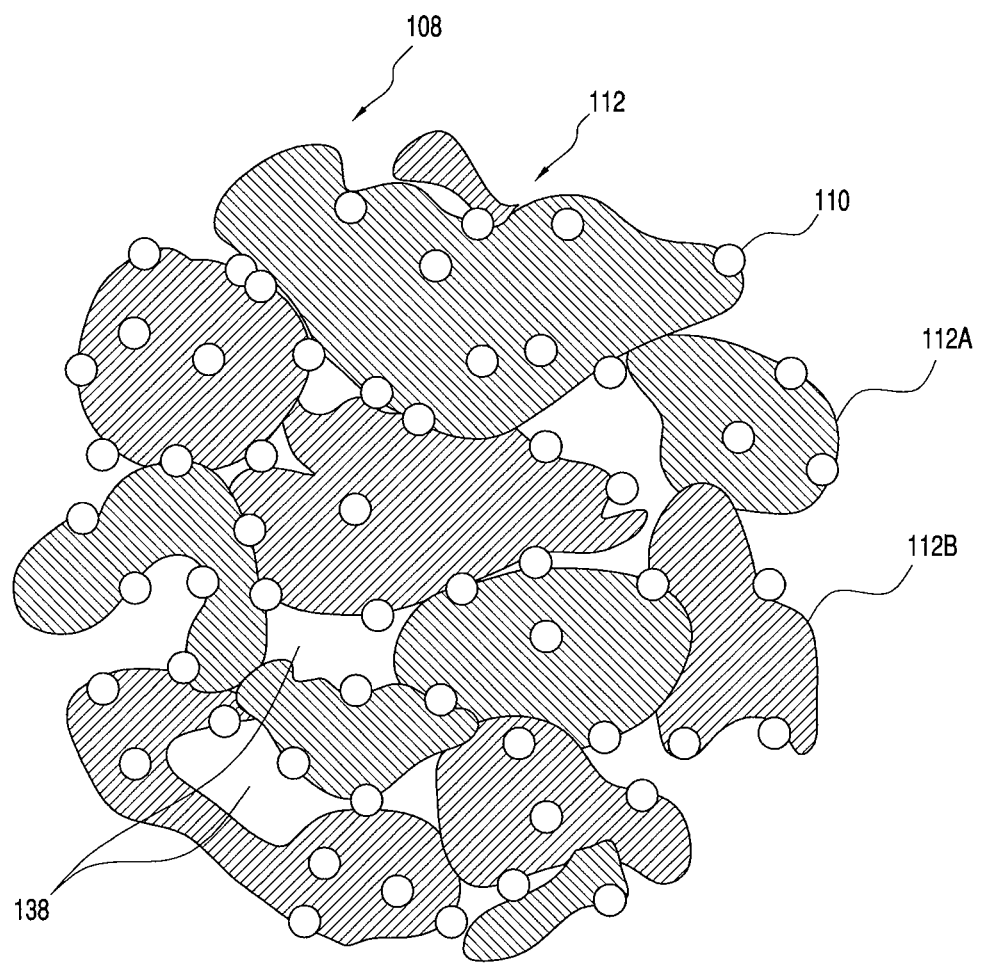
FIG. 2 shows one embodiment of a porous multi-component particle manufacturable using the process of the present invention.

In one embodiment of the invention, the matrix of the multi-component particles comprises multiple materials. FIG. 2 shows one embodiment of the multi-component particle 108 in which the matrix 112 includes different matrix materials in two different material phases 112A and 112B of the matrix 112. The two different material phases 112A and 112B together function to maintain the nanoparticles 110 in a distributed state. This particular embodiment of the multi-component particle 108 contains significant porosity 138 between the different material phases 112A and 112B of the matrix 112. The different material phases 112A and 112B, may be for example different organic salt materials, organic compounds, different polymers, or a surfactant and a polymer, or any other combination of different materials. The different material phases 112A and 112B may or may not be selectively removable from the multi-component particle 108. One of the material phases 112A and 112B may comprise a surface-modifying material that modifies a surface of the nanoparticles 110 when the multi-component particle 108 is decomposed to release the nanoparticles 110.

Figure 3:
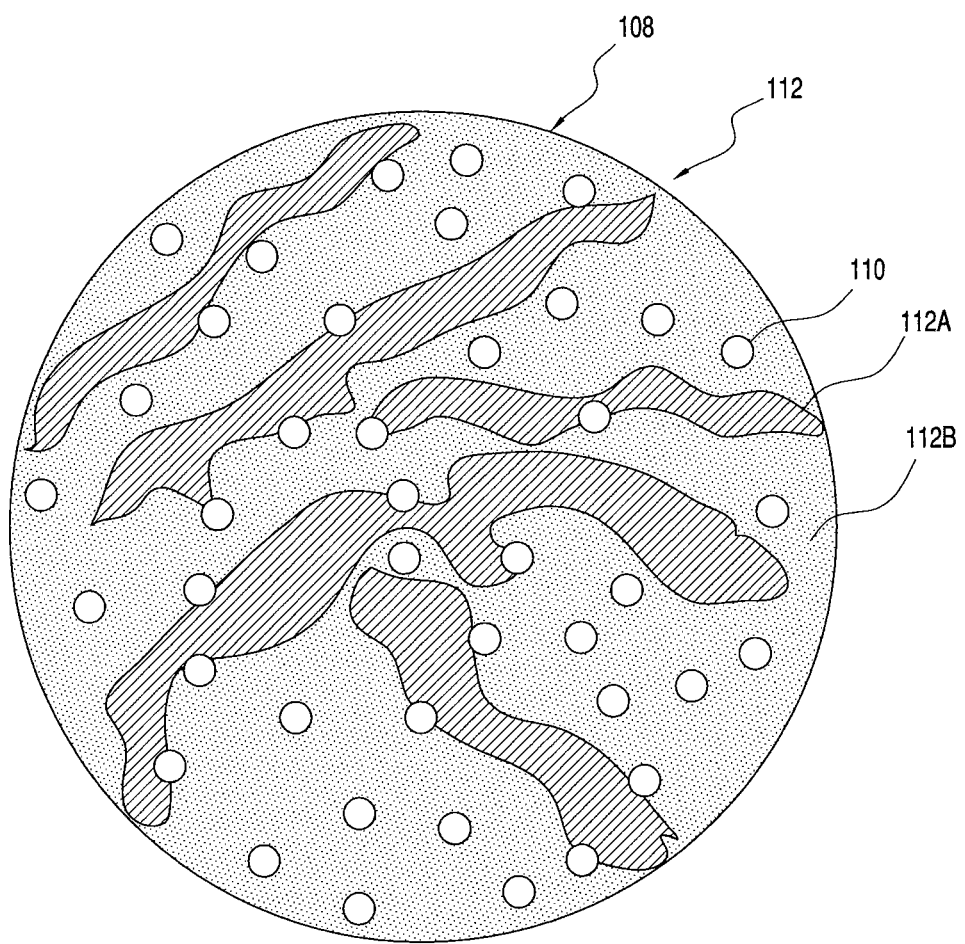
FIG. 3 shows one embodiment of a multi-component particle including two matrix materials that is manufacturable using the process of the present invention.

FIG. 3 shows another embodiment of the multi-component particle 108 in which the matrix 112 comprises the two different material phases 112A and 112B. The material phases 112A and 112B in the embodiment of FIG. 3, however, have different morphologies than in the embodiment of FIG. 2. Unlike FIG. 2, occurrences of the material phase 112A tend to be in elongated bands, while the other material phase 112B is more continuous. Again the material phases 112A and 112B may each be of any composition. For example, matrix phase 112A could be a polymer and the more continuous phase 112B of matrix 112 could be an organic salt.

Figure 4:
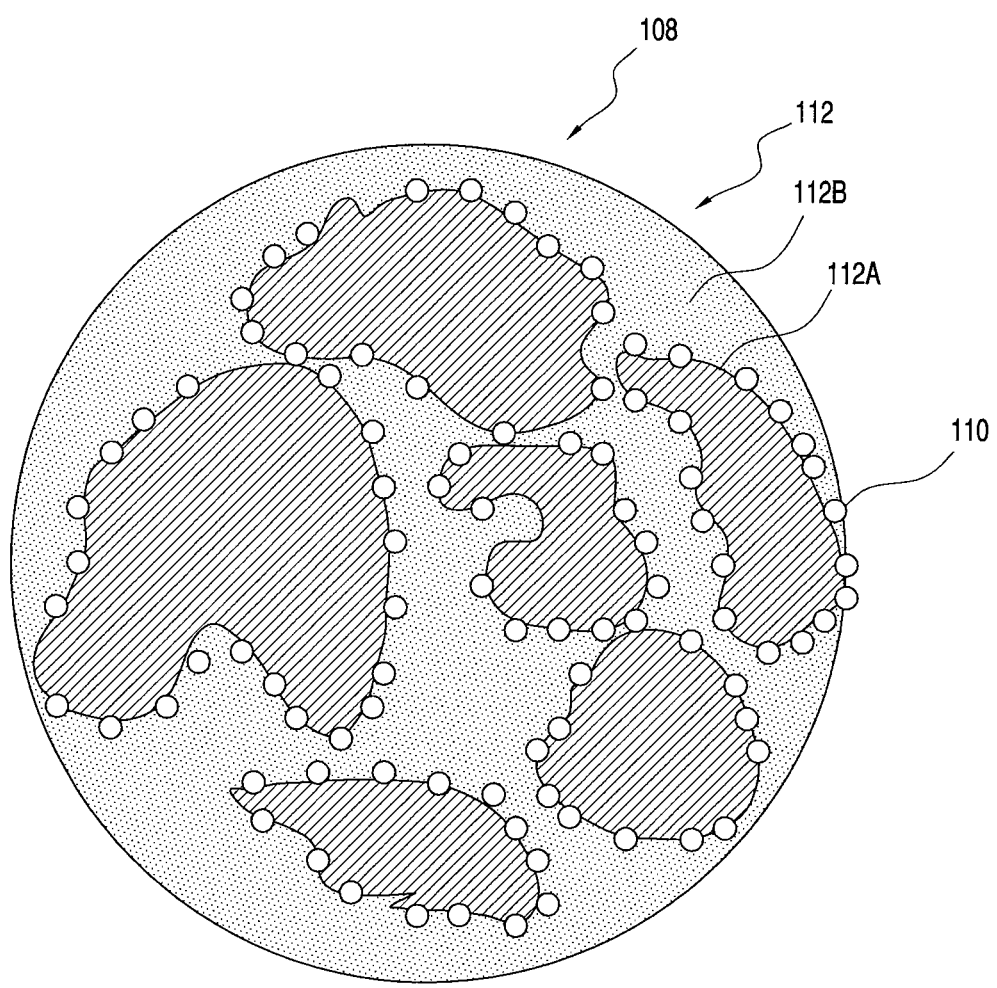
FIG. 4 shows one embodiment of a multi-component particle including two matrix materials that is manufacturable using the process of the present invention.

FIG. 4 shows yet another embodiment of the multi-component particle 108 in which the matrix 112 comprises the two different material phases 112A and 112B. In the embodiment shown in FIG. 4, the material phase 112A acts as a substrate for the nanoparticles 110 and the other material phase 112B of matrix 112 helps to keep the nanoparticles 110 separated. Again, the material phases 112A and 112B may be of any organic composition. For example, material phase 112A could be a polymer and the other material phase 112B could be an organic compound.

Figure 5:
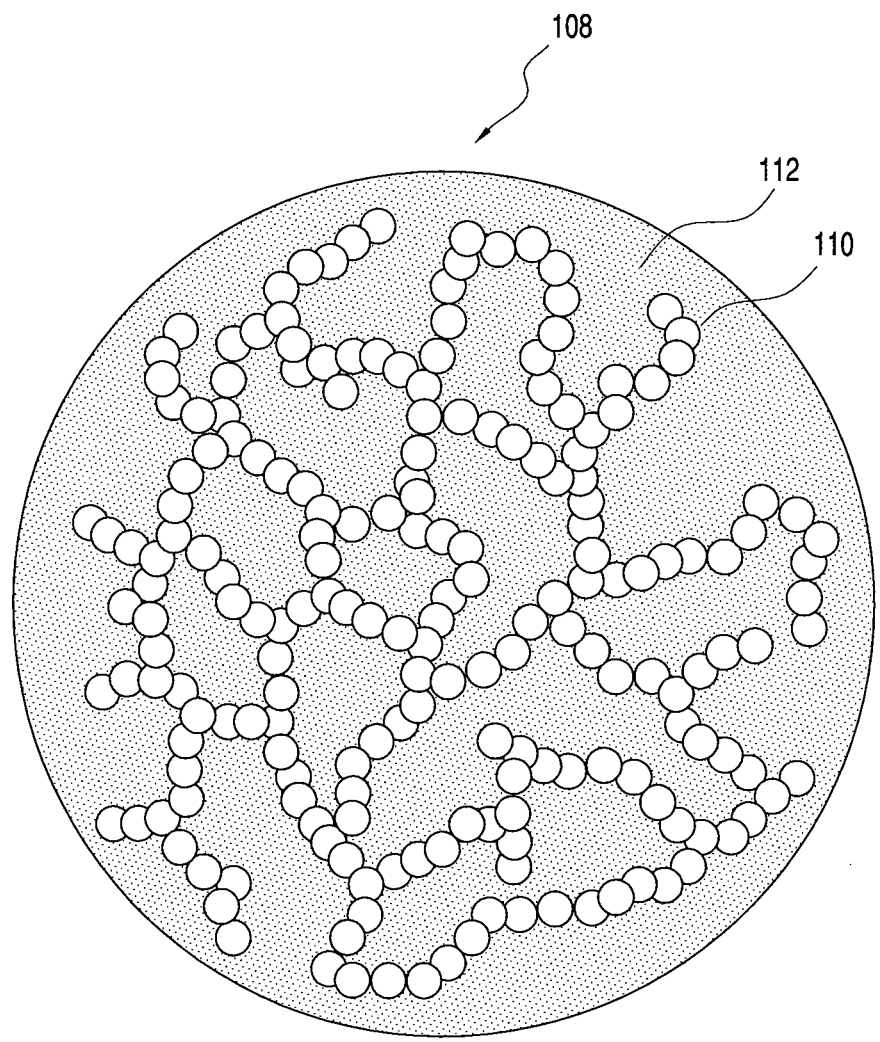
FIG. 5 shows one embodiment of a multi-component particle with an interconnected network of nanoparticles that is manufacturable using the process of the present invention.

FIG. 5 shows another embodiment of the multi-component particles in which the nanoparticles 110 are interconnected in a network. In the embodiment shown in FIG. 5, the matrix 112 maintains the nanoparticles 110 in a partially distributed state. The volume fraction of nanoparticles 110 in particle 108 is high enough that the nanoparticles 110 touch (i.e. are slightly necked) to form an interconnected network of nanoparticles 110. The particle morphology shown in FIG. 5 may be useful for making nanoparticles to be used in applications requiring large surface area, such as catalysts, sorbents or separation applications. As described above, matrix 112 may be used as an aid for delivering the interconnected network of nanoparticles 110 into a final product or application, and then removed to reveal the large surface area provided by the interconnected network of nanoparticles 110.

Figure 6:
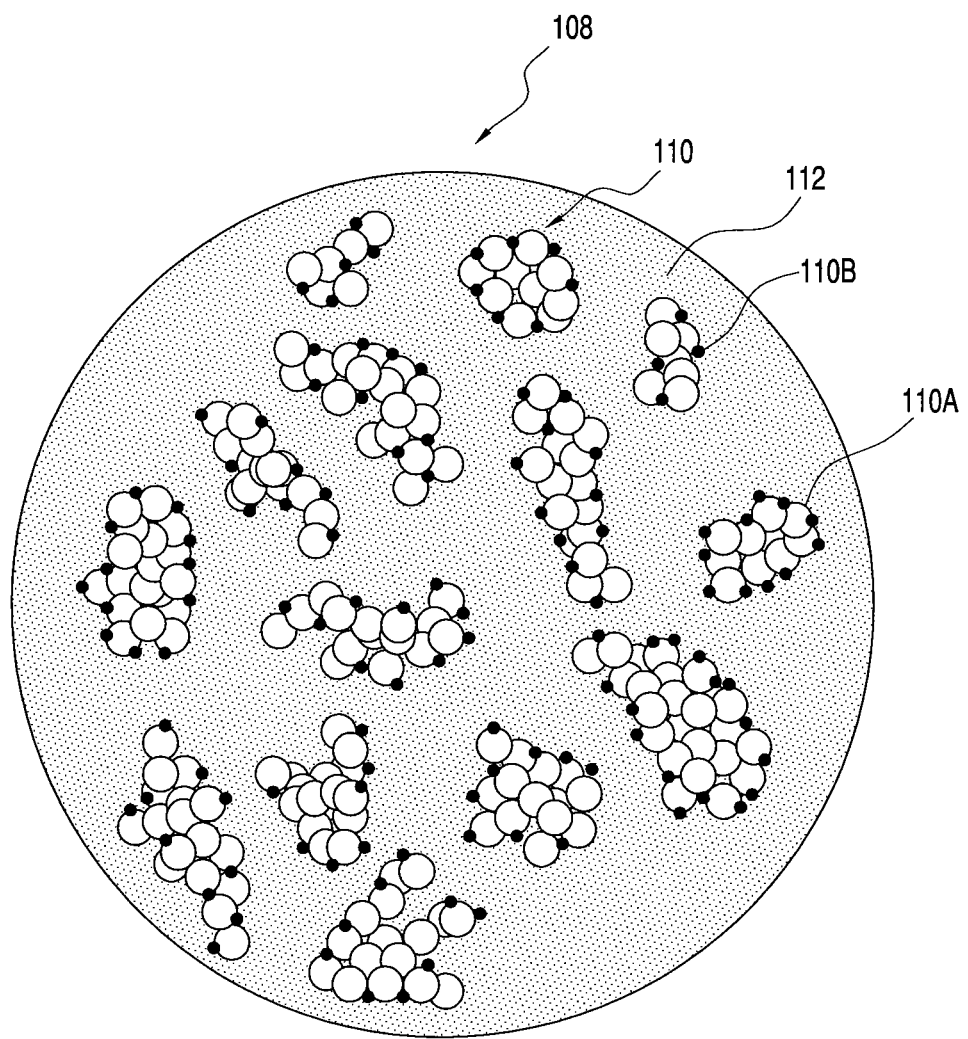
FIG. 6 shows one embodiment of a multi-component particle with two nanoparticles that is manufacturable using the process of the present invention.

FIG. 6 shows another embodiment of the present invention with a multi-component particle 108 having matrix 112 and nanoparticles 110 with two nanoparticles 110A and 110B. In the embodiment shown in FIG. 6, one material of the nanoparticles 110A is a collection of particles that have combined into a single amorphous unit. The second material of the nanoparticles 110B is dispersed on the first material 110A. The first material 110A of the nanoparticles acts as a substrate or a support for the second material 110B. The nanoparticles 110 shown in FIG. 6 could be formed for example if a first precursor to the nanoparticles reacts prior to reaction of a second precursor, so that the first precursor forms particles that combine to form the first material 110A, then a second precursor reacts to form the second material 110B on the first material 110A.

Figure 7:
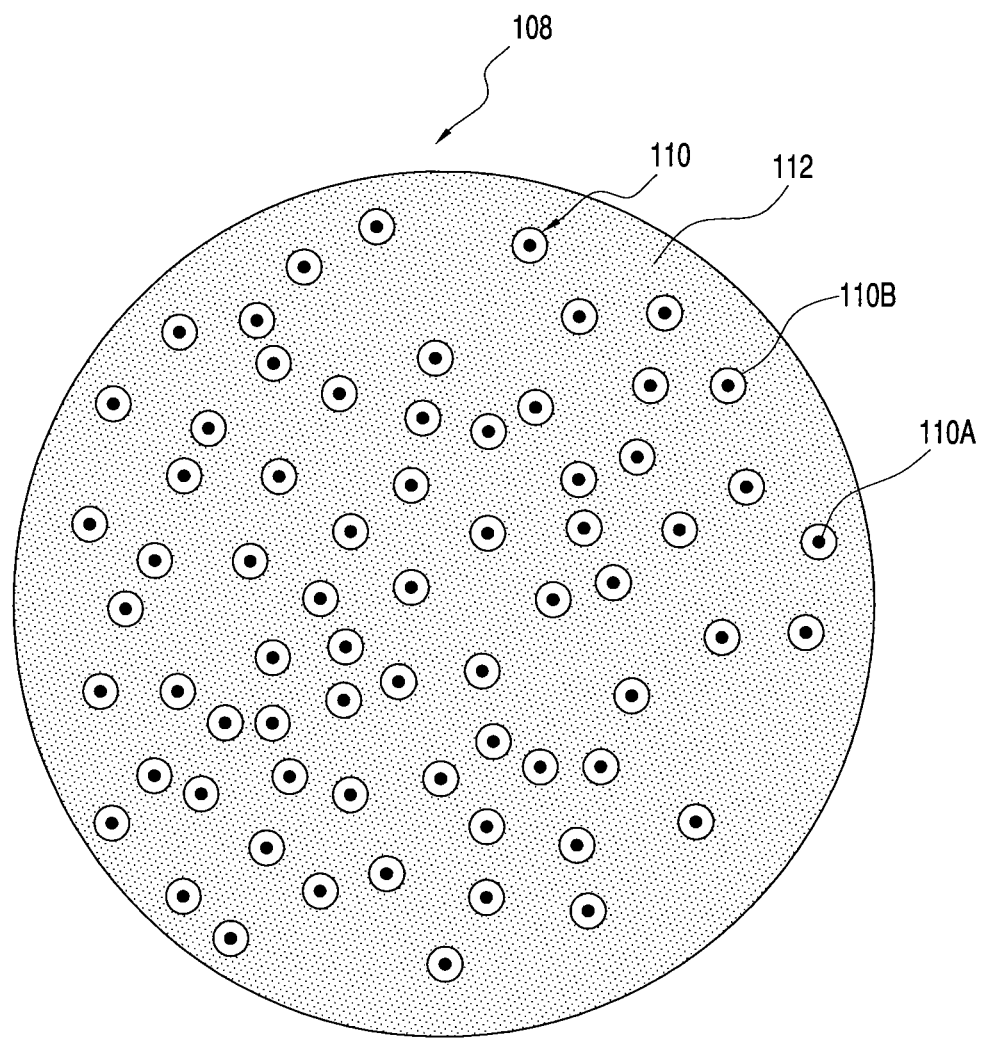
FIG. 7 shows one embodiment of a multi-component particle with two nanoparticles that is manufacturable using the process of the present invention.

FIG. 7 shows another embodiment of multi-component particles with a matrix 112 and nanoparticles 110 with two materials 110A and 110B. The first material 110A of nanoparticles 110 is a core that is covered with a shell of the second material 110B. The nanoparticles 110 shown in FIG. 7 could be formed if a first precursor to the nanoparticles 110 reacts prior to reaction of a second precursor, so that the first precursor forms the core material 110A, then a second precursor reacts to form the shell material 110B that covers the first material 110A.

It will be appreciated that FIGS. 2-7 are only non-limiting examples of some embodiments of multi-component particles of the invention having multiple matrix materials and nanoparticles. Other morphologies are possible. Moreover, although the embodiments of FIGS. 2-7 show only two material phases in the matrix or in the nanoparticles, the matrix or nanoparticles could include three or more material phases. Also, the particulate product of the invention comprising two or more materials in the matrix or in the nanoparticles need not comprise multiple material phases in the matrix. The multiple matrix and nanoparticles may be present in a single material phase. Also, the multi-component particles may have little or may have significant porosity, and the porosity may be open or closed and may comprise mesoporosity or microporosity.

Typically, the multi-component particles of the present invention are spheroidal, meaning that they are generally of spherical shape, even if not perfectly spherical. Optionally, a majority of the multi-component particles have a morphology that is spherical, hollow, rod, flake or platelet.

In another variation of the multi-component particles of the invention, some or all of the nanoparticles in the multi-component particles comprise one or more precursors that are reactable to modify the nanoparticles while the nanoparticles are maintained in the distributed state. The modification may involve surface modification of the nanoparticles, such as functionalization. Alternatively, the modification may involve compositional modification. As one example, the matrix could comprise monomers that are polymerizable and surround nanoparticles. As another example, the nanoparticles could comprise a metal oxide that is reducible to form metallic material in the nanoparticles. The reduction could be accomplished, for example, by thermal treatment at an elevated temperature and/or by introduction of a reducing agent, such as hydrogen gas that is infiltrated into the matrix or the matrix itself to contact the nanoparticles.

In another variation, the multi-component particles comprise a surface-modifying material, which may be present in the matrix, nanoparticles, or elsewhere in the multi-component particles. The multi-component particles are decomposable to release the nanoparticles, with at least a portion of the surface-modifying material associating with the nanoparticles to modify the surface of the nanoparticles. As one example, the surface modifying material may be a residual surfactant or dispersing agent that adheres to the surface of the nanoparticles. In another example, the surface-modifying material is reactable with a surface of the nanoparticles, before, during or after decomposition of the multi-component particles, to attach functional groups to the surface of the nanoparticles through chemical bonding.

In another variation, some portion or substantially all material of the matrix in the multi-component particles is removable by a technique other than by dissolution in a liquid. Matrix material may be removable, for example, by sublimation, melting, decomposition or chemical removal (e.g., by reacting the material away).

III. Processes for Making the Multi-Component Particles

A. Overview

Several embodiments of the present invention are directed to processes for making multi-component particles comprising inorganic nanoparticles distributed in an organic matrix. In one embodiment, for example, the process includes a first step in which an aerosol comprising droplets is generated. The droplets comprise a liquid vehicle, an inorganic nanoparticle precursor and an organic matrix precursor. In a second step, at least a portion of the liquid vehicle is removed from the droplets under conditions effective to convert at least a portion of the organic matrix precursor to the organic matrix and to convert at least a portion of the inorganic nanoparticle precursor to the inorganic nanoparticles distributed in the organic matrix. In another embodiment, the removing of at least a portion of the liquid vehicle occurs, at least in part, before the organic matrix precursor is converted to the organic matrix and before the inorganic nanoparticle precursor is converted to the inorganic nanoparticles distributed within the matrix.

In another embodiment, the nanoparticles are formed prior to the step of generating the aerosol. In this embodiment, the droplets comprise a liquid vehicle, inorganic nanoparticles and an organic matrix precursor. In this aspect of the invention, the removing of at least a portion of the liquid vehicle from the droplets occurs under conditions effective to convert at least a portion of the organic matrix precursor to the organic matrix and to distribute the nanoparticles within the matrix.

B. Preparation of the Precursor Medium

In each of the processes for forming the multi-component particles, an aerosol is formed from a "precursor medium," defined herein as a flowable medium comprising: (1) a sufficient amount of a liquid vehicle to impart flowability to the medium; and (2) one or more precursors. As used herein, the unmodified term "precursor" means a compound that has a first form in the precursor medium, at least momentarily, which may be converted to a second form (which may be different from the first form) in the final multi-component particles of the present invention. Two preferred types of precursors, either, neither, or both of which may be present in the precursor medium, include: (1) an inorganic nanoparticle precursor; and (2) a matrix precursor. As their names suggest, the inorganic nanoparticle precursor is converted to inorganic nanoparticles in the final multi-component particles, and the matrix precursor is converted to the matrix in the multi-component particles. The precursor medium may comprise one or more than one precursor (e.g., matrix precursor, nanoparticle precursor, or other precursor composition), and/or one or more additives.

In one preferred embodiment, the precursor medium includes at least two precursors, and even more preferably at least one precursor for a material to be included in the nanoparticles and at least one other precursor for a material to be included in the matrix. The relative proportions of the nanoparticulate precursor(s) and matrix precursor(s) in the precursor medium will, therefore, vary depending upon the relative proportions of nanoparticle(s) and matrix material(s) in the final particles and also on the nature of the particular precursors to those materials that are included in the precursor medium. The precursors should be included in the precursor medium in relative proportions to provide the proper relative proportions of the nanoparticle and the matrix material in the particles made during the forming particle. The amount of a precursor included in the precursor medium will be selected to provide the desired amount of the final material in the multi-component particles. For example, if the multi-component particles are to contain certain weight percentages respectively of a nanoparticle and a matrix material, then the relative quantities of nanoparticle precursor and matrix precursor should be properly proportioned in the precursor medium to provide the proper weight fractions, taking into account any reactions that are involved in converting the nanoparticulate and matrix precursors into the respective nanoparticulate and matrix materials in the resulting multi-component particles.

The precursor medium should also have properties that are conducive to efficient formation of the desired droplets of the precursor medium during the step of generating the aerosol. The desired properties of the precursor medium for droplet generation may vary depending upon the specific composition of the precursor medium and the specific apparatus used to generate droplets for the aerosol. Some properties that may be important to droplet generation include the viscosity and surface tension properties of the liquid vehicle, the proportion of liquid vehicle and solids, when present, in the precursor medium, and the viscosity, flowability and density of the precursor medium. Some properties, such as viscosity and flowability of the precursor medium, may be affected by the temperature of the precursor medium. Accordingly, if it is desired to reduce the viscosity of the precursor medium to achieve more effective droplet generation, the precursor medium may be preheated to an elevated temperature at which the precursor medium has a reduced viscosity. Alternatively, if a higher viscosity is desired, the precursor medium could be pre-cooled to an appropriate depressed temperature at which the precursor medium has an increased viscosity. Typically, when the droplets are generated, the precursor medium will have a viscosity of less than 1000 centipoise and usually less than 100 centipoise. If the precursor medium contains a particulate precursor, the precursor medium should be sufficiently viscous enough to avoid significant settling of particles in the precursor medium during processing.

1. Liquid Vehicle

In a preferred embodiment, the precursor medium comprises a liquid vehicle, which imparts flowability to the medium. The liquid vehicle may be any liquid that is convenient and compatible for processing precursor(s) and reagent(s) that are to be included in the precursor medium to make the multi-component particles. The liquid vehicle may comprise a single liquid component, or may be a mixture of two or more liquid components, which may or may not be mutually soluble in the proportions of the mixture. The use of a mixture of liquid components is useful, for example, when the precursor medium includes multiple precursors (e.g., an organic matrix precursor and an inorganic nanoparticle precursor), with one precursor having a higher solubility in one liquid component and the other precursor having a higher solubility in another liquid component. As one example, a first precursor may be more soluble in a first liquid component of the liquid vehicle and a second precursor may be more soluble in a second liquid component of the liquid vehicle, but the two components of the liquid vehicle may be mutually soluble so that the liquid vehicle has only a single liquid phase of the first liquid component, the second liquid component and the two dissolved precursors. Alternatively, the liquid vehicle may have two liquid components that are not mutually soluble, so that the liquid vehicle has two, or more, liquid phases (e.g., an emulsion) with one precursor dissolved in one liquid phase, for example a continuous phase, and a second precursor dissolved in a second liquid phase, for example a dispersed phase of an emulsion.

In some cases, the liquid vehicle may be selected to act as a solvent for one or more than one precursor to be included in the precursor medium, so that in the precursor medium all or a portion of the one or more than one precursor will be dissolved in the precursor medium. In other cases, the liquid vehicle will be selected based on its volatility. For example, a liquid vehicle with a high vapor pressure may be selected so that the liquid vehicle is easily vaporized and removed from the droplets to the gas phase of the aerosol during the formation of the particles. In other cases, the liquid vehicle may be selected for its hydrodynamic properties, such as viscosity characteristics of the liquid vehicle. For example, if one or more than one precursor is to be included in the precursor medium in the form of dispersed particulates (such as for example colloidal-size particles dispersed in the liquid vehicle), a liquid vehicle having a relatively high viscosity may be selected to inhibit settling of the precursor particles. As another example, a liquid vehicle with a relatively low viscosity may be selected when it is desired to produce smaller droplets of precursor medium during the generating of the aerosol. In still other cases, the liquid vehicle may be selected to reduce or minimize contamination of the multi-component particles and/or production of undesirable byproducts during the generating of the aerosol or the formation of the multi-component particles, especially when using organic components in the liquid vehicle.

The liquid vehicle may be an aqueous liquid, an organic liquid or a combination of aqueous and organic liquids. Aqueous liquids are generally preferred for use as the liquid vehicle in most situations because of their low cost, relative safety and ease of use. For example, water has the advantage of being non-flammable, and when vaporized during the formation of the particles does not tend to contribute to formation of byproducts that are likely to complicate processing or contaminate particles. Moreover, aqueous liquids are good solvents for a large number of precursor materials, although attaining a desired level of solubility for some materials may involve modification of the aqueous liquid, such as pH adjustment.

In some situations, however, organic liquids are preferred for the liquid vehicle. This might be the case, for example, when it is desired to dissolve a precursor into the liquid vehicle in situations when the precursor is not adequately soluble in aqueous liquids, or when aqueous liquids are otherwise detrimental to the precursor. For example, an organic liquid vehicle might be necessary to solubilize a number of organic or organometallic precursor materials.

2. Matrix Precursor

Additionally, the precursor medium preferably comprises a matrix precursor. As used herein, a "matrix precursor" is a composition that can be converted to or forms the matrix in the multi-component particles. In a preferred embodiment, the matrix precursor undergoes a reaction to provide the matrix for the multi-component particles. For example, the matrix precursor optionally is thermally decomposed at elevated temperature or is reduced to form the matrix in the multi-component particles. In another embodiment, the matrix precursor could process without reaction. For example, the matrix precursor optionally is initially dissolved in the liquid vehicle, and a matrix precipitate of the matrix precursor is formed as the liquid vehicle is removed from the droplets, e.g., as the multi-component particles are formed. This might be the case, for example, when the matrix precursor comprises an organic salt, organic compound or a polymer dissolved in the liquid medium, which organic salt, organic compound or polymer precipitates out to form all or part of the matrix when the liquid vehicle is vaporized during the formation of the multi-component particles. As another example, the matrix precursor could volatilize, e.g., with the liquid medium, during the formation of the multi-component particles and then condense to form part of the multi-component particles. One particular implementation of this example is the use of a organic salt or organic compound precursor for the matrix that sublimes or vaporizes and then condenses onto the nanoparticles after formation of the nanoparticles. In another particular implementation of this example, the precursor medium comprises a matrix precursor and a nanoparticle precursor, both of which may volatilize, react if necessary, and then condense to form materials for inclusion in the multi-component particles.

Another example of a matrix precursor that may be processed without reaction comprises a solid matrix material suspended in the liquid vehicle. For example, the matrix precursor could be in the form of colloidal-size matrix particles in the precursor medium, which colloidal particles become part of the multi-component particles made during formation of the multi-component particles. This might be the case, for example, when the precursor medium contains colloidal polymer particles, which colloidal particles then form all or part of the matrix, with or without fusing together of the colloidal particles. When the precursor medium comprises colloidal-size particles, e.g., matrix particles, as discussed above, the precursor medium preferably comprises no more than 60, no more than 40 or no more than 20 weight percent of such colloidal-size particles. Moreover, such colloidal-size particles preferably having a weight average size of no larger than about 100 nm and more preferably having a weight average size of no larger than about 50 nm.

Additionally, if useful for subsequent processing or for use in a final application, the colloidal particles in the precursor medium could be surface modified or functionalized. By "functionalized," it is meant that chemical functional groups have been attached to the surface of the colloidal particles to provide some specific chemical functionality. Such chemical functionality may be designed to aid in the processing of the matrix precursor, to aid in subsequent processing of the multi-component particles, or for some purpose related to the application for which the multi-component particles are intended. Also, particulate matrix precursors may be in a form other than colloidal particles, such as for example in the form of fibers, nanotubes or flakes.

3. Inorganic Nanoparticle Precursor

In one embodiment, the precursor medium further comprises an inorganic nanoparticle precursor. As used herein, the term "inorganic nanoparticle precursor" means a compound that is dissolved or dispersed in the liquid vehicle, and which may be converted, at least in part, into inorganic nanoparticles in the final multi-component particles.

In a preferred embodiment, the nanoparticle precursor undergoes a reaction to provide the nanoparticles in the multi-component particles. For example, the nanoparticle precursor optionally is thermally decomposed at elevated temperature or is reduced to form the nanoparticles in the multi-component particles. In another embodiment, the nanoparticle precursor could be processed without reaction to form the nanoparticles. For example, the nanoparticle precursor optionally is initially dissolved in the liquid vehicle, and a nanoparticle precipitate of the nanoparticle precursor is formed as the liquid vehicle is removed from the droplets, e.g., as the multi-component particles are formed. This might be the case, for example, when the nanoparticle precursor comprises an inorganic composition, e.g., inorganic salt, dissolved in the liquid medium, which inorganic composition precipitates out to form all or part of the nanoparticles when the liquid vehicle is vaporized during the formation of the multi-component particles. As another example, the nanoparticle precursor could volatilize, e.g., with the liquid medium, optionally during the formation of the multi-component particles and then condense to form all or a portion of the nanoparticles. One particular implementation of this example is the use of an inorganic salt or inorganic compound precursor for the nanoparticles that sublimes or vaporizes and then condenses to form the nanoparticles, preferably before or during the formation of the matrix.

Table 6 shows some non-limiting examples of some compounds that may be used as nanoparticle precursors, and that would normally undergo reaction to form the nanoparticles during formation of the multi-component particles. The target material for which a listed nanoparticle precursor provides a component is also listed in Table 6.

TABLE 6

EXEMPLARY NANOPARTICLE PRECURSORS

| TARGET MATERIAL | EXAMPLES OF PRECURSORS |
| --- | --- |
| Platinum | Platinum hydroxide, chloroplatinic acid ($H_2PtCl_6 \cdot xH_2O$); tetraamineplatinum (II) nitrate ($Pt(NH_3)_4(NO_3)_2$); hydroxoplatinic acid ($H_2Pt(OH)_6$); platinum nitrates; platinum amine nitrates; platinum diamine nitrates (e.g. $Pt(NH_3)_4(NO_3)_2$); platinum tetrachloride ($PtCl_4$); sodium hexahydroxyplatinum ($Na_2Pt(OH)_6$); potassium hexahydroxyplatinum ($K_2Pt(OH)_6$) and $Na_2PtCl_4$ |
| Palladium | palladium (II) chloride ($PdCl_2$); palladium (II) nitrate ($Pd(NO_3)_2$); $H_2PdCl_4$; $Na_2PdCl_4$; $Pd(NH_3)_4Cl_2$; $Pd(NH_3)_2(OH)_2$ and palladium carboxylates |
| Ruthenium | ruthenium β-diketonates; ruthenium nitrosyl nitrate ($Ru(NO)(NO_3)_3$); potassium perruthenate ($K_3RuO_4$); sodium perruthenate ($Na_3RuO_4$); ($NH_4)_3Ru_2O_7$; $NH_4Ru_2O_7$; $Ru_3(CO)_{12}$ and ruthenium chloride ($RuCl_3$) |
| Gold | gold chloride ($AuCl_3$) and ammonium tetrachloroaurate (($NH_4$)$AuCl_4$) |
| Copper | copper carboxylates; copper acetate($Cu(OOCH_3)_2$); copper chloride ($CuCl_2$); copper nitrate ($Cu(NO_3)_2$), and copper perchlorate ($Cu(ClO_4)_2$) |
| Rhodium | rhodium chloride hydrate ($RhCl_3 \cdot xH_2O$); ammonium hexachlororhodium hydrate (($NH_4)_3RhCl6 \cdot xH_2O$) and rhodium nitrate ($Rh(NO_3)_3$) |
| Titanium | titanium (III) chloride ($TiCl_3$); titanium (IV) chloride ($TiCl_4$) and tetrachlorodianimmo titanium ($TiCl_4(NH_3)_2$) |
| Vanadium | vanadium (III) chloride ($VCl_3$); vanadium (IV) chloride ($VCl_4$); vanadium fluoride ($VF_4$) and ammonium vanadium oxide ($NH_4VO_3$) |
| Manganese | manganese (II) acetate hydrate ($MN(OOCCH_3)_2 \cdot xH_2O$); manganese (III) acetate hydrate ($Mn(OOCCH_3)_2 \cdot xH_2O$); manganese chloride hydrate ($MnCl_2 \cdot xH_2O$); manganese nitrate ($Mn(NO_3)_2$) and potassium permangate ($KMNO_4$) |
| Iron | iron acetate ($Fe(OOCCH_3)_2$); iron chloride hydrate ($FeCl_2 \cdot xH_2O$); iron chloride hydrate ($FeCl_3 \cdot xH_2O$); iron nitrate hydrate ($Fe(NO_3)_3 \cdot xH_2O$); iron (II) perchlorate hydrate ($Fe(ClO_4)_2 \cdot xH_2O$) and iron (III) perchlorate hydrate ($Fe(ClO_4)_3 \cdot xH_2O$) |
| Cobalt | cobalt acetate hydrate ($Co(OOCCH_3)_2 \cdot xH_2O$); cobalt chloride hydrate ($CoCl_2 \cdot xH_2O$) and cobalt nitrate hydrate ($Co(NO_3)\, xH_2O$) |
| Tungsten | tungsten oxychloride ($WOCl_4$) and ammonium tungsten oxide (($NH4)_{10}W_{12}O_{41}$) |
| Zinc | zinc acetate ($Zn(OOCCH_3)_2 \cdot xH_2O$); zinc chloride ($ZnCl_2$); zinc formate ($Zn(OOCH)_2$) and zinc nitrate hydrate ($Zn(NO_3)_2 \cdot xH_2O$). |
| Zirconium | zirconium chloride ($ZrCl_4$); zirconium hydride ($ZrH_2$) and zirconium dinitrate oxide ($ZrO(NO_3)_2 \cdot xH_2O$) |
| Niobium | niobium chloride ($NbCl_5$) and niobium hydride (NbH) |
| Molybdenum | molybdenum chloride; molybdenum hexacarbonyl ($Mo(CO)_6$); ammonium paramolybdate (($NH_4)Mo_7O_{24} \cdot xH_2O$); ammonium molybdate (($NH_4)_2Mo_2O_7$) and molybdenum acetate dimer ($Mo[(OCOCH_3)_2]_2$) |
| Tin | $SnCl_4AxH_2O$ |
| Osmium | $OsCl_3$ |
| Silver | complex silver salts ($[Ag(RNH_2)_2]^+$, $Ag(R_2NH)_2]^+$, $[Ag(R_3N)_2]^+$ where R = aliphatic or aromatic; $[Ag(L)_x]^+$ where L = ziridine, pyrrol, indol, piperidine, pyridine, aliphatic substituted and amino substituted pyridines, imidazole, pyrimidine, piperazine, triazoles, etc.; $[Ag(L)_x]^+$ where L = ethanolamine, glycine, gornamides, acetamides or acetonitrile); Silver nitrate ($AgNO_3$); Silver nitrite ($AgNO_2$); Silver oxide ($Ag_2O$, AgO); Silver carbonate ($Ag_2CO_3$); Silver oxalate ($Ag_2C_2O_4$); Silver trispyrazolylborate ($Ag[(N_2C_3H_3)_3]BH$); Silver tris(dimethylpyrazolyl)borate ($Ag[((CH_3)_2N_2C_3H_3)_3]BH$); Silver azide ($AgN_3$); Silver tetrafluoroborate ($AgBF_4$); Silver acetate ($AgO_2CCH_3$); Silver propionate ($AgO_2CC_2H_5$); Silver butanoate ($AgO_2CC_3H_7$); Silver ethylbutyrate ($AgO_2CCH(C_2H_5)C_2H_5$); Silver pivalate ($AgO_2CC(CH_3)_3$); Silver cyclohexanebutyrate ($AgO_2C(CH_2)_3C_6H_{11}$); Silver ethylhexanoate ($AgO_2CCH(C_2H_5)C_4H_9$); Silver neodecanoate ($AgO_2CC_9H_{19}$); Silver trifluoroacetate ($AgO_2CCF_3$); Silver pentafluoropropionate ($AgO_2CC_2F_5$); Silver heptafluorobutyrate ($AgO_2CC_3F_7$); Silver trichloroacetate ($AgO_2CCCl_3$); Silver 6,6,7,7,8,8,8-heptafluoro- |

TABLE 6-continued

EXEMPLARY NANOPARTICLE PRECURSORS

| TARGET MATERIAL | EXAMPLES OF PRECURSORS |
|---|---|
| | 2,2-dimethyl-3,5-octanedionate (AgFOD); Silver lactate ($AgO_2CH(OH)CH_3$); Silver citrate ($Ag_3C_6H_5O_7$); Silver glycolate ($AgOOCCH(OH)CH_3$); Silver benzoate ($AgO_2CCH_2C_6H_5$); Silver phenylacetate ($AgOOCCH_2C_6H_5$); Silver nitrophenylacetates ($AgOOCCH_2C_6H_4NO_2$); Silver dinitrophenylacetate ($AgOOCCH_2C_6H_3(NO_2)_2$); Silver difluorophenylacetate ($AgOOCCH_2C_6H_3F_2$); Silver 2-fluoro-5-nitrobenzoate ($AgOOCC_6H_3(NO_2)F$); Silver acetylacetonate ($Ag[CH_3COCH{=}C(O{-})CH_3]$); Silver hexafluoroacetylacetonate ($Ag[CF_3COCH{=}C(O{-})CF_3]$); Silver trifluoroacetylacetonate ($Ag[CH_3COCH{=}C(O{-})CF_3]$); Silver tosylate ($AgO_3SC_6H_4CH_3$); Silver triflate ($AgO_3SCF_3$); Silver sterate; Silver oleate; Silver dodecanoate |
| Nickel | Ni-nitrate ($Ni(NO_3)_2$); Ni-sulfate ($NiSO_4$); Nickel ammine complexes ($[Ni(NH_3)_6]^{n+}$(n = 2, 3)); Ni-tetrafluoroborate ($Ni(BF_4)_2$); Ni-oxalate; Ni-isopropoxide ($Ni(OC_3H_7)_2$); Ni-methoxyethoxide ($Ni(OCH_2CH_2OCH_3)_2$); Ni-acetylacetonate ($[Ni(acac)_2]_3$ or $Ni(acac)_2(H_2O)_2$); Ni-hexafluoroacetylacetonate ($Ni[CF_3COCH{=}C(O{-})CF_3]_2$); Ni-formate ($Ni(O_2CH)_2$); Ni-acetate ($Ni(O_2CCH_3)_2$); Ni-octanoate ($Ni(O_2CC_7H_{15})_2$); Ni-ethylhexanoate ($Ni(O_2CCH(C_2H_5)C_4H_9)_2$); Ni-trifluoroacetate ($Ni(OOCCF_3)_2$) |
| Chrome Oxide | $K_2Cr_2O_7$; chrome carboxylates; and chromium oxalate |
| Manganese Oxide | $KMnO_4$; manganese nitrate; manganese acetate; manganese carboxylates; manganese alkoxides; and $MnO_2$ |
| Tungsten Oxide | $Na_2WO_4$ and $W_2O_3$ |
| Molybdenum Oxide | $K_2MoO_4$ and $MoO_2$ |
| Cobalt Oxide | cobalt-amine complexes; cobalt carboxylates and cobalt oxides |
| Nickel Oxide | nickel-amine complexes; nickel carboxylates and nickel oxides |
| Copper Oxide | copper-amine complexes; copper carboxylates and copper oxides |
| Iron Oxide | iron nitrate |
| Carbon (in combination with inorganic nano-particles) | carboxylic acid; benzoic acid; polycarboxylic acids (e.g., terephthalic, isophthalic, trimesic and trimellitic acids); polynuclear carboxylic acids (e.g., napthoic acid) and polynuclear polycarboxylic acids |

Because of their lower cost, some preferred precursors from Table 6 include nitrates, acetates and chlorides. Not listed in Table 6 are precursors for phosphor materials, which include nitrates, hydroxides and carboxylates of yttrium, gallium, barium, calcium, strontium, germanium, gadolinium, europium, terbium, cerium, chromium, aluminum, indium, magnesium, praseodymium, erbium, thulium, praisadinium, manganese, silver, copper, zinc, sodium and dysprosium. Boric acid may be used with precursors for phosphors as a coreactant and/or a fluxing agent. Other inorganic salts may be included in the precursor medium, such as NaCl, KCl, KF, NaF, KI and NaI and may be used as coreactants and/or as fluxing agents.

The process can further be extended to cover inorganic nanoparticle precursors that are sensitive to oxidation or decomposition reaction pathways through reactions with $H_2O$ and/or $O_2$. In the preparation of these inorganic nanoparticle precursors, air/moisture sensitive techniques will be utilized, which techniques are referred to herein as "Schlenk techniques." Further, the inorganic nanoparticle precursors will then be dissolved in a liquid solution which has been purged of any $O_2/H_2O$ by an inert atmosphere gas of, for example, $N_2$ or Ar, or a reducing atmosphere $H_2$ or ammonia. The inorganic nanoparticle precursor in this embodiment optionally comprises any metal on the periodic table in combination with one or more of the following ligands: a halide, an amide (e.g., —$N(SiMe_3)_2$, —N(isopropyl)$_2$), an alkyl, aryls, alkoxides, thiolates, carboxylates, phosphines, phosphine oxides, nitriles, isonitriles, ethers or amines.

In one particular implementation of the invention, the inorganic nanoparticle precursor is accompanied by a surface modifying or encapsulating agent. The surface modifying or encapsulating agent can exist either as a separate moiety in the precursor medium (dissolved or undissolved therein) or as a part of the actual precursor material. An example of this is the synthesis of iron and iron oxide nanoparticles from an Fe(oleate)$_{2-3}$ nanoparticle precursor molecule. By adjusting the conditions, nanoparticles comprising Fe, $Fe_3O_4$, or $Fe_2O_3$ can be generated. Additionally, in this embodiment, the encapsulating moiety is a part of the original precursor material where the surface of the nanoparticle is coated with oleate.

The step of converting the inorganic nanoparticle precursor to the inorganic nanoparticles may occur in any of a number of steps according to the present invention. For example, the inorganic nanoparticles may be formed during the step of generating the aerosol, and/or during one or more subsequent processing steps. It is also contemplated that the inorganic nanoparticles may be formed from the inorganic nanoparticle precursor, at least in part, prior to the step of generating the aerosol. For example, the nanoparticles optionally are formed as the precursor medium is prepared. In this embodiment, the nanoparticles are formed from a nanoparticle precursor in situ within the precursor medium, at least in part, prior to the step of generating the aerosol from the precursor medium, as discussed in more detail below.

As previously noted, by nanoparticles it is meant particles having a number average particle diameter of less than about 500 nm, and typically in a range of from 1 nm to 500 nm, based on electron microscopy, although a particular diameter or diameter range might be more preferred for some applications. One particular advantage of the process of the present invention is the ability to make nanoparticles having a number average particle diameter of from about 50 nm to about 500 nm. Nonparticulates within this diameter range are difficult to make using other processes for making nanoparticles, which other processes often tend toward production of smaller, and often much smaller, nanoparticles.

Current processes (other than those of the present invention) often do not permit growth of the nanoparticles to these larger nanoparticulate sizes. With the present invention, however, there is a significant ability to control nanoparticulate growth through use of the matrix structure and process conditions. For example, smaller nanoparticles are generally favored for production in the gas phase during particle formation through the use of smaller proportions of nanoparticulate precursors to matrix precursors in the liquid medium and shorter residence times of the aerosol in a thermal zone during processing. Also, because of the retention of the nanoparticles in a distributed state by the matrix structure, with the present invention the nanoparticles may be subjected to additional processing steps, either during or after the step of forming the nanoparticles to promote growth of the nanoparticles to a desired size, such as for example by thermal treatment to permit controlled agglomeration or coalescence of smaller nanoparticulate domains to form larger nanoparticulate domains of a desired size.

For many applications, it is preferred to use nanoparticles having a number average particle diameter of generally larger than about 50 nm. One reason that nanoparticles of this size are preferred for many applications is because it is easier to handle the larger nanoparticles than the smaller nanoparticles that are smaller than about 50 nm. One advantage of the process of the present invention is that it is often controllable to make nanoparticles within a desired range. In one embodiment, the nanoparticles in the multi-component particles manufacturable using the process of the present invention have a number average particle diameter in a range having in any combination a lower limit selected from the group consisting of 50 nm, 55 nm, 60 nm, 65 nm, 70 nm and 75 nm and an upper limit selected from the group consisting of 500 nm, 450 nm, 400 nm, 350 nm, 300 nm, 250 nm and 200 nm. In one particularly preferred embodiment, the nanoparticles have a number average particle diameter of from 70 nm to 300 nm.

The processes of the present invention can also be used to make smaller-size nanoparticles, which may be preferred for some applications. In one embodiment, the nanoparticles in the multi-component particles manufacturable using the processes of the invention have a number average particle diameter in a range having in any combination a lower limit selected from the group consisting of 1 nm, 10 nm, 20 nm and 30 nm and an upper limit selected from the group consisting of 150 nm, 100 nm, 75 nm and 50 nm.

In like manner to the description above concerning manufacture of larger-size nanoparticles, the final size and other properties of these smaller-size nanoparticles may result from the step of generating the aerosol or from subsequent processing performed after the formation of the aerosol and/or optionally after the formation of the particles.

4. Preformed Inorganic Nanoparticles

Additionally or alternatively, the precursor medium further comprises inorganic nanoparticles. In this embodiment, the precursor medium comprises fine inorganic nanoparticles that are suspended therein, e.g., in the liquid vehicle. Optionally, the inorganic nanoparticles are formed prior to the step of preparing the precursor medium. In other words, the inorganic nanoparticles are first formed (preformed) and then are added to the liquid vehicle to form the precursor medium.

In this embodiment, the inorganic nanoparticles are suspended in the liquid vehicle. For example, the nanoparticle could be in the form of colloidal-size nanoparticles in the precursor medium, which colloidal nanoparticles become part of the multi-component particles made during formation of the multi-component particles. In this embodiment, colloidal inorganic nanoparticles may form all or part a part of the nanoparticles in the final multi-component particles. In one embodiment, the nanoparticles in the colloidal dispersion agglomerate and/or fuse together to form larger inorganic nanoparticles in the final multi-component particles. In one embodiment, the nanoparticles in the colloidal dispersion seed the growth of other inorganic nanoparticles in the final multi-component particles. In this case the composition of the seeding nanoparticles may be different than the inorganic nanoparticles in the final multi-compont particles. Additionally, if useful for subsequent processing or for use in a final application, the colloidal nanoparticles in the precursor medium could be surface modified or functionalized. By "functionalized," it is meant that chemical functional groups have been attached to the surface of the colloidal nanoparticle to provide some specific chemical functionality. Such chemical functionality may be designed to aid in the processing of the nanoparticle precursor, to aid in subsequent processing of the multi-component particles, or for some purpose related to the application for which the multi-component particles are intended.

In another embodiment, as mentioned above, the inorganic nanoparticles are formed in situ within the precursor medium prior to the step of generating the aerosol from the precursor medium. In this embodiment, an inorganic nanoparticle precursor is added to the precursor medium. Once in the precursor medium, the inorganic nanoparticle precursor is converted to the inorganic nanoparticles prior to aerosol generation. In this embodiment, the conversion of the inorganic nanoparticle precursor to the inorganic nanoparticles may occur, for example, by contacting the inorganic nanoparticle precursor with a reducing agent under conditions effective to form the inorganic nanoparticles in the precursor medium. Optionally, the precursor medium is heated to facilitate the conversion of the inorganic nanoparticle precursor to the inorganic nanoparticles. Many processes are known for forming inorganic nanoparticles. See, for example, U.S. Patent Publications Nos. US 2003/0148024 A1, filed Oct. 4, 2002; US 2003/0180451 A1, filed Oct. 4, 2002; US 2003/0175411 A1, filed Oct. 4, 2002; US 2003/0124259, filed Oct. 4, 2002, US 2003/0108664 A1, filed Oct. 4, 2002, and US 2003/0161959 A1, filed Nov. 1, 2002, the entireties of which are incorporated herein by reference.

5. Other Additives

In addition to the above-described components, the precursor medium optionally includes one or more additives or reagents. In one embodiment, the additive ultimately will become distributed within (or become a part of) the organic matrix. In this aspect, the addive optionally comprises one or more of a surfactant, a reducing agent, a fluxing agent, an adhesion promoter or a hardening agent.

In one aspect of the invention, the precursor medium comprises one or more reagent additives, in addition to the liquid vehicle and precursor(s). As used herein, a "reagent additive" or a "reagent" in the precursor medium is a material, other than the liquid vehicle, that is included in the precursor medium for a reason other than to provide a component for inclusion in the particles made during the formation of the multi-component particles. Rather, the reagent additive serves another purpose that is beneficial to the formulation of the precursor medium or aids during processing to make the multi-component particles. An example of a reagent additive would be, for example, a base or acid material added to adjust solution pH of the liquid vehicle.

One important example of a reagent additive for some implementations of the invention is a reducing agent. The optional reducing agent may be in the form of a particulate suspended in the liquid vehicle or, more likely, will be dissolved in the liquid vehicle. The purpose of the reducing agent is to assist creation of an environment during formation of the multi-component particles that promotes formation of a material in a chemically reduced form that is desired for inclusion in the multi-component particles as the multi-component particles are formed. For example, the reducing agent may facilitate the conversion of the inorganic nanoparticle precursor to the inorganic nanoparticles and/or in the conversion of the matrix precursor to the matrix. In the former embodiment, the reducing agent is included to promote reduction of a metal oxide, salt or other inorganic nanoparticle precursor compound to the desired metallic form. A reducing agent does not necessarily reduce an oxidized material to form a desired reduced form of the material, but may simply change the chemistry of the precursor medium to favor the formation of the reduced form of the material, such as by scavenging or otherwise tying up oxidizing materials present in the environment. In some implementations, the reduced form of the material could be made without the use of the reducing agent by processing the aerosol at a higher temperature as the multi-component particles are formed, but use of the reducing agent permits the desired reduced form of the material to be made at a lower temperature. An important application is when making particles that include metallic nanoparticles and matrix including a material that cannot be effectively processed at high temperatures that may be required to prepare the metallic nanoparticles absent the use of a reducing agent. For example, use of a reducing agent may permit the processing temperature to be maintained below the melting temperature of the matrix precursor, e.g., an organic salt or organic compound, or below the decomposition temperature of the matrix material itself, whereas the processing temperature would exceed those limits without use of the reducing agent.

As an alternative to including a reducing agent in the precursor medium, a reducing agent could instead be included in the gas phase of the aerosol, such as for example using a nitrogen gas phase or other oxygen-free gas composition with addition of some hydrogen gas as a reducing agent. In other situations, the reduced form of the material could be formed even at the desired lower temperature using a nonoxidizing gas phase in the aerosol, such as pure nitrogen gas or some other oxygen-free gas composition. However, by including a reducing agent in the precursor medium, the use of a nonoxidizing gas phase or a reducing agent in the gas phase may often be avoided, and air may instead be used as the gas phase. This is desirable because it is usually much easier and less expensive to generate and process the aerosol using air. The reducing agent preferably donates electrons (is oxidized) and/or is a material that either reacts to bind oxygen or that produces decomposition products that bind with oxygen. The bound oxygen often exits in the gas phase in the form of one or more components such as water vapor, carbon dioxide, carbon monoxide, nitrogen oxides and sulfur oxides. Reducing agents included in the precursor medium optionally are carbon-containing materials, with carbon from the reducing agent reacting with oxygen to form carbon dioxide and/or carbon monoxide. The reducing agent may also contain hydrogen, which reacts with oxygen to form water. Table 7 shows some non-limiting examples of reducing agents that may be included in the precursor medium, typically dissolved in the liquid vehicle.

TABLE 7

EXEMPLARY REDUCING AGENTS

| MATERIALS | SPECIFIC EXAMPLES |
|---|---|
| Amines | Triethyl amine; Amino propanol |
| Boranes | Borane-tetrahydrofuran |
| Borane adducts | Trimethylamineborane |
| Borohydrides | Sodium borohydride, lithium borohydride |
| Hydrides | Tin hydride, lithium hydride, lithium aluminum hydride |
| Alcohols | Methanol, ethanol, isopropanol, terpineol, t-butanol, ethylene glycols, citrates, other polyols |
| Silanes | Dichlorosilane |
| Carboxylic acid | Formic acid |
| Aldehyde | Formaldehyde; octanal, decanal, dodecanal, glucose |
| Hydrazines | Hydrazine, hydrazine sulfate |
| Phosphorous compounds | Hypophosphoric Acid |

Table 8 shows non-limiting examples of some preferred combinations of reducing agents and inorganic nanoparticle precursors that may be included in the precursor medium for manufacture of a variety of metal nanoparticles.

TABLE 8

EXEMPLARY NANOPARTICLE PRECURSOR/REDUCING AGENT COMBINATIONS

| NANOPARTICLE PRECURSOR | REDUCING AGENT |
|---|---|
| Most Metal Nitrates | Amines (e.g. triethylamine), ethylene glycols, alcohols (terpineol), aminopropanol |
| Copper Nitrate | Long chain alcohols; citrates, carboxylates |
| Most Metal Carboxylates | Amines (e.g. triethylamine), ethylene glycols, alcohols (terpineol), aminopropanol |

Another important reagent additive that may be included in the precursor medium in some implementations of the invention is an oxidizing agent. The purpose of an oxidizing agent is to help create an environment during formation of the multi-component particles that is conducive to making a desired oxidized form of a material for inclusion in particles made during the forming particles. The oxidizing agent may provide oxygen in addition to the oxygen that might be present when air is used as the gas phase to make the aerosol. Alternatively, the oxidizing agent may be used in combination with a nonoxidizing carrier gas, such as pure nitrogen gas, to provide a controlled amount of oxygen to form the desired oxidized form of the material. One application for such control of the oxidation is when making one oxide of a metal that may form into multiple different oxide forms. For example, a controlled amount of oxygen may be used during the manufacture of magnetite to inhibit formation of the more oxidized iron oxide form of hematite.

Table 9 shows non-limiting examples of some oxidizing agents that may be included in the precursor medium, typically dissolved in the liquid vehicle, such as to assist in the making of oxide materials.

TABLE 9

OXIDIZING AGENTS

| TYPES | EXAMPLES | CHEMICAL FORMULA |
|---|---|---|
| Amine Oxides | Trimethylamine-N-Oxide | $Me_3NO$ |
| Mineral Acids | nitric acid, sulfuric acid, aqua regia | $HNO_3$, $H_2SO_4$, $HNO_3/HCl$ |
| Organic Acids | carboxylic acids | R—COOH |
| Peroxides | hydrogen peroxide | HOOH |
| Phosphine Oxides | trioctyl phosphine oxide | $OP(C_8H_{17})_3$ |
| Ozone | | $O_3$ |
| Sulfur Oxides | sulfur dioxide | $SO_2$ |
| Ammonia in combination with Oxygen | | $NH_3$ & $O_2$ |

Another reagent additive that may be included in the precursor medium in some situations is a fluxing agent to assist crystal growth or recrystallization of material in the particles made during formation of the multi-component particles. As indicated above, one or more of NaCl, KCl, KF, NaF, KI, NaI, or any of the salts listed in Table 6 may be included in the precursor medium as fluxing agents. A particularly preferred fluxing agent for particles containing phosphor materials is lithium nitrate.

The relative quantities of precursors, liquid vehicle and additives in the precursor medium will vary, depending on, for example, the desired composition and morphology of the multi-component particles to be produced according to the present invention and the particular feed materials used to prepare the aerosol during the generation of the aerosol. In most situations, however, the liquid vehicle will be present in the precursor medium in the largest proportion, with the precursor medium typically comprising at least 50 weight percent of the liquid vehicle and often at least 70 weight percent of the precursor medium.

As indicated above, the precursor medium comprises at least one precursor to a material for inclusion in the particles made during formation of the multi-component particles, such as material that forms all or part of the nanoparticles or a material that forms all or part of the matrix. As generated during the generation of the aerosol, the gas phase of the aerosol may also comprise one or more than one precursor. For example, when making oxide materials, air is often used as the carrier gas to generate the aerosol, and the oxygen component of the air is often used as a precursor to provide at least a portion of the oxygen component of the oxide material. The precursor medium will typically comprise, in solution and/or as particulate precursor, no more than about 50 weight percent precursor(s), and preferably no more than about 25 weight percent precursor(s). In most situations, however, the precursor medium will comprise at least 5 weight percent precursor(s). When the precursor medium comprises dissolved precursors, the precursor medium will typically comprise no more than 25 weight percent of such dissolved precursor(s).

In another embodiment, the precursor medium further comprises a dispersing agent and/or a dispersing agent precursor. As discussed in greater detail below, a dispersing agent in the final multi-component particles minimizates nanoparticle agglomeration as the nanoparticles in the multi-component particles are dispersed from the multi-component particles, e.g., as the matrix is dissolved in a liquid medium. For example, a polymer or surfactant, as listed previously, for use as the dispersing agent could be dissolved in the liquid vehicle, with the polymer precipitating out and being included in the particles during formation of the multi-component particles. Alternatively, the dispersing agent may be a material that is formed during formation of the multi-component particles from reaction of precursor(s) included in the precursor medium and/or the carrier gas.

In another embodiment, the precursor medium further comprises a adhesion agent and/or a hardening agent precursor. These precursors may be incorporated into the nanoparticle phase or the organic matrix phase of the final multi-component particles. Depending on the application, adhesion promoters may be added to the multi-component particles to improve adhesion of either the nanoparticles or the multi-component particles themselves when deposited on various substrates. For example, metal oxides may be added to multi-component particles that contain silver. When the silver nanoparticles are dispersed from the organic matrix and applied in a thin film and sintered together, the adhesion promoters will aid in improving adhesion of the film on glass or ceramic type substrates. Likewise, hardening promoters may be added to help the improve the hardness of similar nanoparticle thin films.

C. Generation of the Aerosol

As indicated above, in various embodiments of the present invention, a mist or aerosol is generated from the precursor medium. As used herein, the term "aerosol" means a gas dispersion comprising a disperse phase that includes a plurality of droplets dispersed in and suspended by a gas phase. Thus, as generated, the aerosol has a disperse phase of droplets of the precursor medium dispersed in and suspended by the gas phase.

The aerosol may be prepared using any technique for atomizing the precursor medium (e.g., converting the precursor medium to an aerosol of finely divided form of droplets). During the step of generating the aerosol, the atomized droplets of precursor medium are dispersed and suspending in a gas phase.

As noted previously, in the step of generating the aerosol, droplets of the precursor medium are formed, dispersed and suspended in a carrier gas to form the aerosol. The droplets may be generated using any appropriate apparatus for finely dividing liquids to produce droplets. Apparatuses for generating such droplets are referred to by a variety of names, including liquid atomizers, mist generators, nebulizers and aerosol generators. The technique and apparatus used to generate the aerosol may vary depending upon the application.

One example of an apparatus for generating the droplets and mixing the droplets with the carrier gas to form the aerosol is an ultrasonic aerosol generator, in which ultrasonic energy is used to form or assist formation of the droplets. One type of ultrasonic aerosol generator is a nozzle-type apparatus, with the nozzle ultrasonically energizable to aid formation of droplets of a fine size and narrow size distribution. Another example of an ultrasonic aerosol generator ultrasonically energizes a reservoir of precursor medium, causing atomization cones to develop, from which droplets of the precursor medium form, and the droplets are swept away by a flowing carrier gas. The reservoir-type ultrasonic aerosol generators can produce very small droplets of a relatively narrow size distribution and are preferred for use in applications when the final multi-component particles are desired to be in a range of from about 0.2 to about 5 microns (weight average particle size), and especially when a narrow size distribution of the particles is desired. An example of a reservoir-type ultrasonic aerosol generator is described, for example, in U.S. Pat. No. 6,338,809, the entire contents of which are incorporated by reference herein as if set forth herein in full. Although both the nozzle-type ultrasonic aerosol generator and the reservoir-type ultrasonic aerosol generator produce small droplets of a relatively narrow size distribution, the reservoir-type generally produces finer droplets of a more uniform size.

Another example of an apparatus for generating droplets is a spray nozzle (not ultrasonically energized). Several different types of spray nozzles exist for producing droplets in aerosols, and new spray nozzles continue to be developed. Some examples of spray nozzles include 2-fluid nozzles, gas nozzles and liquid nozzles. Spray nozzle generators have an advantage of very high throughput compared to ultrasonic generators. Droplets produced using spray nozzles, however, tend to be much larger and to have a much wider size distribution than droplets produced by ultrasonic generators. Therefore, spray nozzles are preferred for making relatively large multi-component particles. Other types of droplet generators that may be used include rotary atomizers, and droplet generators that use expansion of a supercritical fluid or high pressure dissolved gas to provide the energy for droplet formation. Still another process for generating droplets is disclosed in U.S. Pat. No. 6,601,776, the entire contents of which are incorporated herein by reference in as if set forth herein in full.

It will be appreciated that no matter what type of droplet generator is used, the size of the multi-component particles ultimately produced will depend not only upon the size of the droplets produced by the generator, but also on the composition of the precursor medium (such as the concentration and types of precursor(s) in the precursor medium).

As initially generated, the aerosol will have a gas phase that is wholly, partially or primarily composed of the carrier gas used to generate the aerosol. The gas phase may have some minor components provided by the precursor medium during the generation of the aerosol, such as some liquid vehicle vapor from vaporization of some liquid vehicle during the generation of the aerosol. The carrier gas may be any convenient gas composition and may be, for example, a single component gas composition (such as for example pure nitrogen gas) or a mixture of multiple gas components (such as for example air, or a mixture of nitrogen and hydrogen). As the aerosol is processed, however, the composition of the gas phase will change. For example, during the formation of the particles, the liquid vehicle is removed from the droplets to the gas phase, typically by evaporation caused by heating. Also, if the precursor medium contains reactive precursors or reagents, as the precursors or reagents react, the composition of the gas phase will contain decomposition products and reaction byproducts. At the conclusion of the forming of the multi-component particles, the aerosol will typically comprise an altered gas phase composition and a dispersion of the multi-component particles.

In some implementations, the carrier gas used to generate the aerosol will be substantially non-reactive. For example, the gas phase may contain only one or more inert gases, such as nitrogen and/or argon, depending upon the situation. Air can be used as a non-reactive carrier gas, when the oxygen component of the air is not reactive during processing. In other cases the carrier gas will include one or more reactive components that react during processing, and often during the formation of the multi-component particles. For example, the carrier gas, and therefore the gas phase of the aerosol as generated, may contain a reactive precursor to a material for inclusion in the particles (such as for example reactive oxygen gas when making some oxide materials) or a reactive reagent (such as hydrogen gas useful as a reducing agent when making some metallic materials).

D. Processing of the Droplets

After the aerosol is generated, the aerosol preferably is processed to remove at least a portion of the liquid vehicle in the droplets and form the multi-component particles. During this processing step, the nanoparticles are maintained in a distributed state within the multi-component particles by the matrix.

During the processing step, the liquid vehicle is removed from the droplets and particles are formed, which particles are dispersed in the aerosol. Removal of the liquid vehicle from the droplets may be accomplished, for example, by vaporizing the liquid vehicle to form a vaporized vehicle, which is yielded into and mixed with the gas phase. Such vaporization is preferably aided by heating of the aerosol. Also during the processing step, precursors (e.g., the inorganic nanoparticle precursor and/or the matrix precursor) in the aerosol may undergo one or more reactions or other transformations or modifications required to make the multi-component particles.

Thus, the processing step may include, for example, reaction of precursors, material phase redistribution, crystal growth or regrowth, nanoparticulate phase formation, growth of nanoparticulate sizes (such as through nanoparticulate agglomeration or coalescence), compositional modification, particle coating, etc. The nanoparticles may agglomerate and coalesce during formation of the multi-component particles to form larger diameter nanoparticles. For example, particles formed in the aerosol may not have undergone all necessary chemical reactions or morphological modifications necessary to form the desired final particles. In this case, the particles may be collected from the aerosol and subjected to a subsequent heat treatment during which precursor reactions or other particle transformations or modifications may occur that are required to make the desired final particles. Also, all precursors and reagents required to form the desired final particles may be included in the aerosol, or one or more precursor or reagent may be introduced separately during subsequent processing steps.

The formation of the multi-component particles may be performed in any apparatus suitable for removing liquid vehicle from the droplets to the gas phase of the aerosol and reacting or otherwise processing the precursors to make the particles comprising the desired nanoparticles and matrix. Reactions to be accommodated during formation of the multi-component particles may include for example thermal decomposition of precursor(s), reaction of precursor(s) with other materials and reaction of reagents. Other processing of the precursors that may occur during formation of the multi-component particles may include for example, precipitating dissolved precursor(s) from the liquid vehicle and fusing particulate precursor(s).

Removing liquid from the droplets and reaction of precursor(s) may occur in the same or different equipment. The removing liquid is typically accomplished by vaporizing liquid vehicle, with the liquid vehicle vapor then mixing into the gas phase of the aerosol. Vaporization of the liquid vehicle is preferably accomplished by heating the aerosol to a temperature at which most, and preferably substantially all, of the liquid vehicle in the droplets vaporizes. In one embodiment, the step of removing the liquid vehicle comprises heating the droplets to a maximum temperature of from about 50° C. to about 800° C. (e.g., from about 100° C. to about 500° C. or from about 200° C. to about 400° C.) for a period of time of at least about 0.5 seconds, e.g., at least 1 second, at least about 5 seconds or at least about 10 seconds. In a preferred embodiment, reactions or other processing of precursors to form the desired particles are accomplished in a reactor or reactors. By a reactor, it is meant an apparatus in which a chemical reaction or structural change to a material is effected. The removing of the liquid vehicle from the droplets may occur in the reactor or may occur in separate process equipment upstream of the reactor, or in both.

During formation of the multi-component particles, at least a portion and preferably substantially all, of the liquid vehicle is removed from the droplets to the gas phase of the aerosol. Also during formation of the multi-component particles, the matrix/nanoparticulate structure of the multi-component particles is formed, with the nanoparticles being maintained in a distributed state throughout the multi-component particles by the matrix. Removing at least a portion of the liquid vehicle from the droplets during formation of the multi-component particles occurs in the aerosol, and often the nanoparticulate/matrix structure is also formed in the aerosol, so that the multi-component particles that result from the forming of the particles are formed in a dispersed state in the aerosol. The removing of the liquid vehicle from the droplets and the formation of the nanoparticulate/matrix structure of the multi-component particles may occur in the aerosol in a single apparatus or processing stage (e.g., both may occur while the aerosol passes through a thermal reactor). Alternatively, removing at least a portion of the liquid vehicle may be performed in a separate apparatus or step from the termination of the nanoparticulate/matrix structure (e.g., aerosol first dried in a dryer to form precursor particles without the nanoparticulate/matrix structure, followed by processing of the aerosol through a separate thermal reactor in which the nanoparticulate/matrix structure is formed). In yet another alternative, at least part of the liquid vehicle is removed from the droplets in the aerosol to form such precursor particles, the precursor particles are then separated from the aerosol, and the separated precursor particles are then processed to form the nanoparticulate/matrix structure (e.g., by controlled thermal treatment such as in a belt furnace, rotary furnace or tray furnace, with or without the introduction into the furnace of additional reactant(s) or control of the furnace atmosphere).

In one embodiment of the present invention, removing at least a portion of the liquid vehicle (and perhaps substantially all of the liquid vehicle) from the droplets of precursor medium in the aerosol and reacting precursors to form the desired materials for inclusion in the multi-component particles are performed in separate steps. The removing of the liquid vehicle from the droplets may be performed in a reactor, furnace or using spray drying equipment, to produce a precursor particulate product that is collected for further processing. In some cases, the precursor particulate product made by removing the liquid vehicle from the droplets may not have distinct matrix and nanoparticulate phases, but may contain a single phase of mixed precursor(s) that have not yet reacted to form the matrix and nanoparticles. However, in other cases the precursor(s) to the matrix and the precursor(s) to the nanoparticles may already be in separate phases. The precursor particulate product made by removing the liquid vehicle from the droplets may then be subjected to a heat treatment in a separate reactor or furnace (e.g. belt furnace, tray furnace or rotary furnace) to react the precursors to form the desired matrix and nanoparticles and to impart the nanoparticulate/matrix structure. It should be noted that in some cases during the heat treatment the matrix material of several multi-component particles may fuse together to form a continuous structure of matrix material with distributed nanoparticles and no longer be in the form of individual multi-component particles. If it is desirable to have discrete multi-component particles, the continuous structure of matrix with distributed nanoparticles may be jet milled or hammer milled to form separate multi-component particles.

Another example of a reactor for possible use during formation of the multi-component particles is a plasma reactor. In a plasma reactor, the aerosol is passed through an ionized plasma zone, which provides the energy for effecting reactions and/or other modifications in the aerosol. Another example of a reactor for possible use during formation of the multi-component particles is a laser reactor. In a laser reactor, the aerosol is passed through a laser beam (e.g., a $CO_2$ laser), which provides the energy for effecting reactions and/other modifications in the aerosol. Plasma reactors and laser reactors have an advantage of being able to reach very high temperatures, but both require relatively complicated peripheral systems and provide little ability for control of conditions within the reactor during particle formation.

Another example of a reactor for possible use during the forming particles is a hot-wall furnace reactor. In a hot-wall furnace reactor, heating elements heat zones of the inside wall of the reactor to provide the necessary energy to the aerosol as it flows through the reactor. Hot-wall furnace reactors have relatively long residence times relative to flame, plasma and laser reactors. Also, by varying the temperature and location of heat input from heating elements in the different heating zones in the reactor, there is significant ability to control and vary the environment within the reactor during particle formation.

A spray drier is another example of a reactor that may be used during the forming particles. Spray driers have the advantage of having high throughput, allowing large amounts of particles to be produced. However, because of their larger size they provide less of an ability to control the reactor conditions during particle formation.

In one embodiment of present invention, during the forming of the particles, the average stream temperature of the aerosol does not exceed a melting temperature of the matrix material for longer than a specific period of time. The length of the specific period of time will depend on the particular reactor used during the forming of the particle. As a non-limiting example, in those cases in which a spray dryer is being used in the forming particles, the period of time may be as much as about 10 seconds, as much as about 20 seconds, as much as about 30 second or even as much as about 40 seconds. However, if a different reactor system is being used in the forming particles step, the period of time may be as short as about 8 seconds, as short as about 5 seconds or even as short as about 1 second. In other situations, the period of time may be less than about 1 second, such as from about 0.01 seconds to about 0.5 seconds.

E. Collection and Quenching of the Multi-Component Particles

In one embodiment, the process of the present invention includes a step of collecting the multi-component particles after the formation of the particles. The collecting of the particles may be performed, for example, immediately following formation of the multi-component particles or after further processing of the particles in aerosol. During the collecting of the particles, at least a portion and preferably substantially all of the particles are separated from the aerosol. The separation may be effected by any solid/gas separation technique, for example by using a filter, a cyclone, bag house, or electrostatic precipitator.

In one preferred embodiment, during the collection of the particles the multi-component particles are separated from the gas phase of the aerosol directly into a liquid medium. The particles may be collected directly into the liquid medium by spraying the liquid medium into the aerosol, such as by using venturi scrubbers, to capture the particles in the droplets of liquid medium, and then collecting the liquid medium containing the particles. The particles may be collected directly into a liquid medium by impinging the particles into a "wall" of liquid medium, such as by using a wetted wall electrostatic precipitator. The wall of liquid medium may be, for example, a flowing film or sheet of the liquid medium. The gas phase of the aerosol may pass through the wall of liquid medium, or a flow of the aerosol may be subjected to a sudden change indirection, with momentum carrying the particles into the wall of liquid medium. The liquid substance containing the particles is then collected.

One advantage of collecting the particles directly into a liquid medium is inhibition, and preferably prevention, of agglomeration of the particles, which may occur with other collection techniques. More importantly, many implementations of the present invention include processing the particles in a liquid medium, and collecting the particles directly into a liquid medium can significantly simplify the processing. For example, if the particles are collected directly into a liquid medium of a type to be used for processing, this eliminates the need to collect and then disperse the collected particles in the liquid medium. The dispersion in the liquid medium has been accomplished as part of the collection. After the particles have been collected into the desired liquid medium, then reagents/reactants may be added to the liquid medium for desired processing (e.g., for modification of nanoparticles or matrix). Alternatively, at the time of particle collection, the liquid medium may already have one or more reagents and/or reactants for such processing.

In one embodiment, the liquid medium into which the particles are collected is a solvent for one or more materials included in the matrix of the particles. Consequently, removal of at least a portion, or even substantially all, of the matrix is automatically effected in the liquid medium as it is being used to collect the particles. In one embodiment, the liquid medium may dissolve a sufficient portion of material of the matrix to automatically release the nanoparticles from the particles. In another embodiment, the liquid vehicle may dissolve only a portion of the matrix material that is not sufficient to release the nanoparticles, so that the nanoparticles continue to be held in a distributed state by the remaining matrix material. In this case, the matrix may be comprised of multiple materials, with the liquid medium being a selective solvent for one of the matrix materials relative to another of the matrix materials, so that there is selective removal of one of the matrix materials relative to another of the matrix materials.

In another variation of collecting particles directly into a liquid medium during the collecting of the particles, the liquid medium as used during the collecting of the particles may be a solvent for one or more materials of the matrix and also contain one or more reactants and/or reagents for performing a modification of the nanoparticles. Such a modification could involve, for example, a surface modification, compositional modification and/or structural modification of the nanoparticles or the matrix, in a manner as previously discussed. For example, the liquid medium may contain a surface-modifying material, such as a dispersing agent, that surface modifies the nanoparticles in the liquid medium of the collection. As another example, liquid medium used for collection may include reactants for use in attaching functional groups to the surface of the nanoparticles, or reactants for use to compositionally modify the nanoparticles.

In one aspect the process of the invention includes a step of quenching particles performed prior to the collecting of the particles. The quenching of the particles may be performed to quickly reduce the temperature of the particles after formation of the particles. Preferably, the quenching of the multi-component particles occurs within about 1 second, e.g., within about 0.1 seconds, within about 0.01 seconds or within about 0.001 seconds, of the step of collecting the multi-component particles in the liquid medium. This might be necessary, for example, to maintain a crystalline structure of the nanoparticles or matrix and avoid or limit crystal growth. Additionally, if it is undesirable to have the particles agglomerate after the forming of the particles, the quenching of the particles may be performed to quickly reduce the temperature of the particles to prevent them from or minimize agglomeration.

In one embodiment, the multi-component particles are formed in the aerosol, and a quench gas that is at a lower temperature than the aerosol is used during the quenching of the particles to reduce the temperature of the particles. In this embodiment, the quench gas is mixed into the aerosol after the particles have been formed, such as by injecting a stream of the quench gas cocurrent with or counter current to the flow of the aerosol. In most cases, the quench gas will contain non-reactive gases that merely reduce the temperature of the particles and do not react with any materials in the particles. However, in some cases, the quench gas may contain oxidizing agents, reducing agents or precursors that react with materials in the particles to form a new material or modify existing materials in the particles.

In another embodiment of the process the quenching of the particles may be performed using a liquid medium. In this case, the quenching of the particles and the collecting of the particles may be accomplished in a single step using a single liquid medium. The liquid medium used for collection of the particles may also quench the particles as they are collected in the liquid medium. The liquid medium used to collect and quench the particles may contain a variety of materials for modifying the matrix and/or the nanoparticles.

F. Applications for the Multi-Component Particles

The multi-component particles according to the present invention have a variety of applications.

One particularly useful application for use of the nanoparticles made using the present invention is in ink and paste formulations. Nanoparticles provide a variety of advantages over larger particulates in ink and paste formulations such as higher solid loading, better flowability, an ability to deposit smaller features and ink stability (e.g., reduced tendency for particle settling). A variety of techniques are available for depositing, patterning and/or printing inks and pastes that contain nanoparticles made using the present invention, some non-limiting examples of which include ink jet printing, lithographic printing, flexographic printing, roll printing, intaglio, spraying, dip coating, spin coating, stenciling, stamping, liquid embossing, gravure printing and screen printing.

The advantages achieved by using nanoparticles in inks and pastes are particularly important in printing circuit features for display and electronic applications, manufacturing membrane electrode assemblies for use in fuel cells and manufacturing of batteries. Many circuit features, or components, of displays and electronics, such as conductors, dielectrics, light emitters and resistors are deposited onto substrates (organic and inorganic) using inks and pastes, which are applied to the substrates using a variety of techniques, such as those previously listed. Typically, after an ink or paste is deposited onto a substrate, the deposited paste or ink is subjected to heat treatment to convert the ink or paste into the desired circuit component. For example, one technique for making electrically conductive lines on circuit boards is by depositing an ink containing particles of electrically conductive material (such as particles of an electrically conductive metal, e.g., gold, silver, copper, nickel, conductive alloys) onto the circuit board substrate, such as by ink-jetting, and then heat treating the deposited ink to form a solid electrically conductive line. These inks typically contain metallic particles. Because of the smaller size, using nanoparticles in the inks will allow the deposition of thinner conducting lines on substrates, and consequently, will allow a greater number of circuit features to be deposited per unit area of substrate (e.g., electrically conductive lines can be formed with a smaller pitch, or center-to-center spacing between the lines). Similarly, use of the nanoparticles made using the present invention in inks for display applications will allow a greater number of features to be deposited per area of substrate. Similarly, use of nanoparticles made using the present invention in inks for resistor, inductor, capacitor, transistor, or other electrical applications will allow for a wide of electronic circuits to be directly printed. Examples of resistor materials for use in the present invention include $RuO_2$, $OsO_4$, $TaN$, $Bi_2Ru_2O_7$, $Pb_2Ru_2O_6$, Ni—Cr, $SnO_2$, $SrRuO_3$, $BaRuO_3$, $TiSi_2$ and Pd—Ag—Pd—O.

The multi-component particles also have applications in the catalysis field. For example, fabrication of membrane electrode assemblies (MEAs) for use in fuel cells can also benefit from the use of inks containing the nanoparticles made using the present invention. For example, an ink containing carbon and/or catalyst nanoparticles can be printed on a substrate of ion exchange membrane to form an electrocatalyst layer. Catalysts used in MEAs can be very expensive (e.g., platinum catalytic metal), and the ability to fabricate MEAs using nanoparticulate-sized catalyst particles can greatly reduce the cost of manufacturing MEAs. Additionally, increased surface area that may be provided by nanoparticles can also contribute to improved performance of the MEAs.

IV. Post Processing of Multi-Component Particles

A. Processes for Dispersing the Nanoparticles from the Multi-Component Particles In one implementation of the invention, the multi-component particles comprise a matrix that is designed to be wholly or partially removable. As the matrix is removed, in one aspect, the nanoparticles within the multi-component particles are dispersed from the matrix to form a nanoparticle dispersion. The formation of a nanoparticle dispersion may be highly desirable in various applications, as discussed above. For example, the nanoparticle dispersion may be ideally suited to serve as an ink in ink jet applications.

As indicated above, in a preferred embodiment, the nanoparticles are dispersable in a liquid medium to form dispersed nanoparticles having from about 1 to about 10 monolayers (e.g., from about 2 to about 8 or from about 3 to about 6 monolayers) disposed thereon, wherein the monolayers are formed from the organic matrix. Additionally or alternatively, the dispersion of nanoparticles has a surface tension greater than about 5 dynes/cm, more preferably greater than about 10 dynes/cm, more preferably from about 20 to about 80 dynes/cm or from about 25 to about 50 dynes/cm, and a viscosity of greater than 1 centipoise, more preferably greater than about 3 centipoise, and optionally from about 3 to about 10,000 centipoise or from about 5 to about 100 centipoise.

In one variation, the removability of the matrix material is an aid to further processing of the nanoparticles to prepare the nanoparticles for final use in an application. For example, the matrix may be wholly removable, thereby effecting decomposition of the particles and releasing the nanoparticles. This may be desirable, for example, when the nanoparticles need to be modified prior to use (such as for example surface modification for enhanced dispersability), or need to be in a free state for use (for example, for incorporation of the nanoparticles into a paste or slurry, such as in an ink formulation for ink jet printing). In another variation, a portion of the matrix is removable to leave enough matrix to retain the structure of a particle that maintains the nanoparticles in a distributed state in the particle. In a preferred embodiment of this variation, the matrix comprises at least two different materials, with one matrix material being selectively removable relative to another matrix material.

In another implementation of the present invention, the matrix may comprise two or more different materials, with at least one material being selectively removable to produce a controlled pore characteristic (e.g., percent porosity, pore size, permeability) in the remaining particle. In one variation, the matrix may comprise uniformly sized regions of one matrix material that serve as a template to provide a length scale for porosity. The uniformly sized regions of material are then selectively removed to form relatively uniformly sized pores throughout the particle. In one particular implementation of this variation, the matrix is initially composed of two different matrix materials, an organic salt and a polymer, with the polymer being in the form of substantially uniformly sized particles or beads. When the polymer is selectively removed by being dissolved with a solvent or vaporized in a heater or reactor, leaving the organic salt matrix material remains with pores of substantially uniform size. The uniformly sized regions of matrix material that aid in forming controlled porosity in the multi-component particles may, however, be made of any convenient material. Some non-limiting examples of materials that may be used in the matrix to create a template for generating controlled porosity in the multi-component particles include: long carbon chain organic salts, polymers (e.g., shaped as spheres, such as latex spheres; beads; or other shapes), surfactant salts, and biomolecules or biomaterials, (proteins, enzymes, viruses, etc.). Additionally, surfactants can be added to the precursor medium to form micelles (or reverse micelles) that control the size of a matrix material by isolating a matrix precursor within the micelles and constraining the size of the domains of the matrix material that is formed during formation of the multi-component particles.

In yet another implementation of the invention, the matrix is designed to be wholly removable and merely serves as an aid for delivering the nanoparticles into a final application or product. For example, in catalytic applications it might be useful to have a porous network of nanoparticles of a catalyst material deposited on a catalytic support surface. However, such a network of nanoparticles might be difficult to form directly on the surface. Using one embodiment of the present invention, multi-component particles containing a matrix and an interconnected network of nanoparticles, such as shown and described below with respect to FIG. 5, may be used to deposit the desired network on the catalytic support surface. The multi-component particles containing matrix and the network of nanoparticles may be deposited onto the desired catalytic support surface as a dry powder, an ink or a paste, and then washed with a solvent for the matrix to dissolve the matrix and leave the interconnected network of nanoparticles on the catalytic support surface.

A generalized process for one implementation of the invention involves the decomposition of multi-component particles to free the nanoparticles. During the decomposing of the multi-component particles, sufficient matrix material is removed from the multi-component particles to effectively decompose the structure of the multi-component particles, thereby releasing the nanoparticles.

Removal of matrix material may be effected in any convenient way that effectively destroys the structure of the multi-component particles to release the nanoparticles. As one example, matrix material may be removed by chemical reaction of, or reacting away the matrix material. The particles are subjected to reactant(s) that react with one or more materials of the matrix, thereby removing matrix material from and decomposing the particles. Table 10 shows some non-limiting examples of combinations of matrix materials and reactants or stimuli resulting in reaction of a matrix material to effect removal of the matrix material.

TABLE 10

EXEMPLARY MATRIX MATERIAL/REACTANT COMBINATIONS

| MATRIX MATERIAL | REACTANT/STIMULUS |
| --- | --- |
| Oxygen sensitive polymers | Oxygen |
| Acid sensitive materials | Acids |
| Base sensistive materials | Bases |
| Heat sensitive materials | Heat |
| Light sensitive materials | Light |

In another example, matrix material may be removed by sublimation of the matrix material. In this embodiment, the multi-component particles are subjected to conditions of temperature and pressure, which may be a vacuum pressure, at which the matrix material sublimes. Some non-limiting examples of sublimable matrix materials include lower molecular weight organic materials, such as: naphthalene and anthracene.

In one preferred embodiment, during the decomposition of the multi-component particles, sufficient matrix material is dissolved into a liquid medium to effect the decomposition of the multi-component particles. For example, organic salt matrix materials, such as salts of carboxylic acids and alkyl ammonium salts. As another example, a polymer matrix could be dissolved into an organic liquid, or aqueous liquid, depending upon the polymer. In any event, it is important that the liquid medium be selective for dissolving the matrix material relative to the nanoparticles, so that material from the nanoparticles is substantially not dissolved into the liquid medium. The dissolution of the matrix material in a liquid medium may be performed using any adequate process or apparatus such as for example a stirred tank or other equipment that agitates the liquid medium to promote contact of the liquid medium with the multi-component particles.

Another aspect of the invention involves removing nanoparticles from a matrix structure and re-dispersing the nanoparticles in a new medium. The re-dispersion may be in a new matrix. In one embodiment, at least a portion of the matrix, and preferably substantially all of the matrix, is removed using a liquid medium, with corresponding release of the nanoparticles into the liquid medium, followed by separation of the nanoparticles from the liquid medium and then re-dispersion of the nanoparticles in a new liquid medium or in a new matrix.

In one aspect of the invention, the re-dispersing of the nanoparticles is aided by the matrix. For example, at least a portion of the matrix optionally is dissolved and acts as a surface adsorbed substance (e.g., surfactants and/or polymers) and helps disperse the nanoparticles through steric or electrostatic forces. For example, the organic matrix may comprise PVP and the inorganic nanoparticles may comprise silver. Upon placing this particular multi-component particle in water or a protic solvent, the PVP absorbs or adsorbs on the surface of the silver nanoparticles and helps prevent (or minimize) agglomeration of the silver nanoparticles and keeps the silver nanoparticles dispersed.

In another embodiment, the multi-component particles are decomposed followed by the steps of separating the nanoparticles and dispersing the nanoparticles. During the decomposing of the multi-component particles, at least a portion of the matrix is removed from the particles sufficient to release the nanoparticles into a first liquid medium. The nanoparticles are then separated from at least a portion, and preferably substantially all, of the first liquid medium. The separated nanoparticles are then mixed with and dispersed in a new (second) liquid medium. The dispersing of the nanoparticles is often aided by a surface modification performed on the nanoparticles prior to the step of separating the nanoparticles. The surface modification may include coating the nanoparticles with a dispersing agent that is compatible with the new liquid medium.

The step of separating the nanoparticles from the first liquid medium may be performed using any suitable liquid/solid separation technique. Some examples of liquid/solid separation techniques that may be used include ultrafiltration, centrifugation, sedimentation/decantation, diafiltration and froth flotation, using any separation aids as appropriate, such as filter aids, flocculants and frothing reagents. In one embodiment, the separating of the nanoparticles is performed by partitioning the nanoparticles from one liquid medium to another immiscible liquid medium. For example, decomposing the particles may be performed using an aqueous liquid medium and the separating of the nanoparticles may be performed by contacting the aqueous medium with an organic liquid medium into which the nanoparticles preferentially partition. For example, metal nanoparticles may be partitioned from an aqueous liquid into an organic liquid containing a metal complexing agent, such as for example an amine or phosphorus-containing extractant such as are used in solvent extraction operations. As another example, metal nanoparticles may be surface modified with a hydrophobic modifying agent that aids in partitioning the metal nanoparticles from an aqueous liquid into an organic liquid. In one embodiment, a first liquid medium is a process liquid used to remove the matrix and a second liquid medium is formulated for a particular final application. For example, the second liquid medium into which the nanoparticles are re-dispersed could be an organic liquid for preparation of a paste or slurry composition, such as an ink composition comprising the nanoparticles, for example for ink jet printing or offset lithographic printing. Alternatively, the second liquid medium may be formulated so that the nanoparticles are stable during storage, transportation or to facilitate further processing of the nanoparticles.

Regarding the ultrafiltration/diafiltration of nanoparticles reference may be made, for example, to U.S. Pat. Nos. 6,328,894; 5,879,715; 6,245,494 and 6,811,885, the entire disclosures of which are incorporated by reference herein. Briefly, ultrafiltration and diafiltration use a filtration under pressure through a membrane which allows only components of a certain maximum size to pass therethrough. In the present case, the inorganic nanoparticles will be retained by the membrane while the first liquid medium and preferably a major part or substantially all of the contaminants (e.g., dissolved inorganic matter, excess adsorptive substance, etc.) and the like will be able to pass through the membrane. Any size of membrane as well as any channel (pore) size thereof can be used as long as the process permits a preferably substantial separation of the inorganic nanoparticles from the first liquid medium and optionally separation of contaminants and the like. In a preferred aspect, the membrane may vibrate to substantially reduce clogging and/or to permit a higher permeate flow rate. Also, the ultrafiltration/diafiltration may be pressure-driven (e.g., involving pressing through the membrane) or vacuum-driven (e.g., involving sucking through the membrane). Membrane configurations include, but are not limited to, flat sheet membranes, cross flow membranes, spiral wound tubes, or hollow fiber tubes. For example, a three compartment through-flow cell comprising two membranes may be used. Non-limiting examples of membrane materials include polymeric and ceramic materials such as, e.g., polysulfone, polyethersulfone, sulfonated polysulfone, polyamide, cellulose acetate, zirconium oxide and alumina. By way of non-limiting example, the membrane may have a molecular weight cutoff (MWCO) in the range of from about 10,000 to about 1,000,000, e.g., about 50,000, about 100,000, about 200,000 or about 500,000, and/or a pore size of from about 0.01 µm to about 1 µm (preferably at least about 0.02 µm and not higher than about 0.5 µm) and/or a lumen of from about 0.1 mm to about 5 mm (preferably at least about 2 mm and not more than about 3 mm).

The nanoparticles that are separated from the first liquid phase optionally are subjected to a washing operation to remove at least a substantial portion of the impurities that may still be associated therewith, e.g., materials that are not adsorbed on the surface of the nanoparticles to any significant extent. For example, these impurities may include inorganic salts formed during the reduction of the metal compound, residual solvent(s) from the precipitation step and surfactants and/or polymers, e.g., surfactants and/or polymers that are merely present as an impurity without being adsorbed on the nanoparticles. The washing liquid used for the washing operation preferably is, or comprises, a solvent that is capable of dissolving the impurities associated with the nanoparticles, in particular, excess surfactants and/or polymers. By way of non-limiting example, the washing liquid may comprise a protic organic solvent such as, e.g., a hydroxyl-containing compound, preferably, an alcohol and/or a polyol and/or water. Illustrative and non-limiting examples of alcohols and polyols that may be used for the washing operation include aliphatic alcohols having from 1 to about 12 carbon atoms such as, e.g., methanol, ethanol, propanol, isopropanol, butanol, pentanol, cyclopentanol, hexanol, cyclohexanol, octanol, decanol, dodecanol and the like, and polyols having from 1 to about 4 hydroxyl groups and from 2 to about 12 carbon atoms such as, e.g., ethylene glycol, propylene glycol, glycerol and the like. A preferred solvent for use in the washing operation includes ethanol, which may be used alone or in combination with other solvents (e.g., water).

The washing operation may, for example, be carried out by dispersing the separated inorganic nanoparticles in the washing liquid, followed by another separation step (e.g., diafiltration, ultrafiltration and/or centrifugation). This process may optionally be repeated one or more times. The washed (purified) nanoparticles may thereafter be dried (e.g., under reduced pressure and/or at a temperature that does not adversely affect the surface adsorbed substance to any significant extent) and thereafter stored and/or shipped. Even after storage for extended periods the dry particles can be redispersed in a desired liquid to form a dispersion (e.g., a printing ink) that is substantially stable over several days or even weeks.

In a further embodiment, the last liquid medium that is added to the nanoparticles before the ultrafiltration/diafiltration thereof is completed may be selected to be the vehicle of a desired dispersion of the nanoparticles (for example of a printing ink) or a component thereof, thereby making it possible to convert the separated nanoparticles into the desired nanoparticle containing product in a single unit/operation. Also, one or more additives may be incorporated in the washing liquid and the liquid that is intended to be the vehicle of the desired dispersion or a component thereof. For example, in order to keep the dissolution of surface adsorbed substance at a minimum, it may be advantageous to add some adsorptive substance (e.g., surfactants and/or polymers) to, e.g., the washing liquid. In addition additives may also be incorporated into the washing liquid (adhesion promoters, humectants, etc.).

By way of non-limiting example, the diafiltration/ultrafiltration may be carried out by placing the dispersed nanoparticles (in the first liquid medium) in a diafiltration unit and concentrating the reaction mixture therein to a predetermined fraction of the original volume by pressing (application of pressure) or drawing (application of vacuum) the reaction mixture through one or more ultrafiltration membranes of suitable MWCO/pore size. Thereafter, a first extraction medium that is capable of dissolving impurities and contaminants present in the reaction mixture (in particular, excess surfactant and/or polymer) may be added to the concentrated reaction mixture (e.g., in an amount sufficient to restore the originally employed volume of the reaction mixture) and the resulting mixture may be concentrated in the same way as the originally employed dispersed nanoparticles. A second extraction medium which is capable of dissolving impurities and contaminants and which may be the same as or different from the first extraction medium may be added to the resulting concentrate and the resulting mixture may be concentrated again. This process may be repeated as often as necessary with a third, fourth, etc. extraction mixture. Alternatively, before concentrating the original dispersed nanoparticles a predetermined amount of the first extraction medium may be added thereto and the resulting mixture may be concentrated, e.g., until the original volume of the dispersed nanoparticles is reached again. Then the second extraction medium may be added and a second concentration operation may be carried out, etc. Of course, any combination of the two alternatives described above may be used as well. For example, the original dispersed nanoparticles may be concentrated first and then the first extraction mixture may be added in an amount which results in a volume of the resultant mixture which exceeds the volume of the original dispersed nanoparticles, whereafter the resultant mixture may be concentrated to the volume of the original dispersed nanoparticles, whereafter a second extraction medium may be added, etc. At the end of each of these alternative ways of isolating/purifying the inorganic nanoparticles by ultrafiltration/diafiltration the extraction medium(s) may be removed partially or completely by ultrafiltration/diafiltration, leaving behind the purified substantially non-agglomerated inorganic nanoparticles with the surface absorbed substance thereon, or a concentrated and stable dispersion thereof. The nanoparticles may then optionally be dried to form a powder batch of dry nanoparticles. Alternatively, the extraction mediums that are used for the diafiltration operation may be selected such that at least at the end of the diafiltration operation the purified nanoparticles are combined with a second liquid medium which is the vehicle or at least a part of the vehicle of a desired re-dispersion of the inorganic nanoparticles (e.g., a printing ink). The extraction mediums that may be used for carrying out the diafiltration/ultrafiltration include those which have been mentioned above in the context of the separation of the nanoparticles from the liquid phase and the washing of the separated nanoparticles.

In one aspect of the invention, the nanoparticles are released from the multi-component particles through mechanical agitation or a process that aids in breaking apart the organic matrix. For example, milling, ultrasonification, and/or shear mixing may be used in order to aid the release of the inorganic nanoparticles from the matrix.

B. Processes for Modifying the Nanoparticles

During and after the decomposing of the multi-component particles, it is generally preferred to significantly inhibit or substantially prevent the dispersed nanoparticles from agglomerating, because of the difficulty in subsequently redispersing the nanoparticles for further processing or use. One way of significantly inhibiting agglomeration of the nanoparticles is to make the multi-component particles during the formation of the particles to include a surface-modifying material that inhibits agglomeration and promotes dispersion of the nanoparticles in the liquid medium. The surface-modifying material optionally comprises one or more surfactants or polymer compounds, as discussed above, which covalently bond, coordinate and/or adsorb to the surface of the nanoparticles to decrease the surface energy thereof and inhibit agglomeration. Such surface-modifying materials are generically referred to herein as dispersants or dispersing agents. The dispersing agent may rely on physical or chemical interactions with the nanoparticles to promote dispersion. Typically, when a dispersing agent is included in the multi-component particles, it will be part of the matrix of the particles. In that regard, the matrix may comprise substantially only the dispersing agent or may comprise multiple matrix materials, of which the dispersing agent is only one. In any event, the dispersing agent is of such a nature that when the particles are decomposed, at least a portion of the dispersing agent associates with a surface of the nanoparticles in a way to inhibit agglomeration in the liquid medium of released nanoparticles. As one example, the dispersant may be an amphiphile, with a polar portion that interacts with one of the nanoparticles and the liquid medium and a nonpolar portion that interacts with the other of the nanoparticles and the liquid medium, to promote maintenance of the nanoparticles in the liquid medium in a dispersed state. The dispersing agent may be an ionic, nonionic or zwitterionic surfactant, or a polymer, that interact with the surface of the nanoparticles. Some non-limiting examples of possible dispersing agents for use in polar and nonpolar liquid media include: ammonium salt of polyacrylic acid; ammonium salt of a polymeric carboxylic acid; sodium salt of a polymeric carboxylic acid; anionic macromolecular surfactant, condensed naphthalene sulfonic acid; methyl hydroxyethyl cellulose; monono-calcium salt of polymerized alkyl-aryl sulfonic acid; anionic and nonionic surfactants; polycarboxylic acid surfactant; polyoxyethylenesorbitan fatty acid ester; polyoxyethylene sorbitan monooleate; polyoxyethylene sorbitan monostearat; salts of polyfunctional oligomer; sodium dodecyl benzene sulfonate; sodium or ammonium salt of a sulfate ester an alkylphenoxypoly(ethyleneoxy)ethanol; sodium salt of a carboxylated polyelectrolyte; sodium salt of condensed naphthalene sulfonate; sodium salt of disulohonic acids; sodium salt of polyacrylic acids Polyacrylic acids; sodium salt of polymerized alkyl naphthalene sulfonic acid; sodium salt of polymerized alkyl-aryl sulfonic acid; sodium salts of polymerized substituted alkyl-aryl sulfonic acids; sodium salts of polymerized substituted benzoid alkyl sulfonic acids; sodium tetraborate; ammonium salt of carboxylated polyelectrolyteAlkylphenol ethoxylates; condensation product of naphthalene sulfonic acid formaldehyde; condensation product sulfo-succini acid ester of an alkoxylated novolak; nonylphenol novolak ethoxylate; condensation product of cresol-formaldehyde-schaffer salt; sodium salt of a cresol-formaldehyde condensation product; fatty acid methyl tauride sodium salt; phosphate of EO-PO-EO block-polymer; 2,4,6-Tri-(1-phenylethyl)-phenol polyglycol ether phosphoric acid ester; 2,4,6-Tri-1(1-phenylethyl)-phenol polyglycol ether monophosphate triethanolamine salt; tri-sec,-butylphenol polyglycol ether phosphoric acid ester with 4 EO; alkyl polyglycol ether phosphoric acid ester with 6 EO; alkyl polyglycol ether phosphoric acid ester with 8 EO; 2,4,6-Tri-(1-phenylethyl)-phenol polyglycol ether sulfate ammonium salt; sulfosuccinic ester of ethoxylated castor oil; mannitol; sodium lauryl sulfate; and mono 86 disaccharides.

When the multi-component particles include a dispersing agent, a precursor for the dispersing agent will typically be included in the precursor medium from which droplets are formed during the generation of the aerosol. For example, a polymer for use as the dispersing agent could be dissolved in the liquid vehicle, with the polymer precipitating out and being included in the particles during formation of the multi-component particles. Alternatively, the dispersing agent may be a material that is formed during formation of the multi-component particles from reaction of precursor(s) included in the precursor medium and/or the carrier gas. For example, a monomer or monomers for a polymer (which may be a homopolymer, copolymer, terpolymer, etc.) to be used as a dispersing agent may be included in the precursor medium, which monomer(s) polymerize to form the dispersing agent during the formation of the multi-component particles.

In one embodiment of the present invention, the dispersed nanoparticles are modified in one or more post manufacture modification steps. An alternative to including the dispersing agent in the multi-component particles is for the dispersing agent to be present in the liquid medium, which contacts the multi-component particles and causes the multi-component particles to decompose. Contacting the nanoparticles with a dispersing agent in a liquid medium during or following the decomposition of the particles is one example of post manufacture modification of the nanoparticles, in that the dispersing agent effects a surface modification of the nanoparticles to inhibit agglomeration and promote dispersibility. Alternatively, the dispersing agent optionally is added to the liquid medium after it initially contacts the multi-component particles, but preferably prior to completion of the decomposition of the particles. In a preferred variation of this alternative, the dispersing agent is predissolved into the liquid medium prior to contacting the liquid medium with the particles during the decomposing of the particles, so that the dispersing agent is immediately available to intimately contact and associate with the nanoparticles as they are exposed during the decomposing of the particles. During the decomposition of the particles, the mixture of liquid medium and particles is preferably agitated, such as with a mixer, to promote effective decomposition of the particles and intimate contact between the nanoparticles and the dispersing agent.

Another example of post manufacture modification of the nanoparticles is contacting the nanoparticles with a dispersing agent or other surface-modifying agent in a fluidized bed following the decomposing of the particles. The present invention, however, provides significant flexibility to effect a variety of post-manufacture modifications to one or both of the nanoparticles and the matrix.

A generalized process for modifying nanoparticles following particle formation involves nanoparticle surface modification by contacting the nanoparticles with a dispersing agent as described above. The modifying of the nanoparticles may be performed while the nanoparticles are in the multi-component particles; after removal of a portion of the matrix from the multi-component particles, but while the nanoparticles are still held in a distributed state by the matrix; or after decomposition of the multi-component particles to release the nanoparticles. Non-limiting examples of some types of modifications of the nanoparticles that may be performed include surface modification of a surface of the nanoparticles, compositional modification of the nanoparticles and structural modification of the nanoparticles (e.g., modifications of morphology, crystallinity and/or composition).

One type of surface modification that may be performed on the nanoparticles is coating or covering a surface of the nanoparticles with a material that masks, or otherwise modifies, the surface properties of the nanoparticles. By coating a surface it is meant covering a portion or all of the surface with surface-modifying material(s), also referred to herein as surface-modifying agents. A surface-modifying material may be held in association with the surface by any mechanism, including physical absorption, chemisorption or attachment through chemical bonding to the surface of the nanoparticles (e.g., through covalent or ionic bonding).

The surface-modifying material may perform one or a number of functions at the surface of the nanoparticles. The surface-modifying material may function as a surfactant to modify the surface properties. The surface-modifying material may function as a dispersing agent to promote uniform separation and dispersion of the nanoparticles in a liquid medium. The surface modifying material may function as a stabilizer to inhibit chemical degradation of the nanoparticles.

Surface modification of the nanoparticles can be completed before (nanoparticles in the precursor solution), during the formation of the nanoparticles, or afterward, e.g., when being redispersed.

Table 11 shows some non-limiting examples of polymers that may be used as surface-modifying materials to coat the surface of metal oxide, metal and/or semiconductor nanoparticles.

TABLE 11

EXEMPLARY POLYMERS FOR SURFACE MODIFYING NANOPARTICULATE METAL OXIDES, METALS AND SEMICONDUCTORS SURFACE MODIFYING MATERIALS

Reactive Polysiloxanes
Crown Ethers
Dendrimers
Amphiphilic Polymers
Polyanilines
Starches
Gelatins
Polyelectrolytes
Polypyrroles
Polythiophenes
Thiol Polymers Additional exemplary surface modifying materials (surfactants and/or polymers) that may be implemented during the step of surface modification include: Tyloxapols such as 4-(1,1,3,3-tetramethylbutyl)-phenol polymer with ethylene oxide and formaldehyde; polyvinylpyrrolidone (PVP); poloxamers (copolymers of ethylene oxide and propylene oxide) such as Pluronics™ F68, F108, F127; poloxamines (copolymers of propylene oxide, ethylene oxide and ethylenediamine) such as Tetronic™ 908; gelatin; sulfated poloxamers; sulfated poloxamines; casein; lecithin (phosphatides) such as Chocotop™ (Lucas Meyer GMBH & Co.); glycerol; gum acacia; cholesterol; tragacanth; stearic acid; benzalkonium chloride; calcium stearate; glycerol monostearate; cetostearyl alcohol; cetomacrogol emulsifying wax; sorbitan esters; polyoxyethylene; polyoxyethylene alkyl ethers such as macrogol ethers (e.g., cetomacrogol 1000); polyoxyethylene alkyl esters; polyoxyethylene castor oil derivatives; polyoxyethylene sorbitan fatty acid esters such as Tweens™ and Tween™ 80; polyethylene glycols (PEG) such as Carbowax™ 3350, 1450 and Carbopol 934; polyoxyethylene stearates; phosphates; sodium dodecylsulfate; ethylene oxide and butylene oxide copolymers; cellulose ethers such as methylcellulose, hydroxyethylcellulose, hydroxypropylcellulose, hydroxypropylmethylcellulose phthalate, carboxymethylcellulose, carboxymethylcellulose calcium and carboxymethylcellulose sodium; polysaccharides such as dextrin, guar gum and starch; vinyl acetate and vinyl pyrrolidone copolymers such as Plasdone® S630; Kollidone® VA 64; vinylacetate and vinylalcohol copolymers; noncrystalline cellulose; magnesium aluminum silicate; triethanolamine; polyvinyl alcohol (PVA); dextran; dialkylesters of sodium sulfosuccinic acid such as aerosol OT™ (dioctyl ester of sodium sulfosuccinic acid); sodium lauryl sulfate (e.g., Duponol™); alkyl aryl polyether sulfonate (e.g., Triton™ X-200); PEG-phospholipids; dimyristoyl phosphatidyl glycerol; Na-dioctylsulfosuccinate (DOSS) (e.g., Ablusol™ C-78 and Ablusol™ M-75); PEG-cholesterol; PEG-vitamin A; PEG-vitamin E; PEG-liposomes such as DPP-PEG-OH α-(dipalmitoylphosphatidyl)-ω-hydroxypolyoxyethylene), DSPE-PEG-COOH (distearoylphosphatidyl-N-(3-carboxypropionylpolyoxyethylene succinyl)ethanolamine), PEG-5000™ and PEG2000™; sodium dodecylbenzene sulfonate; sodium stearate; decanoyl-N-methylglucamide; N-decyl β-D-glucopyranoside; N-decyl β-D-maltopyranoside; N-dodecyl β-D-glucopyranoside; N-dodecyl β-D-maltoside; heptanoyl-N-methylglucamide; N-heptyl β-D-glucopyranoside; N-heptyl β-D-thioglucoside; N-hexyl β-D-glucopyranoside; nonanoyl-N-methylglucamide; N-nonyl β-D-glucopyranoside; Octanoyl-N-methylglucamide; N-octyl β-D-glucopyranoside; Octyl β-D-thioglucopyranoside; Zwitterionic stabilizers such as Abil 9950-polysiloxane polyorgano betaine copolymers, Betadet DM-24-alkyldimethylaminobetaine, Betadet 5-20-laurylhydroxysultaine; poly-n-methylpyridinium; anthryul pyridinium chloride; cationic phospholipids; chitosan; polylysine; polyvinylimidazole; polybrene; polymethylmethacrylate trimethylammoniumbromide bromide (PMMTMABr); pexyldesyltrimethylammonium bromide (HDMAB); quaternary ammonium compounds such as stearyltrimethylammonium chloride, benzyl-di(2-chloroethyl)ethylammonium bromide, coconut trimethyl ammonium chloride or bromide, coconut methyl dihydroxyethyl ammonium chloride or bromide, decyl triethyl ammonium chloride, decyl dimethyl hydroxyethyl ammonium chloride or bromide, $C_{12-15}$ dimethyl hydroxyethyl ammonium chloride or bromide, coconut dimethyl hydroxyethyl ammonium chloride or bromide, myristyl trimethyl ammonium methyl sulphate, lauryl dimethyl benzyl ammonium chloride or bromide, lauryl dimethyl (ethenoxy)$_4$ ammonium chloride or bromide, N-alkyl ($C_{12-18}$)dimethylbenzyl ammonium chloride, N-alkyl ($C_{14-18}$)dimethyl-benzyl ammonium chloride, N-tetradecylidmethylbenzyl ammonium chloride monohydrate, dimethyl didecyl ammonium chloride, N-alkyl and ($C_{12-14}$) dimethyl 1-napthylmethyl ammonium chloride, trimethylammonium halide, alkyl-trimethylammonium salts, dialkyl-dimethylammonium salts, lauryl trimethyl ammonium chloride, ethoxylated alkyamidoalkyl-dialkylammonium salt, ethoxylated trialkyl ammonium salt, dialkylbenzene dialkylammonium chloride, N-didecyldimethyl ammonium chloride, N-tetradecyldimethylbenzyl ammonium, chloride monohydrate, N-alkyl($C_{12-14}$) dimethyl 1-naphthylmethyl ammonium chloride, dodecyldimethylbenzyl ammonium chloride, dialkyl benzenealkyl ammonium chloride, lauryl trimethyl ammonium chloride, alkylbenzyl methyl ammonium chloride, alkyl benzyl dimethyl ammonium bromide, $C_{12}$, $C_{15}$, $C_{17}$ trimethyl ammonium bromides, dodecylbenzyl triethyl ammonium chloride, poly-diallyldimethylammonium chloride (DADMAC), dimethyl ammonium chlorides, alkyldimethylammonium halogenides, tricetyl methyl ammonium chloride, decyltrimethylammonium bromide, dodecyltriethylammonium bromide, tetradecyltrimethylammonium bromide, methyl trioctylammonium chloride (ALIQUAT 336™), POLYQUAT 10™, tetrabutylammonium bromide, and benzyl trimethylammonium bromide; choline esters such as choline esters of fatty acids; benzalkonium chloride; stearalkonium chloride compounds such as stearyltrimonium chloride and di-stearyldimonium chloride; cetyl pyridinium bromide or chloride; halide salts of quaternized polyoxyethylalkylamines; MIRAPOL™; ALKAQUA™; amines such as alkylamines, dialkylamines, alkanolamines, polyethylenepolyamines, N,N-dialkylaminoalkyl acrylates and vinyl pyridine; amine salts such as lauryl amine acetate, stearyl amine acetate, alkylpyridinium salt and alkylimidazolium salt; amine oxides; imide azolinium salts; protonated quaternary acrylamides; methylated quaternary polymers such as poly[diallyl dimethylammonium chloride] and poly-[N-methyl vinyl pyridinium chloride]; cationic guar; carboxylates; citrates; thiols and di thiols.

In one embodiment of the implementation of the invention, the surface modification of the nanoparticles comprises functionalizing a surface of the nanoparticles. By functionalizing, it is meant that chemical functional groups of a desired type are attached to the surface of the nanoparticles through chemical bonding (e.g., covalent bonding or ionic bonding). The functional group could be bonded directly to the nanoparticles, or could be bonded to the nanoparticles through some intermediate group or groups. Preferably, the functionalizing group and/or the intermediate group is derived from a component in the matrix. At least a portion of the matrix optionally acts as a surface adsorbed substance (e.g., surfactants and/or polymers). In one embodiment the matrix contains PVP that can interact (through nitrogen lone pairs of the pyrrolidone nitrogen) with the surface of a metal nanoparticle. Often, the functional group will be a part of a longer constituent group that is bonded to the nanoparticles. The bonding to the nanoparticles may in some cases be effected through a coupling agent that acts as a couplant intermediate between a nanoparticulate and the functional group. As used herein, a coupling agent refers to each of the following: a molecule or ionic group that is reactable with the nanoparticles to form a chemical bond with the nanoparticles, the residual portion of that molecule or ionic group bonded to the nanoparticles following reaction with the nanoparticles, and any further residual linking group bonded to a functional group following further reaction to attach a functional group. One common group of coupling agents useful in many situations are silane coupling agents. Non-limiting examples of some silane coupling agents that may be used with the invention include: aminopropyltriethoxysilane; aminopropyltrimethoxysilane; aminopropylmethyldiethoxysilane; aminopropylmethyldimethoxysilane; aminoethylaminopropyltrimethoxysilane; aminoethylaminopropyltriethoxysilane; aminoethylaminopropylmethyldimethoxysilane; diethylenetriaminopropyltrimethoxysilane; diethylenetriaminopropyltriethoxysilane; diethylenetriaminopropylmethyldimethoxysilane; diethylenetriaminopropylmethyldiethoxysilane; cyclohexylaminopropyltrimethoxysilane; hexanediaminomethyltriethoxysilane; anilinomethyltrimethoxysilane; anilinomethyltriethoxysilane; diethylaminomethyltriethoxysilane; (diethylaminomethyl)methyldiethoxysilane; methylaminopropyltrimethoxysilane; bis(triethoxysilylpropyl) tetrasulfide; bis(triethoxysilylpropyl)disulfide; mercaptopropyltrimethoxysilane; mercaptopropyltriethoxysilane; mercaptopropylmethyldimethoxysilane; 3-thiocyantopropyltriethoxysilane; glycidoxypropyltrimethoxysilane; glycidoxypropyltriethoxysilane; glycidoxypropylmethyldimethoxysilane; glycidoxypropylmethyldiethoxysilane; methacryloxypropyltrimethoxysilane; methacryloxypropyltriethoxysilane; methacryloxypropylmethyldimethoxysilane; chloropropyltrimethoxysilane; chloropropyltriethoxysilane; chloromethyltrimethoxysilane; chloromethyltriethoxysilane; dichloromethyltriethoxysilane; vinyltrimethoxysilane; vinyltriethoxysilane; vinyltris(2-methoxyethoxy)silane, hexamethyldisilazane; dimethylchlorosilane; hexamethyldisiloxane; hexamethyldisilane; dimethyltrichlorosilane; methyltrichlorosilane; and silicon oils.

Non-limiting examples of some chemical functional groups that may be used to functionalize the nanoparticles include hydroxyl, carboxyl, sulfo, oxo, amine, amide, acyl, alkyl, vinyl, carbonate, ammonium, sulfate, sulfhydryl, carbonyl, silyl, siloxy, acetyl, and any substituted form of any of the foregoing. In some embodiments of the present invention, functional groups may be attached to the surface of the nanoparticulates for the purpose of forming a precursor to a material on the surface of the nanoparticles. This may be useful for example in an ink composition used in forming conductive features on a substrate. Ink compositions used in forming conductive features on a substrate may contain conductive particles that once deposited on a substrate in a desired pattern, are heated to fuse the particles together to form an electrically conductive feature. In one embodiment of the present invention, a nanoparticulate made of a conductive material may be functionalized with a chemical functional group that is then reacted to form a precursor to a conductive material on the surface of the nanoparticles. When the nanoparticles, with such a precursor on their surface, are used in an ink that is deposited on a substrate and heated, the precursor material on the surface of the nanoparticles reacts to form the conductive material, which aids in fusing the nanoparticles together and forming a conductive feature.

Non-limiting examples of some types of functionality that may be imparted to the nanoparticles by the functional group include metal addition, hydrophilicity, hydroprobicity, lipophilicity, dispersibility in or compatibility with any desired material with which the nanoparticles may be subsequently contacted or combined during subsequent processing or use. Also, the functional group may be selected to provide a reactive site for further modification at a later time. For example, the functional group may provide a reaction site for later grafting a polymer segment or a site for initiation of a polymerization reaction to form a polymer segment at the reactive site.

One preferred example of functionalizing nanoparticles is attaching hydrophobic groups to metal or metal oxide nanoparticles for enhanced compatibility with, and/or dispersibility in, an organic medium such as dispersion in an organic liquid or a polymer composition. For example, the hydrophobic groups may be attached by substitution at hydroxyl sites on the surface of the nanoparticles such as through use of a silane coupling agent or some other coupling agent. As another example, polymer segments may be grafted to the surface of the nanoparticles directly, or through the use of a coupling agent, in order to make the nanoparticles more compatible with and dispersible in a particular polymer, aiding the preparation of a homogeneous blend of the nanoparticles in a composition of the particular polymer. In the first example, the modified nanoparticles may be more easily dispersible in an organic liquid to form a homogeneous composition, such as for preparation of an ink composition for ink jet printing.

As noted, the nanoparticles may be modified by attaching directly, or through the use of some intermediate linking group, a group containing a reactive site for subsequent modification. The reactive site may be a site, for example, for polymerization, for grafting polymer segments, for cross-linking in a cross-linked polymer network or an ionic site for ionic bonding with other materials or for ion exchange.

Another type of surface modification that may be performed during the modifying of the nanoparticles is removal of surface groups or characteristics from the nanoparticles. One example of this is dehydroxylating the surface of metal or metal oxide nanoparticles to remove hydroxyl functionalization that may have formed on the nanoparticles.

A compositional modification that may be performed during the modifying of the nanoparticles involves changing the composition in the interior of the nanoparticles. For example, a metal oxide material contained in the nanoparticles may be compositionally modified by reduction to form a metallic material (e.g., silver oxide to silver, nickel oxide to nickel). Conversely, a metallic material contained in the nanoparticles may be oxidized to form a metal oxide material. As another example, when the nanoparticles contain a monomer, the monomer may be polymerized to form a polymer. As another example, pre-polymer blocks in nanoparticles could be linked together or cross-linkable polymers in the nanoparticles could be cross-linked.

Structural modification that may be performed during the modifying of the nanoparticles involves a non-compositional, physical change to the nanoparticulate crystallinity or particle morphology. Such structural modification often involves subjecting the nanoparticles to a thermal treatment at elevated temperature. As one example, structural modification may involve annealing the nanoparticles, such as for crystal growth, to change the crystallinity or to redistribute materials within the nanoparticles. Another example of a structural modification is changing the size of the nanoparticles, which may involve a heat treatment to grow the size of the nanoparticles.

It should be appreciated, that the modifying of the nanoparticles may involve one or more than one of any number of surface modifications and/or compositional modifications and/or structural modifications. As an example, the nanoparticles could be annealed in the presence of a reactive component to effect both a compositional change and a physical change.

The modifying of the nanoparticles may be performed while the nanoparticles are maintained in a distributed state in the multi-component particles made during formation of the multi-component particles, after modifying the matrix of the multi-component particles, or after decomposing the multi-component particles to release the nanoparticles. Also, the modifying of the nanoparticles may involve multiple modifications to the nanoparticles. For example, one or more modifications may be performed to the nanoparticles while the nanoparticles are maintained in a distributed state within the particles made during formation of the multi-component particles; one or more additional modifications may be performed on the nanoparticles during decomposition of the multi-component particles and one or more modifications may be performed on the nanoparticles after decomposition of the multi-component particles to release the nanoparticles (such as for example surface modifying the nanoparticles by contacting the nanoparticles with an appropriate surface modifying material in a fluidized bed after release of the nanoparticles from the matrix).

In one embodiment, the nanoparticles are modified after the formation of the multi-component particles and prior to the decomposing of the particles. The modification of the nanoparticles involves a surface, composition and/or structural modification, as discussed above, while the nanoparticles are maintained in a distributed state within the particles made during the formation of the particles. Modifying the nanoparticles while they are in a distributed state within the multi-component particles provides the advantage of making modifications to the nanoparticles in a controlled way while avoiding the problem of nanoparticulate agglomeration. As previously stated, the matrix may be temporary or permanent. In the case where the matrix is permanent, the nanoparticles may be modified to impart a characteristic that is desired in a final product. In the case where the matrix is temporary, the matrix will continue to act as a handling/storage/processing aid for the nanoparticles prior to use of the nanoparticles in a final application.

The modification of the nanoparticles may be performed while the particles are still in the aerosol. Thus, the modifying of the nanoparticles may be performed in series after the forming of the particles without intermediate collection of the particles. One example of this is annealing or calcining the particles on-the-fly in the aerosol. Alternatively, the modifying of the nanoparticles could be performed after removal of the particles from the aerosol. One example of this is annealing or calcining the particles in a kiln, rotary calciner, fluidized bed, belt furnace or tray furnace after collection of the particles. In some cases during the annealing or calcining, the matrix material from several multi-component particles may fuse together to form a continuous structure of matrix with distributed nanoparticles. If it is desirable to have discrete multi-component particles, the continuous structure of matrix with distributed nanoparticles may be jet milled or hammer milled to form separated multi-component particles.

In another embodiment, the modification of the nanoparticles is performed after the decomposition of the particles, rather than modifying the nanoparticles and then decomposing the particles. Alternatively, the modifying of the nanoparticles could instead be performed completely, or partially, during the decomposing of the particles.

In another embodiment, the process of the invention includes two nanoparticle modification steps, the first of which occurs prior to the decomposing of the multi-component particles and the second of which occurs after the decomposing of the multi-component particles. As one example, modifying the nanoparticles prior to decomposition may involve a compositional modification to the nanoparticles and modifying the nanoparticles after may involve a surface modification to the nanoparticles to enhance the dispersability of the nanoparticles and/or to inhibit agglomeration of the nanoparticles.

C. Process for Modifying the Matrix

In another embodiment, the present invention provides a process in which the matrix is modified after the formation of the multi-component particles. During the modification of the matrix, one or more than one surface modification and/or compositional modification and/or structural modification is performed on the matrix. The previous discussions concerning surface modification, compositional modification and structural modification of nanoparticles, and the exemplary materials for use during such modifications apply equally to the modifying of the matrix, except that the modifications are performed on the matrix or a component thereof rather than on the nanoparticles or a component thereof. When both the nanoparticles and the matrix are to be modified, the modifying of the matrix may be performed partially or entirely prior to, simultaneously with, or after a modification of the nanoparticles.

One particularly preferred embodiment involving modifying the matrix is to remove only a portion of the matrix to increase porosity in the matrix and enhance access to the nanoparticles through the increased porosity. The matrix with increased porosity may be a permanent matrix, and the increase in porosity may be useful for a final application. For example in catalytic applications, a porous matrix is useful to provide access to catalytic nanoparticles distributed in the porous matrix. Alternatively, the matrix with increased porosity may be a temporary, non-permanent matrix, and the enhanced porosity may be useful to provide access to the nanoparticles to modify the nanoparticles, (e.g., surface modification, compositional modification and/or structural modification). The increased porosity enhances infiltration of treating chemicals and reagents that may be used to modify the nanoparticles.

The matrix could initially be composed of a single material with the increase in porosity being effected by removal of a portion of the matrix, (e.g., partial dissolution of the single matrix material). In another, preferred implementation however, the matrix initially comprises multiple materials with one matrix material being selectively removable relative to another matrix material to effect the increase in matrix porosity. The selective removal may be performed, for example, by selective sublimation, selective dissolution into a liquid medium, selective chemical removal, selective thermal decomposition at elevated temperature or selective melting of one matrix material relative to the other matrix material. By selective chemical removal it is meant that the matrix material is reacted with one or more reactants to form reaction products that are removed from the matrix, while the other matrix material is substantially not removed.

The selective removability of the matrix materials requires that the materials be selected to have different properties in relation to the removal technique to be used, with one material being substantially removable by the technique and the other being substantially not removable by the technique. For example, the matrix could contain one material that dissolves into a particular liquid medium and another material that does not dissolve into that liquid medium. As one example, a first matrix material may be a water soluble organic salt and a second matrix material may be a water insoluble polymer, with the selective removal being effected by dissolving at least a portion, and preferably substantially all, of the first matrix material into an aqueous liquid. As another example, the selective removal of the second matrix material could be effected by dissolving the polymer into an organic solvent in which the organic salt or organic compound is substantially insoluble. As another example, the matrix could comprise two different organic salts with different solubilities in an aqueous liquid. As another example, the matrix could comprise two polymers with different solubilities in an aqueous or organic liquid. As another example, the matrix could comprise of two organic compounds where one is soluble in aqueous liquid and the other is insoluble.

The partial removal of the matrix may be performed in a aerosol. For example, the partial removal of the matrix may be performed in series following the forming of the particles while the particles are in the same aerosol. Alternatively, the partial removal of the matrix may occur after collection of the particles, which particles may then be re-dispersed in a new carrier gas to form a new gas phase in which the partial removal of the matrix is performed. As another alternative, the partial removal of the matrix may occur in an environment other than an aerosol. For example, after collection of the particles from the aerosol, the particles may be mixed with a liquid medium that is a selective solvent for one of the matrix materials.

D. Processes for Modifying the Multi-Component Particles

Another aspect of the present invention involves modifying, e.g., manipulating and/or treating, the multi-component particles. Such modification may be, for example, as an aid to handling, storage, transportation, further processing or use of the nanoparticles. This aspect of the invention includes any and all of the different operations discussed above performed following manufacture of the multi-component particles during formation of the multi-component particles.

In one aspect, a mixture is formed comprising multi-component particles and liquid medium, the multi-component particles comprising nanoparticles maintained in a distributed state in the multi-component particles by matrix. The multi-component particles are treated while in the mixture, and solutes are removed from the liquid medium to thereby reduce the concentration of the solutes in the mixture, and preferably to reduce the molar concentration of the solutes by at least a factor of 10. The treating of the multi-component particles may involve any treatment that may be performed in a liquid medium, including for example, decomposing the multiphase particles to release the nanoparticles or any of the modification to the multiphase particles discussed above (such as any of the modifications to the matrix and/or nanoparticles as discussed above), or some other treatment. The performing of such a treatment often results in solutes in the liquid medium. The solutes may include, for example, one or more of: residual treating material left over from the treatment, matrix material or nanoparticle dissolved into the liquid medium during the treatment, and reaction or decomposition products produced during the treatment. The multi-component particles subjected to the treatment are preferably made as described herein, but may be made by another route.

In another aspect, the multi-component particles are subjected to a treatment step. During the treating of the particles, the multi-component particles in a mixture with a liquid medium are subjected to some treatment in such a manner that during or after the treating of the particles, the liquid medium contains the solutes, at least a portion of which are removed from the liquid medium. The treating of the particles may involve any of the previous processes described. The solutes are substances dissolved in the liquid medium for which partial or total removal is desired At least some, preferably a majority, and most preferably substantially all, of one or more of the solutes are removed from the liquid medium in the separation step. Removal of the solutes reduces the concentration of dissolved components in the liquid medium. This is often important to prepare the liquid medium/nanoparticulate mixture for use as a product (such as an ink, paste or other slurry formulation), or to permit further processing of the liquid medium that would be interfered with by the solutes if not removed. For example, after the solutes are removed during the separation step, then one or more additives could be added to the remaining mixture or a portion of the liquid medium could be removed to thicken the mixture, in preparation for formulating an ink, paste or other slurry composition. When thickening the mixture by removing a portion of the liquid medium, a mixture is prepared that is more concentrated in the nanoparticles, regardless of whether the nanoparticles are still retained in a matrix structure or not. Alternatively, reactants or reagents could be added to the liquid medium for performance of a different treatment, for which the presence of the solutes would be detrimental. In this latter alternative, additional solutes may be introduced into the liquid medium and another removing solutes step could be performed after performing the different treatment to remove at least a portion of one or more of the additional solutes.

Also, although the treatment of the particles and the removal of the solutes may be sequential, the steps may also be performed partially or wholly simultaneously. For example, solutes may be removed from the liquid medium while the multi-component particles are being subjected to the treatment to immediately commence removal of solutes as they begin to build up in the liquid medium.

The removing of the solutes may be performed by any technique. One preferred technique is membrane separation of the solutes by preferentially passing the solutes through a semipermeable membrane relative to particulates in mixture with the liquid medium. The particulates may comprise, for example, modified forms of the multi-component particles or nanoparticles that have been released from the matrix structure through decomposition of the multi-component particles. By semipermeable membrane, it is meant that the membrane is significantly more permeable to passage of the solutes to be removed than passage of the particulates. Passage of the solutes across the membrane may be due to unaided diffusion of the solutes through the membrane, or the membrane may be functionalized or contain ion exchange activity to facilitate transport of one or more solutes across the membrane. For example, dissolved salt ions, from dissolution of a salt matrix may be removed in a dialysis-type membrane separation. Likewise, special molecule polymers may also be removed in such a dialysis-type membrane separation. Alternatively, diafiltration techniques, described in detail above, may be used to remove the solutes. For larger polymers, or macromolecules, a diasolysis or other membrane separation technique may be used. Examples of some membranes that may be used for removing smaller molecule solutes include, for example parchment membranes, collodion, cellophane, asbestos fiber and perfluorosulfonic acid membrane (such as NAFION™ membranes from DuPont). For removal of larger polymer molecules, some examples of some membranes that may be used include gum, plastic or rubber membranes. Another technique is to partition target solutes into another liquid that is immiscible with the liquid medium. For example, some polymer solutes could be partitioned into an organic liquid that is immiscible with the liquid medium, such as for example when the liquid medium is an aqueous liquid.

E. Processes for Forming Composite Structures from the Multi-Component Particles Another aspect of the present invention involves re-dispersing nanoparticles in a composite structure with a new matrix. The matrix of the multi-component particles may be useful for subsequent processing, handling, transportation or storage of the nanoparticles, but it may be desirable at same point to have a different matrix for further processing, handling, storage or transportation, or for a final application for use of the nanoparticles. The new matrix may be a permanent matrix for a final use or it may be a non-permanent temporary matrix for intermediate handling, storage, transportation or further processing, or have functionality in the final application. In this aspect of the invention, the process includes a step of decomposing the particles and forming a composite structure after the formation of the particles. The composite structure formed includes nanoparticles distributed in a new matrix. The nanoparticles in the composite structure are fixedly distributed, meaning that the nanoparticles are maintained in a distributed state by the new matrix. The composite structure may be in a particulate form or a non-particulate form (e.g., monolithic form, sheet, layer, film, bar, etc.).

As with the matrix of the particles described previously, the matrix of the composite structure may be comprised of a single material or of multiple materials that function to maintain the nanoparticles in a distributed state. The new matrix of the composite structure may have the same composition or a different composition than the matrix removed during the decomposing of the particles. More often, the new matrix of the composite structure will have a different composition than that of the matrix removed during the decomposition of the particles, because the new matrix in the composition structure will typically serve a different purpose. The new matrix of the composite structure may include any suitable materials for a desired purpose. Examples of materials previously identified for the particles, made during formation of the multi-component particles, are examples of materials that may be used for the new matrix of the composite structure.

Any procedure useful for distributing the nanoparticles in a matrix may be used during the formation of the composite structure. As one example, the nanoparticles may be distributed in a melt of matrix materials and then cooled to solidify the composite structure (e.g., distributed in a polymer melt).

As another example, the nanoparticles may be dispersed and the new matrix may then be formed around the dispersed nanoparticles. As a specific example, nanoparticles may be dispersed in a solution of reactable monomers or pre-polymer segments that are then polymerized or otherwise reacted to form the matrix around the dispersed nanoparticles. As a further example, nanoparticles may be dispersed in a polymer solution that gels upon inducing some change in the system. The polymer solution may change from a liquid to gel form, for example, in response to a change in temperature, pH or light. As another example, nanoparticles may be dispersed in a solution of cross-linkable polymer that is then cross-linked to form the matrix around the dispersed nanoparticles.

In one implementation, the composite structure is made in particulate form by aerosol processing during the forming of the composite structure. Droplets comprising the nanoparticles, and preferably also comprising one or more precursors for the new matrix, are formed and dispersed in and suspended by a carrier gas to form a new aerosol. The droplets are formed from a feed medium comprising the nanoparticles dispersed in a liquid vehicle. Precursor(s) for material(s) of the new matrix are preferably dissolved or suspended in a liquid vehicle, but precursor(s) for material(s) of the new matrix may also be included in the carrier gas. In the aerosol, liquid is removed from the droplets and the precursors for the new matrix are reacted or otherwise processed to form the new matrix. The new aerosol may be made, for example as previously discussed with respect to forming the initial aerosol. Examples of liquid vehicles and matrix precursors that may be included in the feed medium are similar to those described previously with respect to the generation of the initial aerosol. After particles of the composite structure have been made in the new aerosol, the particles may be collected for further processing or use. The collection of the particles involves separating the particles of the composite structure from the gas phase of the new aerosol, such as by cyclone, filter, electrostatic precipitation, or in a bag house.

The composite structure made during the formation of the composite structure may be designed as a permanent structure for a final use or may be a temporary structure useful for intermediate storage, transportation, handling or further processing of the nanoparticles prior to final use. One example of a composite structure designed for final use is a dispersion of thermally conductive metal nanoparticles (such as copper or silver) in a polymer matrix for use as a thermal interface material.

V. Examples

The present invention will be better understood in view of the following non-limiting examples. In each example, the precursor medium was processed using a lab scale system, which had a droplet generator box having only one piezo transducer. The transducer was separated from the solution by a polyimide (Kapton) membrane. Although some of the experiments described here employed nitrogen as carrier gas, there was no appreciable difference in the final products when either nitrogen or air was used as the carrier gas.

A. Process Examples

Example 1

Silver Nanoparticles and Polymer Matrix from $AgNO_3$

A precursor medium containing silver nitrate, AgNO3 and PVP, dissolved in deionized water is prepared. The precursor medium contains:

| | |
|---|---|
| $AgNO_3$ | 7.5 g |
| PVP | 0.5 g |
| Deionized $H_2O$ | 92 g |

This precursor medium is designed for 8 wt % loading of solids, and to yield particles consisting of 46 vol % silver metal in a PVP matrix. The precursor medium is processed on the lab scale system described above, at a temperature of 400° C. and a carrier gas flow rate of 15 liter per minute (lpm). XRD analysis of the resulting powder shows strong peaks of silver with the presence of small amount of silver nitrate.

Example 2

Silver Nanoparticles and Polymer Matrix from $AgNO_3$ with Use of Ethanol

A precursor medium containing silver nitrate, $AgNO_3$ and PVP, dissolved in deionized water is prepared. The precursor medium contains:

| | |
|---|---|
| $AgNO_3$ | 15.0 g |
| PVP | 0.5 g |
| Deionized $H_2O$ | 74.5 g |
| Ethanol | 10.0 g |

This precursor medium is designed for 15.5 wt % loading of solids, and to yield particles consisting of 64 vol % silver metal in a PVP matrix. The precursor medium is processed on the lab scale system described above, at a temperature of 400° C. and a carrier gas flow rate of 15 liter per minute (lpm). XRD analysis of the resulting powder shows strong peaks of silver with the presence of silver nitrate.

Example 3

Silver Nanoparticles and Polymer Matrix from $AgNO_3$ with Use of Ethylene Glycol A precursor medium containing silver nitrate, AgNO3 and PVP, dissolved in deionized water is prepared. The precursor medium contains:

| | |
|---|---|
| $AgNO_3$ | 15.0 g |
| PVP | 0.5 g |
| Deionized $H_2O$ | 74.5 g |
| Ethylene glycol | 15.0 g |

This precursor medium is designed for 15.5 wt % loading of solids, and to yield particles consisting of 64 vol % silver metal in a PVP matrix. The precursor medium is processed on the lab scale system described above, at a temperature of 250° C. and a carrier gas flow rate of 15 liter per minute (lpm). Under these conditions, the vapor quickly condensed onto the filter paper, as a result, the pressure built up quickly in less than 5 min. XRD analysis of the resulting powder shows strong peaks of silver with the presence of silver nitrate.

The precursor medium is also processed on the lab scale system at 400° C. and a carrier gas flow rate of 15 lpm. XRD pattern for this powder shows mainly silver peaks with very weak peaks attributed to silver nitrate.

Example 4

Silver Nanoparticles and Polymer Matrix from AgNO₃ with Use of Reducing Agent A precursor medium containing silver nitrate, $AgNO_3$ and PVP, dissolved in deionized water is prepared. The precursor medium contains:

| | |
|---|---|
| $AgNO_3$ | 7.5 g |
| PVP | 1.5 g |
| Deionized $H_2O$ | 75.5 g |
| Ethanol | 15.0 g |
| Glucose | 0.5 g |

This precursor medium is designed for 8.0 wt % loading of solids, and to yield particles consisting of 25 vol % silver metal in a PVP matrix. The precursor medium is processed on the lab scale system described above, at a temperature of 300° C. and a carrier gas flow rate of 15 liter per minute (lpm). Under these conditions, the vapor quickly condensed onto the filter paper, as a result, the pressure built up quickly in less than 5 min. XRD analysis of the resulting powder shows only strong peaks of silver without the presence of silver nitrate.

The precursor medium is also processed on the lab scale system at 300° C. and at a carrier gas flow rate of 7, 20, 30 and 40 lpm, respectively. XRD patterns indicate that the reactions are complete except for the case with a flow rate of 30 and 40 lpm. All the product silver particles are partially dispersable in water.

Example 5

Silver Nanoparticles and Polymer Matrix from AgNO₃ with Use of Reducing Agent A precursor medium containing silver nitrate, $AgNO_3$ and PVP, dissolved in deionized water is prepared. The precursor medium contains:

| | |
|---|---|
| $AgNO_3$ | 7.5 g |
| PVP | 1.5 g |
| Deionized $H_2O$ | 75.5 g |
| Ethanol | 15.0 g |
| Glucose | 0.5 g |

This precursor medium is designed for 8.0 wt % loading of solids, and to yield particles consisting of 25 vol % silver metal in a PVP matrix. The precursor medium is processed on the lab scale system described above, at a temperature of 250° C. and a carrier gas flow rate of 20 liter per minute (lpm). Under these conditions, the vapor quickly condensed onto the filter paper, as a result, the pressure built up quickly in less than 5 min. XRD analysis of the resulting powder shows strong peaks of silver with the presence of silver nitrate.

The precursor medium is also processed on the lab scale system at 250° C. and at a carrier gas flow rate of 10 and 30 lpm, respectively. XRD patterns indicate that the reactions are incomplete with the products composed of both silver and silver nitrate.

Example 6

Silver Nanoparticles and Polymer Matrix from AgTFA

A precursor medium containing silver trifluoroacetate (AgTFA) and PVP, dissolved in deionized water is prepared. The precursor medium contains:

| | |
|---|---|
| AgTFA | 6.75 g |
| PVP | 1.05 g |
| Deionized $H_2O$ | 92.2 g |

This precursor medium is designed for 7.8 wt % loading of solids, and to yield particles consisting of 25 vol % silver metal in a PVP matrix. The precursor medium is processed on the lab scale system described above, at a temperature of 250° C. and a carrier gas flow rate of 5 liter per minute (lpm) was used. XRD analysis of the resulting powder shows only peaks of silver.

The precursor medium is also processed on the lab scale system at 250° C. and at a carrier gas flow rate of 15, and 30 lpm, respectively. XRD patterns indicate that the reactions are complete with only silver peaks. All the product silver particles are dispersable in water.

Example 7

Silver Nanoparticles and Polymer Matrix from AgTFA

A precursor medium containing silver trifluoroacetate (AgTFA) and PVP, dissolved in deionized water is prepared. The precursor medium contains:

| | |
|---|---|
| AgTFA | 6.75 g |
| PVP | 0.5 g |
| Deionized $H_2O$ | 92.75 g |

This precursor medium is designed for 7.25 wt % loading of solids, and to yield particles consisting of 40 vol % silver metal in a PVP matrix. The precursor medium is processed on the lab scale system described above, at a temperature of 250° C. and a carrier gas flow rate of 5 liter per minute (lpm) was used. XRD analysis of the resulting powder shows peaks of silver with the presence of silver precursor.

The precursor medium is also processed on the lab scale system at 250° C. and at a carrier gas flow rate of 15, and 30 lpm, respectively. XRD patterns indicate that the reaction with a 30 lpm flow rate is incomplete with only silver peaks. All the product silver particles are dispersable in water.

Example 8

Silver Nanoparticles and Polymer Matrix from AgTFA

A precursor medium containing silver trifluoroacetate (AgTFA) and PVP, dissolved in deionized water is prepared. The precursor medium contains:

| | |
|---|---|
| AgTFA | 6.75 g |
| PVP | 0.3 g |
| Deionized $H_2O$ | 92.95 g |

This precursor medium is designed for 7.05 wt % loading of solids, and to yield particles consisting of 53 vol % silver metal in a PVP matrix. The precursor medium is processed on the lab scale system described above, at a temperature of 250° C. and a carrier gas flow rate of 5 liter per minute (lpm) was used. XRD analysis of the resulting powder shows peaks of silver with the presence of small amount of silver precursor.

The precursor medium is also processed on the lab scale system at 250° C. and at a carrier gas flow rate of 15, and 30 lpm, respectively. XRD patterns indicate that the reactions are incomplete with product as a mixture of silver and silver precursor. All the product silver particles are partially dispersable in water.

Example 9

Silver Nanoparticles and Polymer Matrix from AgTFA

A precursor medium containing silver trifluoroacetate (AgTFA) and PVP, dissolved in deionized water is prepared. The precursor medium contains:

| AgTFA | 6.75 g |
| PVP | 1.05 g |
| Deionized H$_2$O | 92.2 g |

This precursor medium is designed for 7.8 wt % loading of solids, and to yield particles consisting of 25 vol % silver metal in a PVP matrix. The precursor medium is processed on the lab scale system described above, at a temperature of 300° C. and a carrier gas flow rate of 5 liter per minute (lpm) was used. XRD analysis of the resulting powder shows only peaks of silver.

The precursor medium is also processed on the lab scale system at 250° C. and at a carrier gas flow rate of 15, and 30 lpm, respectively. XRD patterns indicate that the reactions are complete with only silver peaks. All the product silver particles are only slightly or partially dispersable in water; product produced with a lower flow rate has less dispersity in water

Example 10

Silver Nanoparticles and Polymer Matrix from AgTFA

A precursor medium containing silver trifluoroacetate (AgTFA) and PVP, dissolved in deionized water is prepared. The precursor medium contains:

| AgTFA | 6.75 g |
| PVP | 0.5 g |
| Deionized H$_2$O | 92.75 g |

This precursor medium is designed for 7.25 wt % loading of solids, and to yield particles consisting of 40 vol % silver metal in a PVP matrix. The precursor medium is processed on the lab scale system described above, at a temperature of 300° C. and a carrier gas flow rate of 5 liter per minute (lpm) was used. XRD analysis of the resulting powder shows peaks of silver without the presence of silver precursor.

The precursor medium is also processed on the lab scale system at 300° C. and at a carrier gas flow rate of 15, and 30 lpm, respectively. XRD patterns indicate that the reaction are complete with only silver peaks. All the product silver particles are not dispersable in water.

Example 11

Silver Nanoparticles and Polymer Matrix from AgTFA

A precursor medium containing silver trifluoroacetate (AgTFA) and PVP, dissolved in deionized water is prepared. The precursor medium contains:

| AgTFA | 6.75 g |
| PVP | 0.3 g |
| Deionized H$_2$O | 92.95 g |

This precursor medium is designed for 7.05 wt % loading of solids, and to yield particles consisting of 53 vol % silver metal in a PVP matrix. The precursor medium is processed on the lab scale system described above, at a temperature of 300° C. and a carrier gas flow rate of 5 liter per minute (lpm) was used. XRD analysis of the resulting powder shows peaks of silver without the presence of silver precursor.

The precursor medium is also processed on the lab scale system at 300° C. and at a carrier gas flow rate of 15, and 30 lpm, respectively. XRD patterns indicate that the reaction with a flow rate 30 is incomplete with product as a mixture of silver and AgTFA.

Example 12

Silver nanoparticles and Polymer Matrix from AgTFA

A precursor medium containing silver trifluoroacetate (AgTFA) and PVP, dissolved in deionized water is prepared. The precursor medium contains:

| AgTFA | 6.75 g |
| PVP | 0.25 g |
| Deionized H$_2$O | 93.0 g |

This precursor medium is designed for 7.0 wt % loading of solids, and to yield particles consisting of 53 vol % silver metal in a PVP matrix. The precursor medium is processed on the lab scale system described above, at a temperature of 250° C. and a carrier gas flow rate of 5 liter per minute (lpm) was used. Air pressure was quickly built up and the reaction was stopped in less than 2 min as a result. There is no enough material to take the XRD pattern. SEM images of the material indicates particles of 30-80 nm in the matrix.

The precursor medium is also processed on the lab scale system at 300° C. and at a carrier gas flow rate 5 lpm, XRD patterns indicate that the reaction is complete. SEM images of the material indicates particles of 60-100 nm in the matrix

Example 13

Silver Nanoparticles and Polymer Matrix from AgTFA

A precursor medium containing silver trifluoroacetate (AgTFA) and PVP, dissolved in deionized water is prepared. The precursor medium contains:

| AgTFA | 6.75 g |
| --- | --- |
| PVP | 0.20 g |
| Deionized H$_2$O | 93.5 g |

This precursor medium is designed for 6.95 wt % loading of solids, and to yield particles consisting of 57 vol % silver metal in a PVP matrix. The precursor medium is processed on the lab scale system described above, at a temperature of 250° C. and a carrier gas flow rate of 5 liter per minute (lpm) was used. Air pressure was quickly built up and the reaction was stopped in less than 2 min as a result. There is no enough material to take the XRD pattern. SEM images of the material indicates particles of 70-100 nm in the matrix.

The precursor medium is also processed on the lab scale system at 300° C. and at a carrier gas flow rate 5 lpm, XRD patterns indicate that the reaction is complete. SEM images of the material indicates particles of ca. 120 nm in the matrix Example 14

Silver Nanoparticles and Polymer Matrix from AgTFA—Effect of Glucose

A precursor medium containing silver trifluoroacetate (AgTFA) and PVP, dissolved in deionized water is prepared. The precursor medium contains:

| AgTFA | 4.0 g |
| --- | --- |
| PVP | 0.25 g |
| Deionized H$_2$O | 95.0 g |
| Glucose | 0.75 |

This precursor medium is designed for 5.0 wt % loading of solids, and to yield particles consisting of 45 vol % silver metal in a PVP matrix. The precursor medium is processed on the lab scale system described above, at a temperature of 250° C. and a carrier gas flow rate of 20 liter per minute (lpm) was used. XRD pattern shows peaks of only silver without starting material. SEM images of the material indicate particles of 20 nm in the matrix.

The precursor medium is also processed on the lab scale system at 250° C. and at a carrier gas flow rate 20 lpm without the addition of glucose, XRD patterns indicate that the reaction is incomplete with product being a mixture of silver and silver trifluoroacetate.

Example 15

Silver Nanoparticles and Polymer Matrix from AgTFA—Effect of Glucose

A precursor medium containing silver trifluoroacetate (AgTFA) and PVP, dissolved in deionized water is prepared. The precursor medium contains:

| AgTFA | 6.0 g |
| --- | --- |
| PVP | 0.4 g |
| Deionized H$_2$O | 93.35 g |
| Glucose | 0.25 |

This precursor medium is designed for 6.65 wt % loading of solids, and to yield particles consisting of 45 vol % silver metal in a PVP matrix. The precursor medium is processed on the lab scale system described above, at a temperature of 250° C. and a carrier gas flow rate of 30 liter per minute (lpm) was used. XRD pattern shows peaks of only silver without starting material. SEM images of the material indicate particles of 20 nm in the matrix.

The precursor medium is also processed on the lab scale system at 250° C. and at a carrier gas flow rate 30 lpm without the addition of glucose, XRD patterns indicate that the reaction is incomplete with product being a mixture of silver and silver trifluoroacetate.

Example 16

Silver Nanoparticles and Polymer Matrix from AgTFA—Effect of Sodium Dioctyl Sulfosuccinate (AOT)

A precursor medium containing silver trifluoroacetate (AgTFA) and PVP, dissolved in deionized water is prepared. The precursor medium contains:

| AgTFA | 4.0 g |
| --- | --- |
| PVP | 0.35 g |
| Deionized H$_2$O | 95.4 g |
| AOT | 0.25 |

This precursor medium is designed for 4.6 wt % loading of solids, and to yield particles consisting of 35 vol % silver metal in a PVP matrix. The precursor medium is processed on the lab scale system described above, at a temperature of 250° C. and a carrier gas flow rate of 30 liter per minute (lpm) was used. XRD pattern shows the reaction in incomplete.

The precursor medium is also processed on the lab scale system at a carrier gas flow rate 20 lpm, XRD patterns indicate that the reaction is still incomplete. As a mixture of silver and silver precursor, the product from both reactions disperses very well in water.

Example 17

Silver Nanoparticles and Polymer Matrix

A precursor medium is prepared containing:

| AgNO$_3$ | 30 g |
| --- | --- |
| Polyvinylpyrrolidone 10,000 MW | 12 g |
| Deionized H$_2$O | 235 g |

The precursor medium has 15 wt % soluble components and is designed to yield particles with 13.4 vol % silver nanoparticles inside a PVP matrix. The precursor medium is formulated with the idea of achieving similar results as have been achieved by liquid batch routes in the polyol process, which produces silver nanoparticles of approximately 50 nm in size.

The precursor medium is processed using the pilot scale system at 550° C. with a carrier gas flow rate of 60 lpm. The resulting powder is very dark brown. XRD of the resulting powder indicates contamination of strontium nitrate from a previous precursor medium, but primarily shows the presence of silver. Some silver nitrate appears to be present, but is difficult to identify. SEM images of the powder show spherical particles on the order of 1 to 5 microns. The surface of the spherical particles appears to contain nanoparticles. The larger particles contain features less than 100 nm in diameter on their surfaces. Some of the larger particles appear to be hollow and the nanoparticles can be seen in pieces of crumbled micron size hollow particles.

The precursor medium is also processed using the pilot scale system at 350° C. with a carrier gas flow rate of 60 lpm. XRD of this sample is also contaminated with strontium nitrate from previously processed precursor mediums, but does clearly show the presence of silver. The morphology of the powder is similar to the powder produced at 550° C., with sub-100 nm features visible on the surface of micron size particles.

The foregoing discussion of the invention has been presented for purposes of illustration and description. The foregoing is not intended to limit the invention to only the form or forms specifically disclosed herein. Although the description of the invention has included description of one or more embodiments and certain implementations, variations and modifications, other implementations, variations and modifications are within the scope of the invention, e.g., as may be within the skill and knowledge of those in the art after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. Furthermore, any feature described with respect to any disclosed embodiment, implementation or variation of any aspect of the invention may be combined in any combination with one or more features of any other embodiment, implementation or variation of the same or any other aspect of the invention. For example, additional processing steps can be included at any point before, during or after processing disclosed in any of the process embodiments described herein or shown in any of the figures, so long as the additional steps are not incompatible with the disclosed processing according to the present invention. Moreover, processing steps disclosed in any of the process embodiments described herein can be combined with any other processing steps described with any other process embodiment. The terms "comprising," "containing," "including," and "having," and variations thereof, are intended to be non-limiting in that the use of such terms indicates the presence of some condition or feature, but not to the exclusion of the presence of any other condition or feature. Percentages stated herein are by weight unless otherwise expressly stated.

What is claimed is:

1. A process for making multi-component particles comprising inorganic nanoparticles distributed in an organic matrix, the process comprising the steps of:
    (a) generating an aerosol comprising droplets, wherein the droplets comprise a liquid vehicle, an inorganic nanoparticle precursor and an organic matrix precursor; and
    (b) removing at least a portion of the liquid vehicle from the droplets under conditions effective to convert at least a portion of the organic matrix precursor to the organic matrix and to convert at least a portion of the inorganic nanoparticle precursor to the inorganic nanoparticles distributed in the organic matrix.

2. The process of claim 1, wherein step (b) comprises heating the droplets to a maximum temperature of from about 50° C. to about 800° C. for a period of time of at least 1 second.

3. The process of claim 1, wherein the droplets further comprise a reducing agent and wherein step (b) comprises reacting the reducing agent with the inorganic nanoparticle precursor to form the inorganic nanoparticles.

4. The process of claim 1, wherein the liquid vehicle is a reducing agent and wherein step (b) comprises reacting the liquid vehicle with the inorganic nanoparticle precursor to form the inorganic nanoparticles.

5. The process of claim 1, wherein the aerosol comprises the droplets distributed in a gas phase, the gas phase comprising a reducing agent, and wherein step (b) comprises reacting the reducing agent with the inorganic nanoparticle precursor to form the inorganic nanoparticles.

6. The process of claim 1, wherein the aerosol comprises droplets, the droplets comprising the inorganic nanoparticle precursor and/ or a reducing agent.

7. The process of claim 1, wherein the process further comprises the step of:
    (c) collecting the multi-component particles in a liquid medium.

8. A process for making multi-component particles comprising inorganic nanoparticles dispersed in an organic matrix, the process comprising the steps of:
    (a) generating an aerosol comprising droplets dispersed in a gas phase, wherein the droplets comprise a liquid vehicle, the inorganic nanoparticles and an organic matrix precursor; and
    (b) removing at least a portion of the liquid vehicle from the droplets under conditions effective to convert at least a portion of the organic matrix precursor to the organic matrix and to disperse the inorganic nanoparticles within the matrix.

9. The process of claim 8, wherein step (b) comprises heating the droplets to a maximum temperature of from about 50° C. to about 800° C. for a period of time of at least 1 second.

10. The process of claim 8, wherein the droplets further comprise a reducing agent and wherein step (b) comprises reacting the reducing agent with the organic matrix precursor to form the matrix.

11. The process of claim 8, wherein the liquid vehicle is a reducing agent and wherein step (b) comprises reacting the liquid vehicle with the organic matrix precursor to form the matrix.

12. The process of claim 8, wherein the aerosol comprises the droplets distributed in a gas phase, the gas phase comprising a reducing agent, and wherein step (b) comprises reacting the reducing agent with the organic matrix precursor to form the matrix.

13. The process of claim 8, wherein the process further comprises the step of:
    (c) collecting the multi-component particles in a liquid medium.

14. The process of claim 13, wherein the process further comprises the step of:
    (d) quenching the multi-component particles within about 0.001 seconds of step (c).

15. A process for making multi-component particles comprising inorganic nanoparticles dispersed in an organic matrix, the process comprising the steps of:
    (a) generating an aerosol comprising droplets dispersed in a gas phase, wherein the droplets comprise a liquid vehicle, an inorganic nanoparticle precursor and an organic matrix precursor;
    (b) removing at least a portion of the liquid vehicle from the droplets;
    (c) converting the organic matrix precursor to the organic matrix; and (d) converting the inorganic nanoparticle precursor to the inorganic nanoparticles distributed within the organic matrix.

16. The process of claim 15, wherein steps (b), (c) and (d) occur simultaneously.

17. The process of claim 15, wherein step (b) occurs, at least in part, before steps (c) and (d).

18. The process of claim 15, wherein step (c) occurs, at least in part, before step (d).

19. The process of claim 15, wherein step (d) occurs, at least in part, before step (c).

* * * * *